US009360684B2

(12) United States Patent
Contet et al.

(10) Patent No.: US 9,360,684 B2
(45) Date of Patent: Jun. 7, 2016

(54) METHOD FOR DETERMINING TARGET OPTICAL FUNCTIONS

(75) Inventors: Aude Contet, Charenton le Pont (FR); Hélène De Rossi, Charenton le Pont (FR)

(73) Assignee: ESSILOR INTERNATIONAL (COMPAGNIE GENERALE D'OPTIQUE), Charenton le Pont (FR)

( * ) Notice: Subject to any disclaimer, the term of this patent is extended or adjusted under 35 U.S.C. 154(b) by 333 days.

(21) Appl. No.: 14/000,387

(22) PCT Filed: Feb. 17, 2012

(86) PCT No.: PCT/EP2012/052788
§ 371 (c)(1),
(2), (4) Date: Aug. 19, 2013

(87) PCT Pub. No.: WO2012/110644
PCT Pub. Date: Aug. 23, 2012

(65) Prior Publication Data
US 2013/0329186 A1 Dec. 12, 2013

(30) Foreign Application Priority Data
Feb. 18, 2011 (EP) .................................... 11305175

(51) Int. Cl.
*G02C 3/00* (2006.01)
*G02C 7/00* (2006.01)
*G02C 7/02* (2006.01)
*G02C 7/06* (2006.01)

(52) U.S. Cl.
CPC ................ *G02C 7/028* (2013.01); *G02C 7/025* (2013.01); *G02C 7/027* (2013.01); *G02C 7/061* (2013.01)

(58) Field of Classification Search
CPC ............ G02C 7/061; G02C 7/04; G02C 7/02; G02C 7/027; A61B 3/1005; A61B 3/103
USPC ......................................... 351/159.73–159.77
See application file for complete search history.

(56) References Cited

U.S. PATENT DOCUMENTS

| 6,318,859 | B1 | 11/2001 | Baudart |
| 2007/0132945 | A1* | 6/2007 | Haser et al. .................... 351/159 |
| 2010/0157242 | A1* | 6/2010 | Esser et al. ..................... 351/177 |
| 2010/0296055 | A1* | 11/2010 | Esser et al. ..................... 351/204 |
| 2012/0002161 | A1* | 1/2012 | Altheimer et al. ............. 351/177 |
| 2012/0212705 | A1 | 8/2012 | Calixte et al. |

FOREIGN PATENT DOCUMENTS

| EP | 1 752 815 | 8/2005 |
| EP | 1 767 983 | 3/2007 |

(Continued)

*Primary Examiner* — James Greece
(74) *Attorney, Agent, or Firm* — Cozen O'Connor

(57) ABSTRACT

A method for determining target optical functions for a pair of ophthalmic lenses is provided, the method comprising steps of: generating a first target optical function (OFT1) for a first lens of the pair based at least on data relating to a first eye, generating a second target optical function (OFT2) for a second lens of the pair based at least on data relating to the first eye. This method makes it possible to obtain optical functions having improved symmetry. Thus, when using the target optical functions in an optical optimization method, lenses with improved binocular properties can be obtained. The comfort of the wearer of the pair of lenses is thus improved.

16 Claims, 58 Drawing Sheets

(56) References Cited

FOREIGN PATENT DOCUMENTS

| | | |
|---|---|---|
| EP | 2 224 276 | 9/2010 |
| WO | WO 2008/086520 | 7/2008 |
| WO | WO 2010/017129 | 2/2010 |
| WO | WO 2011/042504 | 4/2011 |

* cited by examiner

Right lens, Addition 2.50, Sphere 1

Wearer's addition = 2.58 diopters

| Points | FV | NV | FC |
|---|---|---|---|
| Mean Sphere (diopters) | 1.95 | 4.54 | 2.00 |
| Astigmatism (diopters) | 0.01 | 0.19 | 0.00 |
| Axis (degrees) | 177.69 | 7.32 | 179.66 |

| Left lens, Addition 2.00, Sphere -1.75 | | | |
|---|---|---|---|
| Wearer's addition = 2.27 diopters | | | |
| Points | FV | NV | FC |
| Mean Sphere (diopters) | -1.77 | 0.50 | -1.75 |
| Astigmatism (diopters) | 0.02 | 0.28 | 0.00 |
| Axis (degrees) | 70.65 | 174.78 | 179.94 |

# METHOD FOR DETERMINING TARGET OPTICAL FUNCTIONS

RELATED APPLICATIONS

This is a U.S. National Phase application under 35 USC §371 of international application PCT/EP2012/052788, filed on Feb. 17, 2012.

This application claims the priority of European patent application no. 11305175.9 filed Feb. 18, 2011, the entire content of which is hereby incorporated by reference.

FIELD OF THE INVENTION

The invention relates to a method for determining target optical functions for a pair of ophthalmic lenses. The invention further relates to a method of optical optimization of a pair of ophthalmic lenses, a method for manufacturing a pair of ophthalmic lenses, a set of apparatuses for manufacturing a pair of ophthalmic lenses, a set of data, a computer program product and a computer readable medium associated to this method.

BACKGROUND OF THE INVENTION

A wearer may be prescribed a positive or negative optical power correction. For presbyopic wearers, the value of the power correction is different for far vision and near vision, due to the difficulties of accommodation in near vision. The prescription thus comprises a far-vision power value and an addition representing the power increment between far vision and near vision. The addition is qualified as prescribed addition. Ophthalmic lenses suitable for presbyopic wearers are multifocal lenses, the most suitable being progressive multifocal lenses.

The ophthalmic prescription can include an astigmatism prescription. Such a prescription is produced by the ophthalmologist in the form of a pair formed by an axis value (in degrees) and an amplitude value (in diopters). The amplitude value represents the difference between minimal and maximal power in a given direction which enables to correct the visual defect of a wearer. According to the chosen convention, the axis represents the orientation of one of two powers with relation to a reference axis and in the sense of rotation chosen. Usually, the TABO convention is used. In this convention, the reference axis is horizontal and the sense of rotation is anti-clockwise for each eye, when looking to the wearer. An axis value of +45° therefore represents an axis oriented obliquely, which when looking to the wearer, extends from the quadrant located up on the right to the quadrant located down on the left. Such an astigmatism prescription is measured on the wearer looking in far vision. The term <<astigmatism>> is used to designate the pair (amplitude, angle); despite this use not being strictly correct, this term is also used to refer to the amplitude of the astigmatism. The person skilled in the art can understand from the context which meaning is to be considered. It is also known for the person skilled in the art that the prescribed power and astigmatism of a wearer are usually called sphere, cylinder and axis. Ophthalmic lenses correcting the astigmatism prescription of a wearer may be composed of sphero-cylindrical surfaces.

To improve the optical characteristics (or optical performances) of an ophthalmic lens, method for optimizing methods of the parameters of the ophthalmic lens are thus used. Such optimization methods are designed so as to get the optical function of the ophthalmic lens as close as possible to a predetermined target optical function. FIG. 1 illustrates a schematic flowchart for carrying out such a method. The target optical function is determined at step 10. The target optical function represents the optical characteristics the ophthalmic lens should have. In the context of the present invention and in the remainder of the description, the term "target optical function of the lens" is used for convenience. This use is not strictly correct in so far as a target optical function has only a sense for a wearer—ophthalmic lens and ergorama system. Indeed, the optical target function of such system is a set of optical criteria defined for given gaze directions. This means that an evaluation of an optical criteria for one gaze direction gives an optical criteria value. The set of optical criteria values obtained is the target optical function. The target optical function then represents the performance to be reached. In the simplest case, there will only be one optical criterion such as optical power or residual astigmatism; however, more elaborate criteria may be used such as mean power which is a linear combination of optical power and astigmatism. Optical criteria involving aberrations of higher order may be considered. The number of criteria N considered depends on the precision desired. Indeed, the more criteria considered, the more the lens obtained is likely to satisfy the wearer's needs. However, increasing the number N of criteria may result in increasing the time taken for calculation. The choice of the number N of criteria considered will then be a trade-off between these two requirements. More details about target optical functions, optical criteria definition and optical criteria evaluation can be found in co-pending patent application EP-090305949 which was filed on Oct. 7, 2009 at the EPO. This optical function is used at step 12 of optical optimization. It results in an optimized lens as shown in the result box 14.

In some cases, even though the ophthalmic lens is optimized, the optical function of the optimized ophthalmic lens may not reach the target optical function. In some case, the optical function of the optimized ophthalmic lens may have optical characteristic worse than if the ophthalmic lens had not been optimized.

When calculating a pair of lenses according to the prior art, the lenses are calculated separately. The lens for the right eye is calculated from data relating to the right eye as the prescription of the right eye. Similarly, the lens for the left eye is calculated from data relating to the left eye as the prescription of the left eye.

Only monocular vision of each eye of the wearer is taken into account separately when designing the lenses of a pair. However, binocular vision is important in many of daily tasks as explained in Borish's Clinical Refraction Second Edition from the Author William J. Benjamin Chapter 5. Thus, it is important to take into account the two eyes when designing lenses of a pair to guaranty the natural behavior of the ocular couple.

SUMMARY OF THE INVENTION

One object of the invention is to improve the comfort of wearing a pair of ophthalmic lenses for the wearer for whom the pair is intended by maximizing the binocular performance.

This object is achieved with a method for determining target optical functions for a pair of ophthalmic lenses, the method comprising steps of generating a first target optical function for a first lens of the pair based at least on data relating to a first eye. The method further comprises generating a second target optical function for a second lens of the pair based at least on data relating to the first eye.

One aspect of the present invention is directed to a computer-implemented method for determining target optical functions for a pair of ophthalmic lenses, wherein a target optical function is a set of optical criteria values defined for given gaze directions, representing the performance to be reached, the method comprising steps of: generating a first target optical function for a first lens of the pair based at least on data relating to a first eye, wherein said data relating to an eye are selected from monocular data linked to prescription data for said eye or a combination of prescription data, data linked to the eye's biometry and binocular data; creating an intermediate optical function for a second lens of the pair based on a transformation of the first target optical function, wherein said transformation applies to the values of one optical criterion of the first target optical function, and wherein said transformation is selected from linear transformations such as shifts, including power shifts, and homotheties; and generating a second target optical function for the second lens of the pair by modifying the intermediate optical function based on the prescription data of the second eye.

According to further embodiments of the invention, the method may comprise the following features alone or in combination:

the generating step of the second target optical function comprises steps of
creating an intermediate optical function based on a transformation of the first target optical function
modifying the intermediate optical function based on the prescription data of the second eye.

the generating step of the first target optical function comprises steps of:
creating a first intermediate optical function based on at least on data relating to the first eye,
determining the first target optical function by modifying the first intermediate optical function based on the prescription data for the first eye,
and the generating step of the second target optical function comprises steps of:
creating a second intermediate optical function based on a transformation of the first intermediate optical function,
determining the second target optical function by modifying the second intermediate optical function based on the prescription data for the second eye.

A couple of gaze directions, one gaze direction relative to the first eye and the other one relative to the second eye are associated to see a given object, and the first and second intermediate optical function has optical criteria values, the transformation being such that the second intermediate optical function optical has the same optical criteria values of the first intermediate optical function for each associated gaze direction.

the generating step of the first target optical function is also based on data relating to the second eye,
the generating step of the second target optical function is also based on data relating to the second eye.

the generating step of the first target optical function comprises:
creating a first intermediate optical function obtained by applying an operation to data relating to the first eye and to the second eye,
determining the first target optical function by modifying the first intermediate optical function based on the prescription data for the first eye, and the generating step of the second target optical function comprises:
creating a second intermediate optical function applying the corresponding operation to a data relative to the second eye and to the first eye,
determining the second target optical function by modifying the second intermediate optical function based on the prescription data for the second eye.

the method further comprises:
defining two sets of optical criteria values calculated for given gaze directions, one set being defined thanks to data relative to the first eye and one set being defined thanks to data relative to the second eye,
determining a weighting coefficient between both eyes for each optical criteria values of the sets of optical criteria based on data relating to both eyes,
calculating each optical criterion of a first and/or second set of optical criteria constituting the first and/or second intermediate optical function obtained by applying an operation to the optical criteria values of the two sets of optical criteria the operation calculating optical criterion by calculating the product of the weighting coefficient optical criteria for the eye considered added to the product of the difference of 1 and the weighting coefficient multiplied by the optical criteria between for the other eye.

the weighting coefficients are determined based on monocular data deriving from the prescription for both eyes or on binocular data.

the method is implemented on a computer.

Another aspect of the invention is directed to a method of optical optimization of a pair of ophthalmic lenses comprising the steps of choosing an initial pair of lenses and determining target optical functions according to the method previously described. The method further comprises defining a current pair of lenses, optical functions being associated to each lens of the pair of current lenses, the current pair of lenses being initially defined as the initial pair of lenses and carrying out an optical optimization for minimizing the difference between the current optical functions and the target optical functions with a cost function.

Another aspect of the invention is directed to a method for manufacturing a pair of ophthalmic lenses, comprising the steps of providing data relating to the eyes of the wearer, determining target optical functions according to the method previously described and carrying out an optical optimization based on the target optical functions and manufacturing the pair of ophthalmic lenses according to the result of the optical optimization.

Another aspect of the invention is directed to a method for manufacturing a pair of ophthalmic lenses, comprising the steps of providing data relating to the eyes of the wearer at a first location, transmitting data from the first location to a second location, determining target optical functions according to the method previously described and carrying out an optical optimization based on the target optical functions and manufacturing the pair of ophthalmic lenses according to the result of the optical optimization at the second location or at a third location.

Another aspect of the invention is directed to a set of apparatuses for manufacturing a pair of ophthalmic lenses, wherein the apparatuses are adapted to carry out the method for manufacturing previously described.

Another aspect of the invention is directed to a set of data comprising data relating to the eyes of the wearer and target optical functions determined according to the method previously described.

Another aspect of the invention is directed to a computer implemented method for determining two target optical functions for use in optical optimization of a pair of lenses, wherein one of the target optical functions is determined based on the other target optical function.

Another aspect of the invention is directed to a computer implemented method for determining two target optical functions for use in optical optimization of a pair of lenses, wherein the two target optical functions are determined based on corresponding data relating to the first eye and the second eye.

Another aspect of the invention is directed to a computer program product comprising one or more stored sequence of instruction that is accessible to a processor and which, when executed by the processor, causes the processor to carry out the method previously described.

Another aspect of the invention is directed to a computer readable medium carrying out one or more sequences of instructions of the computer program product previously described.

Another aspect of the invention is directed to an optimized lens obtained by carrying out an optical optimization based on the target optical functions determined by the method of determination previously described.

Another aspect of the invention is directed to an optimized pair of lenses obtained by carrying out an optical optimization based on the target optical functions determined by the method of determination previously described.

Further features and advantages of the invention will appear from the following description of embodiments of the invention, given as non-limiting examples, with reference to the accompanying drawings listed hereunder.

It can be appreciated that elements in the Figures are illustrated for simplicity and clarity and have not necessarily been drawn to scale. For example, the dimensions of some of the elements in the Figures may be exaggerated relative to other elements to help improve the understanding of the embodiments of the present invention.

DETAILED DESCRIPTION OF THE DRAWINGS

A method for generating target optical functions for a pair of lenses having specific features is proposed. This method enables an improved binocular vision to be obtained. This improved binocular performance may be explained by a better symmetry between the target optical functions but is also present when the target optical functions are not perfectly symmetrical. In the remainder of the description, focus will be made on the symmetry with the idea that, even if symmetry is not perfect, better binocular performances are obtained with the method according to the invention when taking into account data relative to the two eyes to generate at least one of the two target optical functions. This results in an increased comfort for the wearer. Indeed, the wearer is provided with a pair of lenses adapted to the wearer's natural binocular behavior.

As is known, a mean sphere SPH at any point on a complex surface is defined by the formula:

$$SPH = \frac{n-1}{2}\left(\frac{1}{R_1} + \frac{1}{R_2}\right)$$

where $R_1$ and $R_2$ are the local maximum and minimum radii of curvature, expressed in meters, and n is the index of the constituent material of the lens.

A cylinder C is also defined by the formula:

$$C = (n-1)\left|\frac{1}{R_1} - \frac{1}{R_2}\right|.$$

The characteristics of the complex face of the lens may be expressed by means of the local mean spheres and cylinders.

Moreover, a progressive multifocal lens may also be defined by optical characteristics, taking into consideration the situation of the person wearing the lenses.

Figure 2:
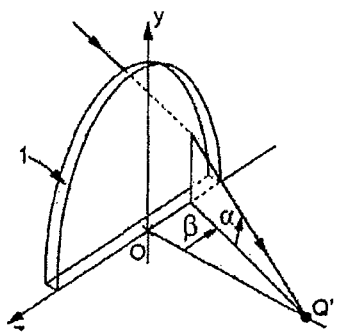
FIGS. 2 and 3 show, diagrammatically, optical systems of eye and lens.
Figure 3:
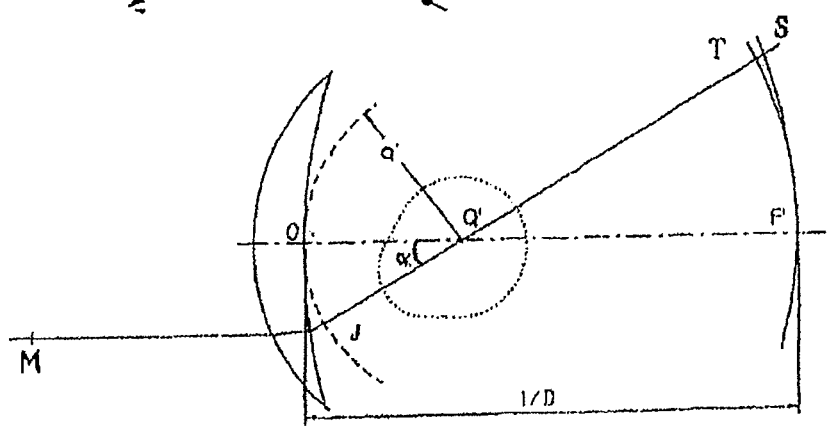

FIGS. 2 and 3 are diagrammatic illustrations of optical systems of eye and lens, thus showing the definitions used in the description. More precisely, FIG. 2 represents a perspective view of such a system illustrating parameters α and β used to define a gaze direction. FIG. 3 is a view in the vertical plane parallel to the antero-posterior axis of the wearer's head and passing through the center of rotation of the eye in the case when the parameter β is equal to 0.

The center of rotation of the eye is labeled Q'. The axis Q'F', shown on FIG. 2 in a dot-dash line, is the horizontal axis passing through the center of rotation of the eye and extending in front of the wearer—that is the axis Q'F' corresponding to the primary gaze view. This axis cuts the complex surface of the lens on a point called the fitting cross, which is present on lenses to enable the positioning of lenses in a frame by an optician. The point of intersection of the rear surface of the lens and the axis Q'F' is the point O. An apex sphere, of center Q', and of radius q', which is tangential to the rear surface of the lens in a point of the horizontal axis. As examples, a value of radius q' of 25.5 mm corresponds to a usual value and provides satisfying results when wearing the lenses.

Figure 4:
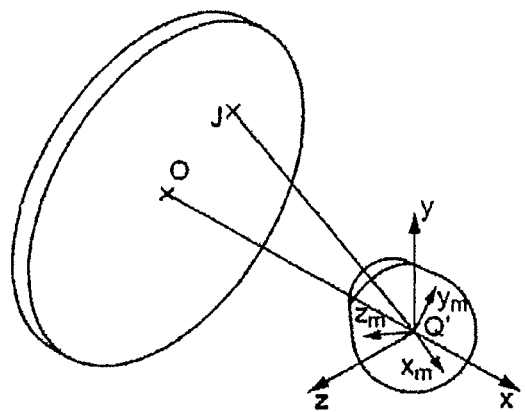
FIG. 4 shows a ray tracing from the center of rotation of the eye.

A given gaze direction—represented by a solid line on FIG. 4—corresponds to a position of the eye in rotation around Q' and to a point J of the apex sphere; the angle β is the angle formed between the axis Q'F' and the projection of the straight line Q'J on the horizontal plane comprising the axis Q'F'; this angle appears on the scheme on FIG. 3. The angle α is the angle formed between the axis Q'J and the projection of the straight line Q'J on the horizontal plane comprising the axis Q'F'; this angle appears on the scheme on FIGS. 2 and 3. A given gaze view thus corresponds to a point J of the apex sphere or to a pair (α, β). The more the value of the lowering gaze angle is positive, the more the gaze is lowering and the more the value is negative, the more the gaze is raising.

In a given viewing direction, the image of a point M in the object space, located at a given object distance, is formed between two points S and T corresponding to minimum and maximum distances JS and JT, which would be the sagittal and tangential focal lengths in the case of surfaces of revolution. The image of a point in the object space at infinity is formed, on the optical axis, at the point F'. The distance D corresponds to the rear frontal plane of the lens.

Ergorama is a function associating to each gaze direction the usual distance of an object point. Typically, in far vision following the primary gaze direction, the object point is at infinity. In near vision, following a direction essentially corresponding to an angle α around 35° and to an angle β around 5° in absolute value towards the nasal side, the object distance is of the order of 30 to 50 cm. For more details concerning a possible definition of an ergorama, U.S. Pat. No. 6,318,859 may be considered. This document describes an ergorama, its definition and its modeling method. For a method of the invention, points may be at infinity or not. Ergorama may be a function of the wearer's ametropia.

Using these elements, it is possible to define a wearer optical power and astigmatism, in each viewing direction. An object point M at an object distance given by the ergorama is considered for a viewing direction (α,β). An object proximity ProxO is defined for the point M on the corresponding light ray in the object space as the inverse of the distance MJ between point M and point J of the apex sphere:

$$ProxO = 1/MJ$$

This enables to calculate the object proximity within a thin lens approximation for all points of the apex sphere, which is used for the determination of the ergorama. For a real lens, the object proximity can be considered as the inverse of the distance between the object point and the front surface of the lens, on the corresponding light ray.

For the same gaze direction (α,β), the image of a point M having a given object proximity is formed between two points S and T which correspond respectively to minimal and maximal focal distances (which would be sagittal and tangential focal distances in the case of revolution surfaces). The quantity Prox I is called image proximity of the point M:

$$ProxI = \frac{1}{2}\left(\frac{1}{JT} + \frac{1}{JS}\right)$$

By analogy with the case of a thin lens, it can therefore be defined, for a given gaze direction and for a given object proximity, i.e. for a point of the object space on the corresponding light ray, an optical power Pui as the sum of the image proximity and the object proximity.

$$Pui = ProxO + ProxI$$

With the same notations, an astigmatism Ast is defined for every gaze direction and for a given object proximity as:

$$Ast = \left|\frac{1}{JT} - \frac{1}{JS}\right|$$

This definition corresponds to the astigmatism of a ray beam created by the lens. It can be noticed that the definition gives, in the primary gaze direction, the classical value of astigmatism. The astigmatism angle, usually called axis, is the angle γ. The angle γ is measured in the frame $\{Q', x_m, y_m, z_m\}$ linked to the eye. It corresponds to the angle with which the image S or T is formed depending on the convention used with relation to the direction $z_m$ in the plane $\{Q', z_m, y_m\}$.

Possible definitions of the optical power and the astigmatism of the lens, in the wearing conditions, can thus be calculated as explained in the article by B. Bourdoncle et al., entitled "Ray tracing through progressive ophthalmic lenses", 1990 International Lens Design Conference, D. T. Moore ed., Proc. Soc. Photo. Opt. Instrum. Eng. Standard wearing conditions are to be understood as the position of the lens with relation to the eye of a standard wearer, notably defined by a pantoscopic angle of −8°, a lens-eye distance of 12 mm and a wrap angle of 0°. The pantoscopic angle is the angle in the vertical plane between the optical axis of the spectacle lens and the visual axis of the eye in the primary position, usually taken to be the horizontal. The wrap angle is the angle in the horizontal plane between the optical axis of the spectacle lens and the visual axis of the eye in the primary position, usually taken to be the horizontal. Other conditions may be used. Wearing conditions may be calculated from a ray-tracing program, for a given lens. Further, the optical power and the astigmatism may be calculated so that the prescription be either fulfilled at the reference point for far vision and for a wearer wearing his spectacles in the wearing conditions or measured by a frontofocometer.

FIG. 4 represents a perspective view of a configuration wherein the parameters α and β are non zero. The effect of rotation of the eye can thus be illustrated by showing a fixed frame $\{x, y, z\}$ and a frame $\{x_m, y_m, z_m\}$ linked to the eye. Frame $\{x, y, z\}$ has its origin at the point Q'. The axis x is the axis Q'O and it is orientated from the lens towards the eye. The y axis is vertical and orientated upwardly. The z axis is such that the frame $\{x, y, z\}$ be orthonormal and direct. The frame $\{x_m, y_m, z_m\}$ is linked to the eye and its center is the point Q'. The $x_m$ axis corresponds to the gaze direction JQ'. Thus, for a primary gaze direction, the two frames $\{x, y, z\}$ and $\{x_m, y_m, z_m\}$ are the same.

It is known that the properties for a lens may be expressed in several different ways and notably optically. The value in optic terms can be expressed for gaze directions. Gaze directions are usually given by their degree of lowering and azimuth in a frame whose origin is the center of rotation of the eye. When the lens is mounted in front of the eye, a point called the fitting cross is placed before the pupil or the center of rotation of the eye for a primary gaze direction. The primary gaze direction corresponds to the situation where a wearer is looking straight ahead. In the chosen frame, the fitting cross is thus given by a lowering angle of 0° and an azimuth angle of 0°.

Figure 1:
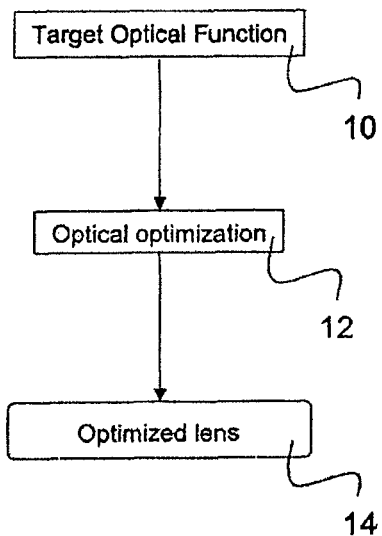
FIG. 1 shows a schematic flowchart for a carrying out an optical optimization according to the prior art.

A method for determining target optical functions for a pair of ophthalmic lenses is proposed. It should be understood in this context that this method is to be implemented in a method for optical optimization of a pair of ophthalmic lenses such as the one of FIG. 5. This method comprises a step 16 of choosing an initial pair of lenses. Target optical functions are determined according to the method for determining described below. This constitutes step 18, which enables a target optical function to be obtained for the first eye and a target optical function for the second eye to be obtained. Each lens is then optimized individually taking account of its respective target optical function as in a traditional optical optimization method of FIG. 1 or a method as described in the patent application EP-A-1 752 815. Thus, the method of FIG. 5 comprises steps 20 and 26 of defining current lenses, optical functions being associated to each lens of the pair of current lenses, the current pair of lenses being initially defined as the initial pair of lenses. The steps 20 and 26 are followed respectively by steps 22 and 28 of carrying out an optical optimization for minimizing the difference between the current optical functions and the target optical functions with a cost function. A cost function is a mathematical quantity expressing the distance between two optical functions. It can be expressed in different ways according to the optical criteria favored in the optimization.

In the sense of the invention, "carrying out an optimization" should preferably be understood as "minimizing" the cost function. Of course, the person skilled in the art will understand that the invention is not limited to a minimization per se. The optimization could also be a maximization of a real function, according to the expression of the cost function which is considered by the person skilled in the art. Namely "maximizing" a real function is equivalent to "minimizing" its opposite.

Used in combination with the method of determination of target optical functions according to the invention, such a method of optical optimization of a pair of ophthalmic lenses enables optimized lenses to be obtained having the same optical performance for each couple of gaze directions, one gaze direction relative to the first eye and the other one relative to the second eye are associated to see a given object. Indeed, it will be shown that, even in cases when the prescription for each eye is different, the method of determination of target optical functions according to the invention enables target optical function with improved symmetry to be obtained. Thus, the optimized lenses have improved binocular properties, which results in a better comfort for the wearer.

Figure 5:
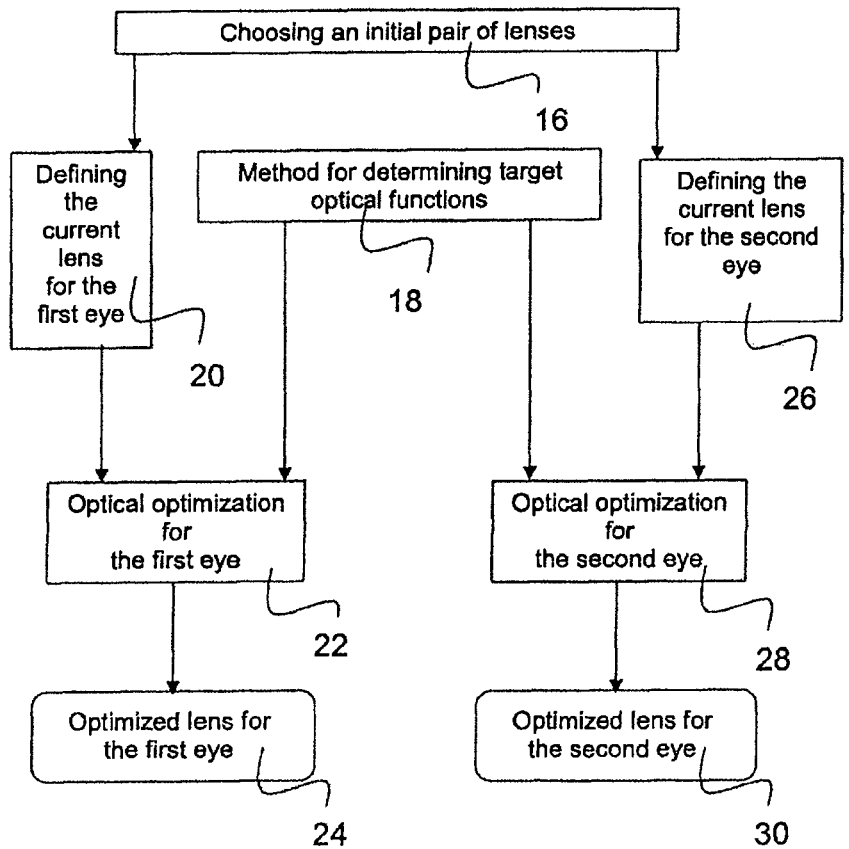
FIGS. 5, 6, 10, 11, 12, 13, 14, 15 and 16 show a schematic flowchart of the steps of different examples of methods for determining target optical function according to the invention.

In addition, if the method of optimization according to FIG. 5 is presented as two monocular optimizations, other possibilities may be considered such as a binocular optimization. A binocular optimization is a simultaneous optimization of two lenses of the pair of lenses.

The different embodiments of the method of determination of target optical functions according to the invention will now be described.

Figure 6:
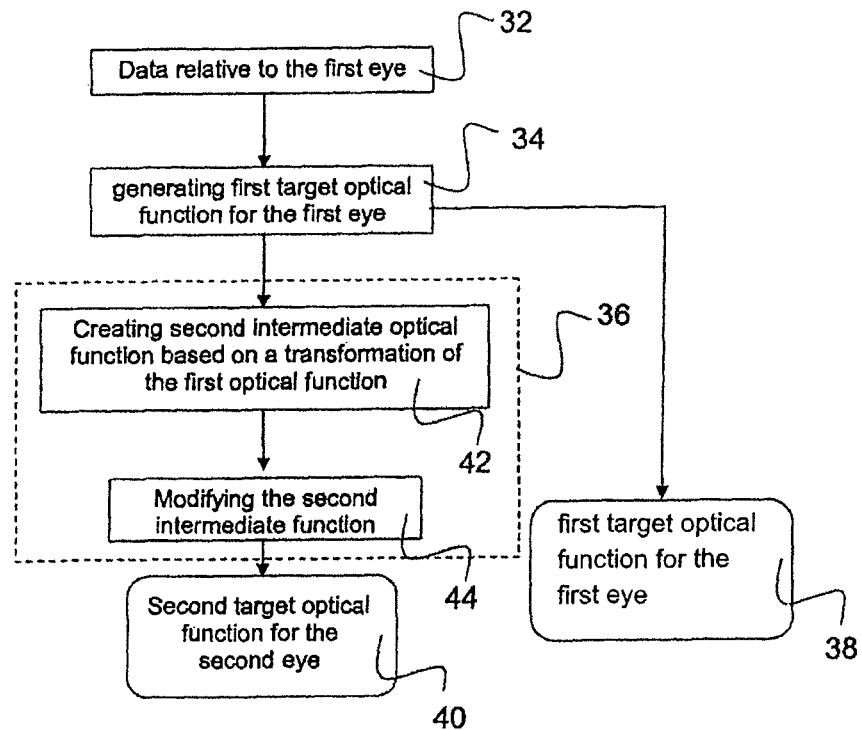

FIG. 6 illustrates a flowchart for the carrying out of an exemplary embodiment of the method for determination for target optical functions. The method for determination comprises a step 34 of generating a first target optical function for a first lens of the pair based at least on data relating to a first eye. The first target optical function will be labeled OFT1 in the following. Data relating to the first eye are schematically shown by the box 32 of the flowchart of FIG. 6. Such data can be data derived from monocular data linked to prescription data for the first eye (prescribed power also called sphere, prescribed astigmatism also called cylinder (value and axis), prescribed prism (value and orientation)) or a combination of prescription data (for example the mean power also called mean sphere S=prescribed power+prescribed astigmatism/2), monocular data linked to the level of High Order Aberration of the eye, data linked to the eye's biometry such as the position of the eye rotational center, position of the cornea, of the pupil, diameter of the pupil and binocular data giving information on the binocular behaviour of the two eyes and allowing to determine the main eye: the dominant eye, the sighting eye, the best visual acuity eye, the preferred eye, the eye which has the highest or the lowest level of high order of aberration, the eye which is the most or the least sensitive (blur sensitivity, contrast sensitivity . . . ). The term "ocular dominance" is, for instance, defined in Dictionary of visual science, 4eme édition. D Cline, H W Hofstetter, J R Griffin. The term "visual acuity" refers to acuteness or clearness of vision, which is dependent on the sharpness of the retinal focus within the eye and the sensitivity of the interpretative faculty of the brain. The term "blur sensitivity" represents the loss of acuity produced by a defocus introduced in front of the eye. The term "contrast sensitivity" refers to the ability to detect contrast. Contrast sensitivity is determined by measuring the minimum contrast detected. Although the minimum detected contrast is measured, what is usually shown is the opposite (the inverse), i.e. the contrast sensitivity.

The method of determination further comprises a step 36 of generating a second target optical function for a second lens of the pair based at least on data relating to the first eye. The second target optical function will be labeled OFT2 in the following. The data relating to the first eye used can be the same or different from the data relating to the first eye used at the step of generating the first target optical function.

When carrying out the method, two target optical functions OFT1 and OFT2 are consequently obtained. This is schematically shown by result boxes 38 and 40 of FIG. 6 which respectively correspond to the first target optical function OFT1 for the first lens and the second target optical function OFT2 for the second lens. This method enables target optical functions with improved symmetry to be obtained. In this context, improved symmetry means that the optical performances for a couple of gaze directions are closer. Thus, when using the target optical functions in an optical optimization method, lenses with improved binocular properties can be obtained. The comfort of the wearer of the pair of lenses is thus improved.

According to the example of the method of FIG. 6, the generating step 36 of the second target optical function OFT2 may further comprise several steps. The generating step 36 thus comprises a step 42 of creating a second intermediate optical function based on a transformation of the first optical function. The second intermediate optical function is qualified as intermediate by opposition with the term "target". Specifically, the term "intermediate" associated to an optical function means that the optical function is not intended to be used as a target optical function. In most cases, the intermediate optical function is only a calculated function which appears when carrying out the method for determining target optical functions and not a result of such method.

If we label the second intermediate optical function OFi2 and T1 the transformation in the remainder of the description, a mathematical relation can be expressed between the second intermediate optical function OFi2 and the first target optical function OFT1 which is:

$$OFi2 = T1(OFT1)$$

The transformation T1 of the first target optical function OFT1 may be any appropriate function. The transformation T1 may apply to any optical criterion of the first target optical function OFT1. In the context of the present invention and throughout the remainder of the description, the term "optical criterion" when used in relation with the term "target optical function" should be understood as an optical quantity (optical criterion value) which is the result of the evaluation of the optical criterion for a given gaze direction. As examples of optical criteria, power and astigmatism can be cited. More details about optical criteria (definition and evaluation) can be found in co-pending patent application EP-090305949 which was filed on Oct. 7, 2009 at the EPO. This transformation T1 may modify several optical criteria of the first optical function OFT1 at the same time.

In many cases, the transformation T1 is applied for every gaze direction. However, the transformation T1 may only apply to a limited number of gaze directions. For instance, the transformation T1 may only be applied for the central area of view or the peripheral area of viewing. This enables to facilitate the calculation.

The transformation T1 may be various kinds of functions, notably linear ones and non-linear ones. Shift and homothetic transformation are examples of linear functions whereas square root or squaring functions illustrate possible non-linear functions.

Additionally, the transformation T1 may vary according to the optical criteria considered. For instance, the transformation T1 may be a specific function for power (a shift) and another one for residual astigmatism (identity transformation).

Figure 7:
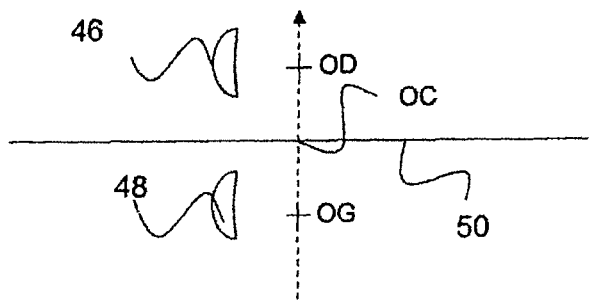
FIGS. 7 and 9 are diagrammatic views of two eyes with a plane perpendicular to the line joining the two eye rotation centers of the wearer and passing, for instance, through the middle of the segment joining the two eye rotation centers.

Notably, the transformation T1 may be a symmetry in relation with the plane perpendicular to the line joining the two eye rotation centers of the wearer. For example, the plane is the plane passing through the middle of the segment joining the two eye rotation centers. Referring to FIG. 7 which is a diagrammatic view of two eyes and their corresponding lens 46 and 48, the plane is designated by reference numeral 50 and the middle of the two eye rotation centers by reference OC and therefore, the plane corresponds to the median plane of the segment formed by the eye rotation centers of each eye, respectively labelled OG and OD. Moreover, the position of the point OC can be perzonalized according to the wearer data.

Figure 8:
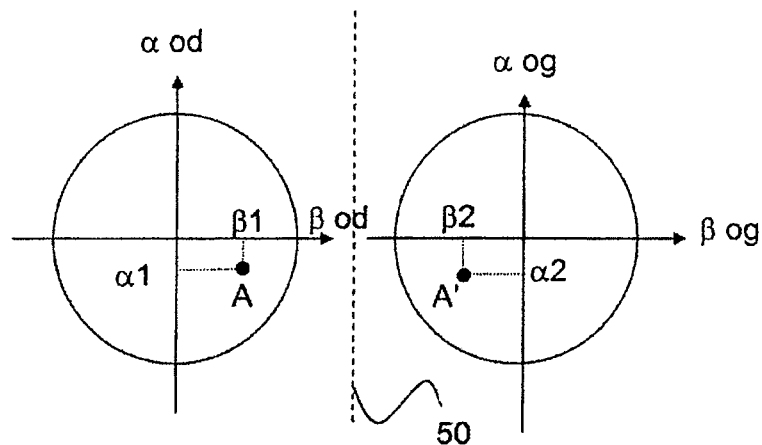
FIG. 8 shows, diagrammatically, the effect of a symmetry with relation to the plane perpendicular to the line joining the two eye rotation centers of the wearer and passing, for instance, through the middle of the segment joining the two eye rotation centers.

FIG. 8 is a diagrammatic view illustrating the effect of transformation T1 when T1 is a transformation with symmetry with respect to the plane perpendicular to the line joining the two eye rotation centers of the wearer and passing through OC. FIG. 8 represents two points A and A', A' being the image through transformation T1.

A corresponds to a gaze direction of lowering angle α1 and azimuth angle β1 for the first eye. According to the example of FIG. 8, the first eye is the right eye and in the description, the right eye will be considered as the first eye in the examples, keeping in mind that the left eye may also be the first eye. For this gaze direction, optical criteria labeled $C_{1A}, \ldots C_{NA}$ may be calculated for the first target optical function OFT1. Similarly, A' corresponds to a gaze direction of lowering angle α2 and azimuth angle β2 for the first eye. According to the example of FIG. 8, the second eye is the left eye. For this gaze direction, optical criteria labeled $C'_{1A}, \ldots C'_{NA}$ may be calculated for the second intermediate optical function OFi2.

When A and A' are symmetrical with relation to the plane perpendicular to the line joining the two eye rotation centers of the wearer and passing through the OC, the following relation between their respective angles can be defined as following:

α1=α2

β1=−β2

In order to make the Figure easier to read, FIG. 8 already takes into account the fact that the corresponding gaze direction through transformation T1 has, in this case, a azimuth angle that is the opposite and the same lowering angle.

Further, there is also a relation between the different optical criteria: they are equal. This can be expressed mathematically as for every integer i comprised between 1 and N, $C_i=C'_i$.

Transformation may also be a transformation T1 which ensures that each gaze direction forming a pair with relation to a given object has identical optical performances relating to their target optical function associated. Another way of formulating the same idea is as follows: by associating two gaze directions one to the first eye and one to the second eye for a given object, for each associated gaze direction, optical criteria of the target optical function of the first eye, the transformation ensures that said criteria values are the same for the target optical function to the second eye.

Figure 9:
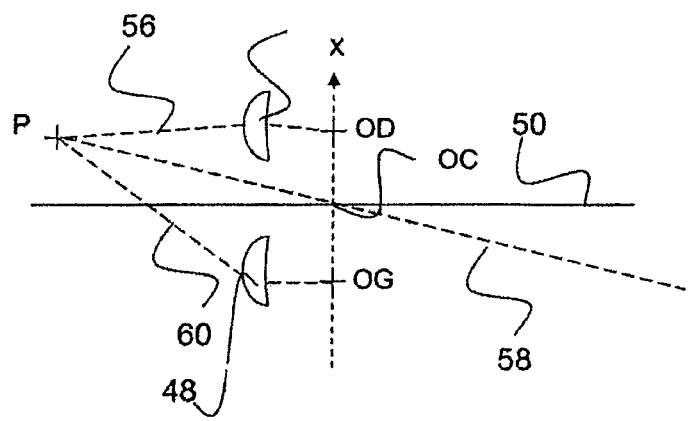

FIG. 9 illustrates more concretely this idea: gaze directions 56 and 60 form a pair for point P. According to the example of transformation T1 discussed, they are one-to-one images one of the other. In addition, there is also a link between the optical criteria values of the optical function of the first lens and the intermediate optical function of the second lens for these directions: they are equal. This can be expressed mathematically as for every pair of gaze direction which are linked by transformation T1 for the given object, and for each integer i comprised between 1 and N, $C_i=C'_i$.

In the method according to FIG. 6, the generating step 36 also encompasses a modifying step 44 of the second intermediate optical function OFi2 based on the prescription data for the second eye. Satisfaction of the prescription may be partial in cases when only a part of the prescription is considered, for example the mean sphere only.

The modifying step may be carried out by applying a modification function to the second intermediate optical function OFi2. This modification function is labeled $f2_{modification}$ in the following. The relation between the second intermediate optical function OFi2 and the second optical function OFT2 can be expressed in a mathematical way as:

$$OFT2 = f2_{modification}(OFi2)$$

The modification function $f2_{modification}$ may apply to any optical criterion of the second intermediate optical function OFi2. As examples, power and residual astigmatism can be cited. This modification function $f2_{modification}$ may modify several optical criteria of the second intermediate optical function OFi2 at the same time.

In many cases, the modification function $f2_{modification}$ is applied for every gaze direction. However, the modification function $f2_{modification}$ may only apply to a limited number of gaze directions. For instance, the modification function $f2_{modification}$ may only be applied for the central area of viewing or the peripheral area of viewing. In this case, calculation is easier, which enables to carry out the method more rapidly.

The modification function $f2_{modification}$ may be various kinds of functions, notably linear ones and non-linear ones. Shift and homothetic transformation are examples of linear functions whereas square root or squaring functions illustrate possible non-linear functions. Shifts are interesting transformations because they have the property of enabling the defect of the optical function to be preserved while enabling the desired prescription to be obtained. This is especially true for shift in power. Homothetic transformation may be advantageous when modifying the power profile of the progressive lens considered.

Additionally, the modification function $f2_{modification}$ may vary according to the optical criteria considered. For instance, the modification function $f2_{modification}$ may be a specific function for power (a shift) and another one for residual astigmatism (identity transformation).

The method according to the flowchart of FIG. 6 thus enables target optical functions with improved symmetry to be obtained. Thus, when using the target optical functions in an optical optimization method, a pair of lenses with improved binocular properties can be obtained. The comfort of the wearer of the pair of lenses is thus improved.

The method for generating optical functions for a pair of lenses can be more elaborate. This is the case of the method according to illustrates the one illustrated in flowchart of FIG. 10. The same references as those in FIG. 6 are kept where relevant.

The generating step 34 of the first target optical function OFT1 may comprise several steps. The generating step 34 thus comprises a step 62 of creating a first intermediate optical function based on data relating to the first eye. The first intermediate optical function will be labeled OFi1 in the following.

For instance, the creating step 62 may be carried out by creating an optical function suitable for a power prescription in far vision of $S_{first\ eye}-\Delta S/2$, wherein the quantity $S_{first\ eye}$ is the mean power calculated with data relative to the prescription of the first eye and wherein $\Delta S$ corresponds to the difference between the mean power calculated with data relative to the prescription of the first eye and the mean power calculated with data relative to the prescription of the second eye. This can be expressed mathematically as $\Delta S = S_{first\ eye} - S_{second\ eye}$. The optical function then generated represents the best distribution (for the power prescription $S_{first\ eye}-\Delta S/2$ in far vision) of all optical criteria values over all given gaze directions. The optical criteria which can be considered are, for example, optical power $P_{intermediate}(\alpha,\beta)$ and astigmatism $A_{intermediate}(\alpha,\beta)$.

Figure 10:
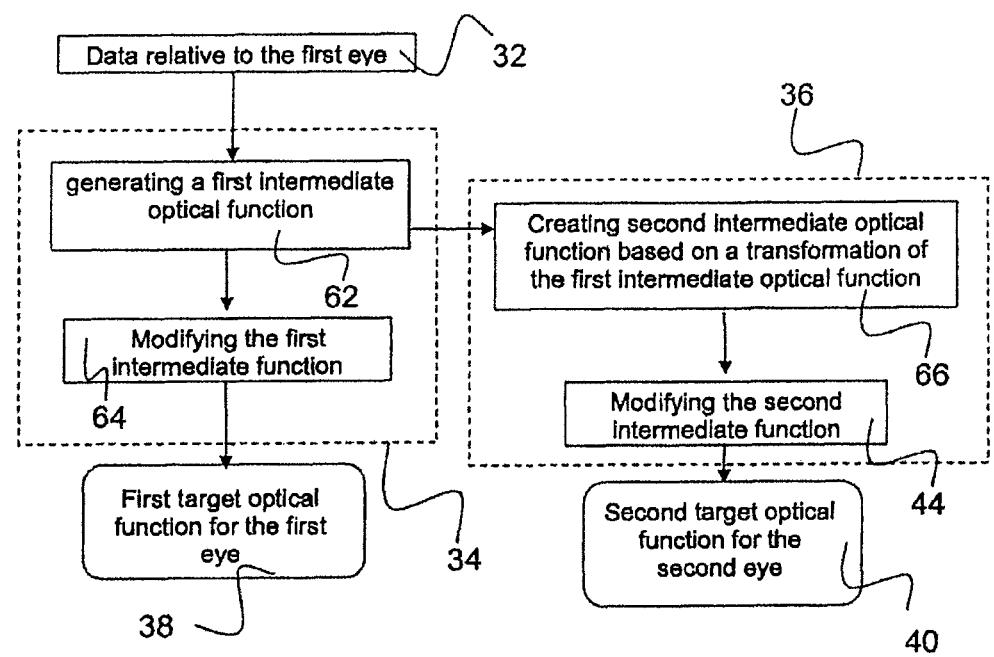

In the method according to FIG. 10, the generating step 34 also encompasses a modifying step 64 of the first intermediate optical function OFi1 based on the prescription data for the first eye.

The modifying step 64 may be carried out with a modification function applied to the first intermediate optical function OFi1. This modification function is labeled f1$_{modification}$ in the following. The relation between the first intermediate optical function OFi1 and the second optical function OFT1 can be expressed mathematically as:

$$OFT1 = f2_{modification}(OFi1)$$

This function f1$_{modification}$ may have the same properties as the function f2$_{modification}$ described previously.

When the creating step 62 enables to obtain an optical function suitable for a power prescription of $S_{first\ eye}-\Delta S/2$ to be obtained, the function f1$_{modification}$ used at the modifying step 64 may be a constant shift for all gaze directions on optical power criterion. For each gaze direction, the optical power criterion is calculated as follow: $P(\alpha,\beta) = P_{intermediate}(\alpha,\beta) + \Delta S/2$.

According to the example of the method of FIG. 10, the generating step 36 for the second target optical function OFT2 may also comprise several steps. The generating step 36 thus comprises a step 66 for creating a second intermediate optical function based on a transformation of the first intermediate optical function. If we label the second intermediate optical function OFi2 and T2 the transformation in the remainder of the description, a mathematical relation can be expressed between the second intermediate optical function OFi2 and the first intermediate optical function OFi1 which is:

$$OFi2 = T2(OFi1)$$

The transformation T2 of the first intermediate optical function may have the same properties as the transformation T1 described previously. Notably, for the example of creating an optical function suitable for a power prescription of $S_{first\ eye}-\Delta S/2$, the transformation T2 may be a symmetry in relation with the plane which is perpendicular to the line joining the two eye rotation centers of the wearer and passing, for instance, through the middle of the segment joining the two eye rotation centers.

In the method according to FIG. 10, the generating step 36 also encompasses a modifying step 44 of the second intermediate optical function OFi2 based on the prescription data for the second eye. Hence, here also, the relation between the second intermediate optical function OFi2 and the second optical function OFT2 can be expressed in a mathematical way as:

$$OFT2 = f2_{modification}(OFi2)$$

For the example of creating an optical function suitable for a power prescription of $S_{first\ eye}-\Delta S/2$, the function of modification f2$_{modification}$ may be a constant shift in power for each gaze direction by the quantity $-\Delta S/2$ that is $S_{second\ eye} - S_{first\ eye}$ over 2.

When carrying out the method, two target optical functions OFT1 and OFT2 are consequently obtained. This is schematically shown by result boxes 38 and 40 of FIG. 10 which respectively correspond to the first target optical function OFT1 for the first lens and the second target optical function OFT2 for the second lens. This method enables optical functions with improved symmetry to be obtained. Thus, when using the target optical functions in an optical optimization method, lenses with improved binocular properties can be obtained. The comfort of the wearer of the pair of lenses is thus improved.

So as to take into account the fact that some data relative to the two eyes are more relevant than others, the method according to the flowchart of FIG. 10 may be even more elaborate. The flowchart of FIG. 11 illustrates such an example of the method.

Compared to the method of FIG. 10, the step of generating the first intermediate function OFi1 is more detailed. The method comprises a step 68 of defining two sets of optical criteria. The first set is calculated thanks to data relative to the first eye. The optical criteria values are labeled as $\{V1(\alpha,\beta), \ldots, VN(\alpha,\beta)\}_{first\ eye}$. The second set is calculated thanks to data relative to the second eye. The optical criteria values are labeled as $\{V1(\alpha',\beta'), \ldots, VN(\alpha',\beta')\}_{second\ eye}$. For example, V1 is the criterion of optical power and V2 the criterion of astigmatism. The two set of optical criteria values have the same number of optical criteria, number which is labeled N in the following.

Figure 11:
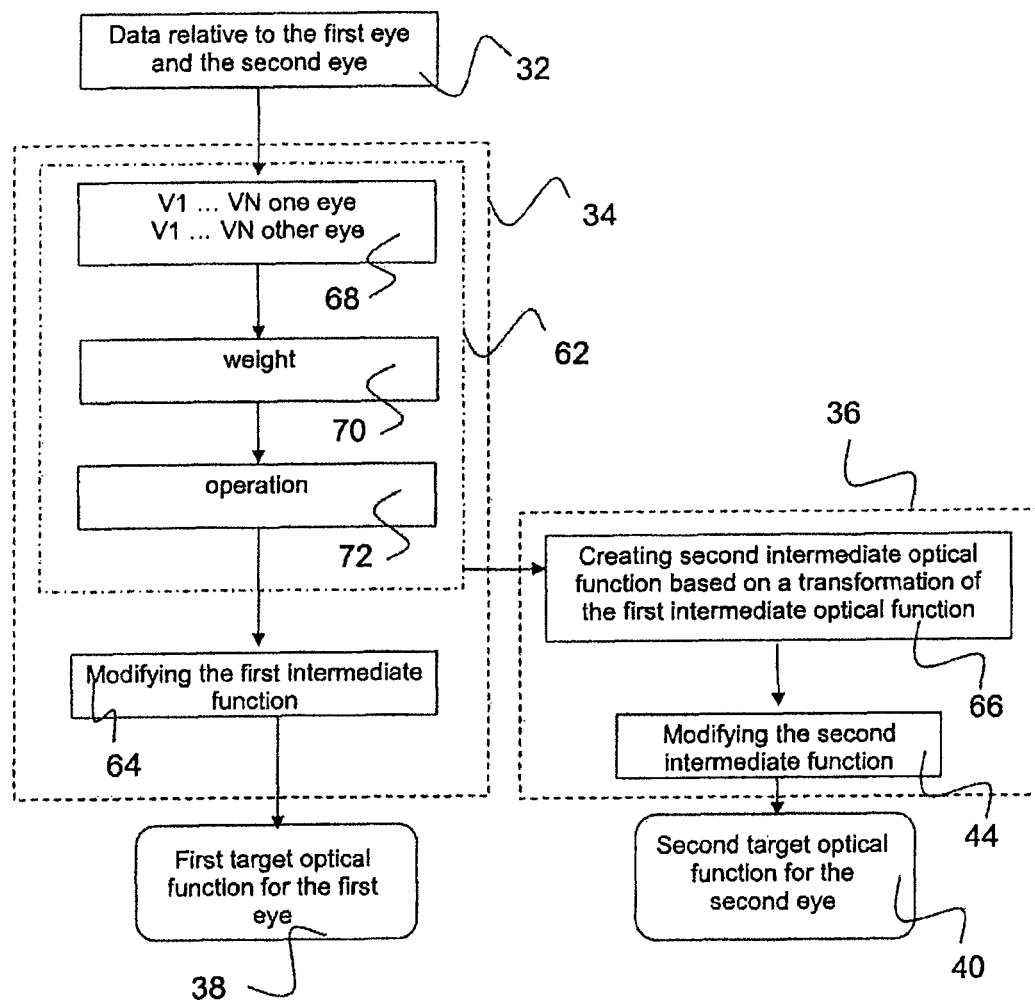

The method according to FIG. 11 further comprises the step 70 of determining a weighting coefficient γi based on data of the two eyes between each couple of optical criterion value Vi of the first set of optical criteria $\{V1(\alpha,\beta), \ldots, VN(\alpha,\beta)\}_{first\ eye}$ and of the second set of optical criteria $\{V1(\alpha',\beta'), \ldots, VN(\alpha',\beta')\}_{second\ eye}$. The weighting coefficient γi may for instance be representative of the role of the binocular vision.

Coefficients γi may for instance be taken from monocular data. For example, if the eye which is the most important is the eye which has the lowest prescription and if this eye is the first eye then γi may be equal to 1. This allows to favour the optical performances of the first eye which may have the most important role in the binocular vision.

Coefficients γi may also be taken from biometric or binocular data cited above. For example, if the eye which is the most important is the eye which is the dominant eye and if this eye is the first eye then $\gamma i$ may be equal to 1. This allows to favour the optical performances of the dominant eye which may have the most important role in the binocular vision.

The method according to FIG. 11 also comprises a step 72 of calculating a set of optical criteria labeled W1, ..., WN which will constitute the first intermediate optical function OFi1. The number of optical criteria N of the set of optical criteria W1, ..., WN corresponds to the number of data N of the set of data V1, ..., VN. The set of optical criteria W1, ..., WN is obtained by applying an operation O to the value of every optical criteria Vi of the two sets of optical criteria V1, ..., VN for both eyes. In other words, this can be expressed mathematically as:

$$(W1; \ldots; Wn)=O(V1\_\text{first eye}, V1\_\text{second eye}, \ldots VN\_\text{first eye}, VN\_\text{second eye})$$

In the specific case of the embodiment of FIG. 11, the operation O calculates the product of the weighting coefficient optical criteria for the eye $\gamma i$ considered added to the product of the difference of 1 and the weighting coefficient multiplied by the optical criteria between for the other eye. In other words, this is can be mathematically expressed as, for i from 1 to N:

$$Wi(\alpha,\beta)=\gamma i\, Vi(\alpha,\beta)_{\text{first eye}}+(1-\gamma i)Vi(\alpha',\beta'_{\text{second eye}})$$

wherein $(\alpha,\beta)$ et $(\alpha',\beta')$ are corresponding gaze directions (for example, the corresponding gaze direction may be a couple of gaze directions defined thanks to the following symmetry $\alpha'=\alpha$, $\beta=-\beta'$ defined above or for a couple of gaze directions allowing to see a given object)

Thus, the first intermediate optical function OFi1 takes into account parameters representative of the behavior of both eyes for specific criteria. For this reason, the first intermediate optical function OFi1 is better adapted to the wearer. As the first target optical function OFT1 and the second target optical function OFT2 are more or less directly deduced from the expression of the first intermediate optical function OFi1, the first target optical function OFT1 and the second target optical function OFT2 are also better adapted to the wearer. This is in addition to the fact that, as for the other method for determining, the target optical functions have an improved symmetry. Thus, when using the target optical functions in an optical optimization method, lenses with improved binocular properties can be obtained. The comfort of the wearer of the pair of lenses is thus improved.

A specific example of this method was already described if the data Vi considered is optical power and $\gamma i=\frac{1}{2}$. This example was presented in relation to FIG. 10 because in most cases, $\gamma i$ will be different to $\frac{1}{2}$ since this value corresponds to the same level for both eyes.

Figure 12:
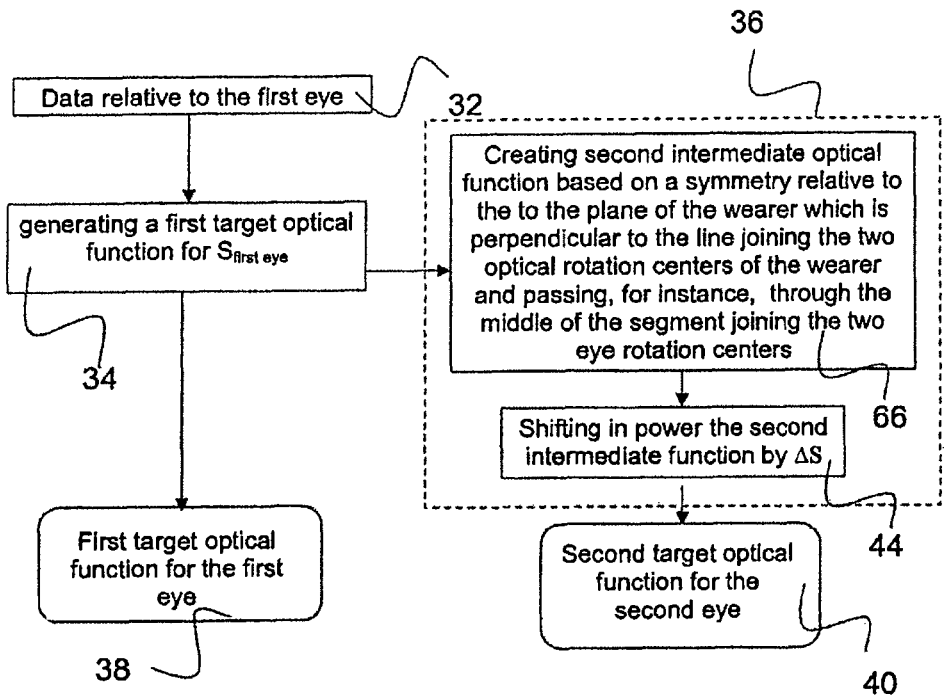

Another example is FIG. 12. In this case, the data Vi chosen is also the power but this time, $\gamma i=1$. This means that the first eye is the main eye. In this specific case, the first target optical function OFT1 is generated for a power corresponding to the prescribed power for the first eye which is the sphere $S_{\text{first eye}}$. In addition, T1 is a symmetry relative to the plane perpendicular to the line joining the two optical rotation centers of the wearer and passing, for instance, through the middle of the segment joining the two eye rotation centers and the function $f2_{\text{modification}}$ is a shift in power by a quantity $\Delta S$ previously defined. This specific method enables first and second target optical functions to be obtained which are adapted to a wearer for whom the first eye is the main eye.

All the various embodiments of the method of determination of target optical functions according to the invention already described have in common that the generating step of the first target optical function for a first lens of the pair is based at least on data relating to a first eye. However, these methods can provide results better adapted to the specific needs of the wearer by taking additional data into account. Similar reference numerals will be kept where relevant.

Figure 13:
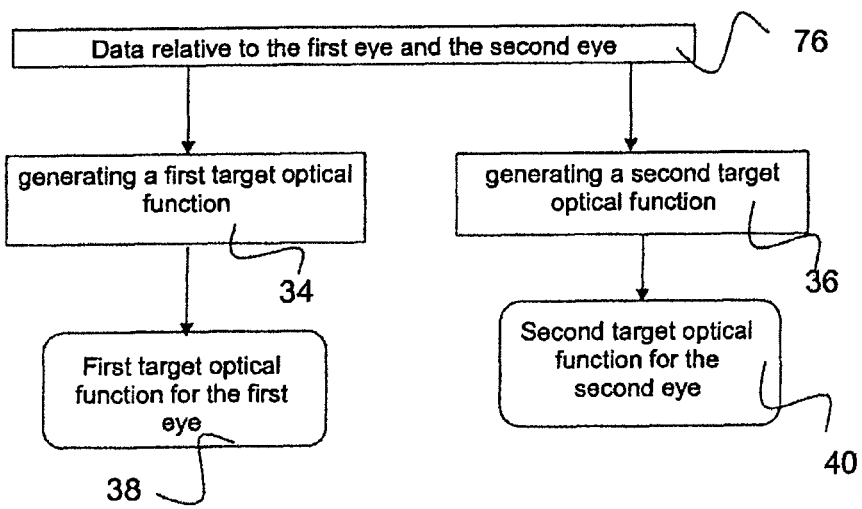

In particular, according to the method of FIG. 13, the generating step 34 of the first target optical function OFT1 as well as the generating step 36 of the second target optical function OFT2 is also based on data relating to the second eye. Data relating to the second eye may be the same kind of data as the one defined for the first eye.

In this method, the generating step 34 of the first target optical function OFT1 as well as the generating step 36 of the second target optical function OFT2 takes into account data relating to the first and the second eye. The box 76 of FIG. 13 schematically represents this dependency.

In addition to improve binocular performance, the method according to FIG. 13 provides target optical functions which are better adapted to the wearer since more data concerning his or her specific vision problem of problems are taken into account.

Figure 14:
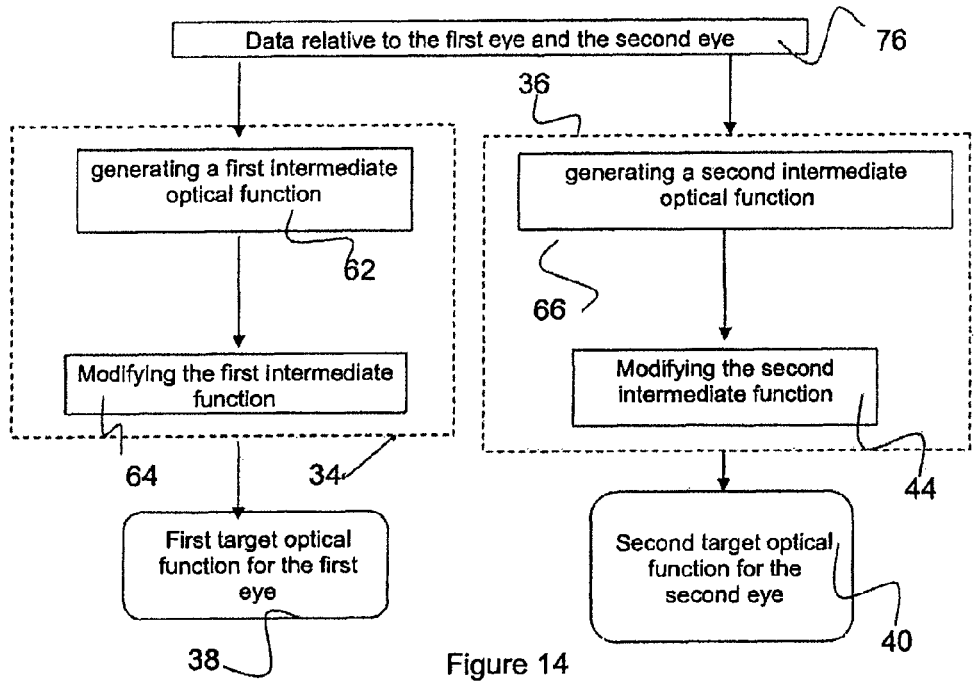

The flowchart of FIG. 14 illustrates an example of the embodiment in accordance with FIG. 13. The generating step 34 of the first target optical function OFT1 comprises the step 62 of generating a first intermediate optical function. This step 62 creates a first intermediate optical function OFi1 based on a first calculated set of optical criteria $\{W1, \ldots, WN\}_{\text{first eye}}$. The set of optical criteria W1, ..., WN is obtained by applying an operation relating to the first eye $O_{\text{first eye}}$ on data relating to the first eye and to the second eye. For clarity the first calculated set of optical criteria and the operation $O_{\text{first eye}}$ are not mentioned on FIG. 14, The optical criteria W1, ..., WN may have the same properties as described before. The operation $O_{\text{first eye}}$ will be described below.

The generating step 34 further encompasses a step 64 of modifying the first intermediate optical function OFi1 based on the prescription data for the first eye. This step can be carried out with the modification function $f1_{\text{modification}}$ described before.

The generating step 44 of the second target optical function OFT2 comprises the step 66 of creating a second intermediate optical function OFi2 based on a second calculated set of optical criteria $\{W1, \ldots, WN\}_{\text{second eye}}$. The second set of optical criteria $\{W^1, \ldots, WN\}_{\text{second eye}}$ is obtained by applying an operation relating to the second eye $O_{\text{second eye}}$ on data relating to the second eye and to the first eye. Similarly to the case of the first eye, the second calculated set of optical criteria and the operation $O_{\text{second eye}}$ are not mentioned on FIG. 14, The operation relating to the first eye $O_{\text{first eye}}$ and the operation relating to the second eye $O_{\text{second eye}}$ are any operation which have the properties of being "corresponding operations". This term of "corresponding operations" means that when the operation $O_{\text{first eye}}$ is expressed in relation with the first eye and the second eye, the operation $O_{\text{second eye}}$ is the same with the role of the first eye and the second eye being exchanged. In other words, this means mathematically that:

$$O_{\text{first eye}}(\text{data relating to the first eye, data relating to the second eye})=O_{\text{second eye}}(\text{data relating to the second eye, data relating to the first eye})$$

As an example, if, for the first eye which has a mean power prescription $S_{\text{one eye}}$, the intermediate optical function considered is suitable for a mean power prescription of $S_{\text{one eye}}-\Delta S/2$, and if, for the second eye which has a mean power prescription $S_{\text{other eye}}$, the intermediate optical function considered is suitable for a mean power prescription of $S_{other\ eye}+\Delta S/2$, the operations used at the step 62 and at step 66 are corresponding operations since the two intermediate optical functions are created thanks to corresponding mean power prescriptions: $S_{one\ eye}-\Delta S/2$ and $S_{other\ eye}+\Delta S/2$.

With this correspondance between the operation relating to the first eye and the operation relating to the second eye, this method according to the flowchart of FIG. 14 may be qualified as a parallel method in so far as similar rules are applied to both eyes.

The generating step 36 further encompasses a step 44 of modifying the second intermediate optical function OFi2 based on the prescription data for the second eye. This step 44 can be carried out with the modification function $f2_{modification}$ described before.

The target optical functions OFT1 and OFT2 obtained after carrying out the method have improved symmetry. Thus, when using the target optical functions in an optical optimization method, lenses with improved binocular performance can be obtained. The comfort of the wearer of the pair of lenses is thus improved.

Figure 15:
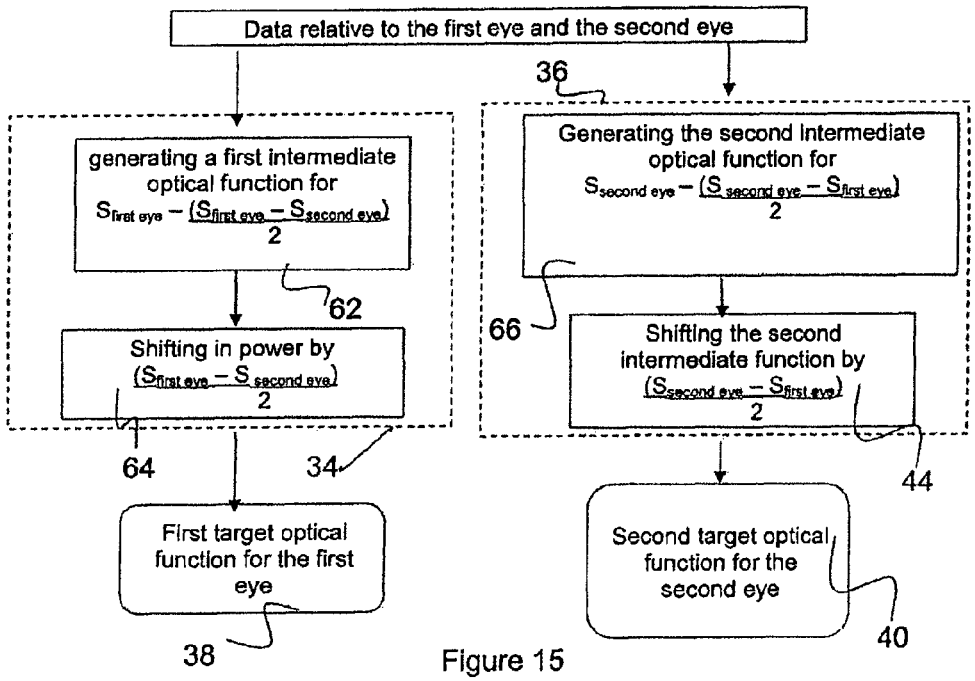

The specific case where the application considered is the application which associates to the data prescribed power of one eye $S_{one\ eye}$ the criteria $S_{one\ eye}-(S_{one\ eye}-S_{other\ eye})/2$ corresponds to the example of the method for determining target optical functions according to FIG. 15. According to this example, the modification function $f1_{modification}$ is a shift in power by $(S_{first\ eye}-S_{second\ eye})/2$ and the modification function $f2_{modification}$ is a shift in power by $(S_{second\ eye}-S_{first\ eye})/2$. In this case, the modification functions are corresponding application in the sense explained before. Such an example presents the advantage of being easy to carry out.

So as to take into account other data relating to the wearer and improve the comfort of the wearer, the method according to the flowchart of FIG. 14 may be further developed to take account of additional criteria. The flowchart of FIG. 16 illustrates such an example of the method.

Figure 16:
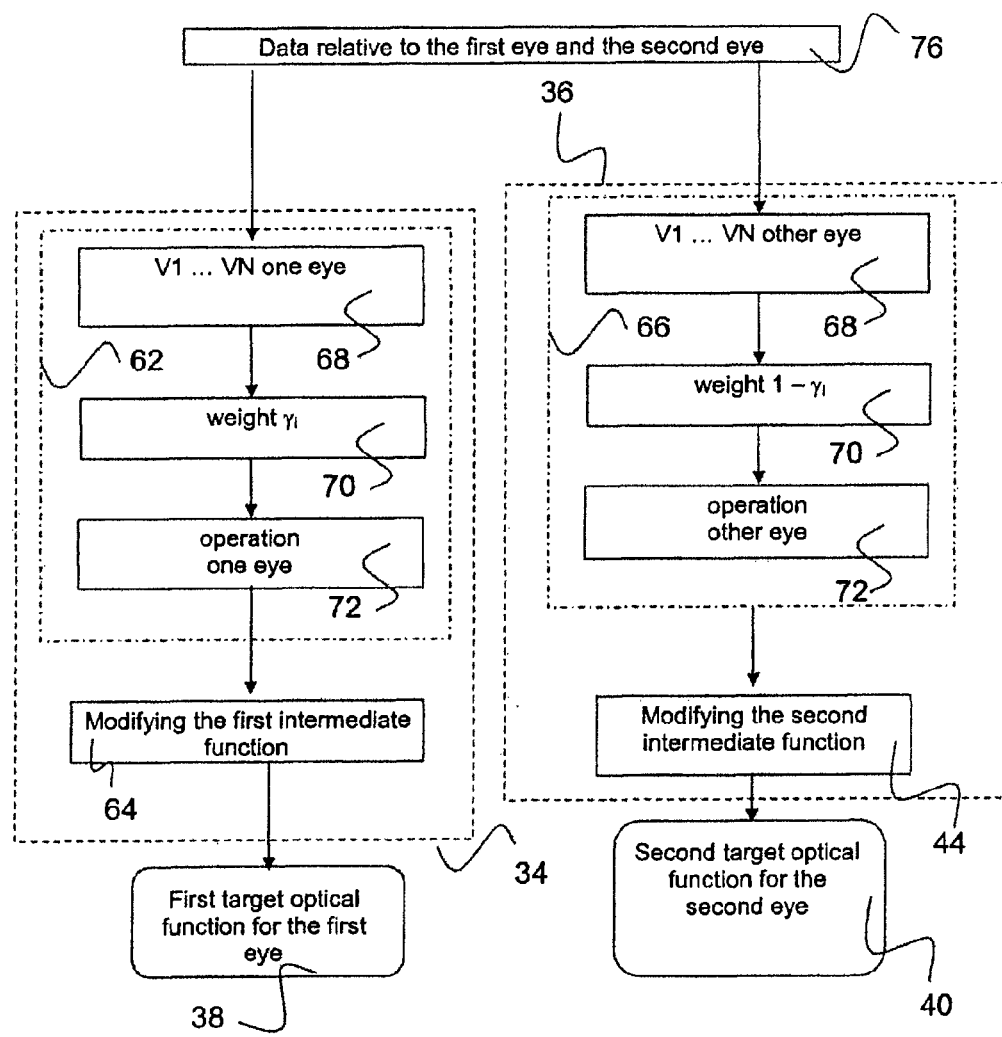
Figure 17:
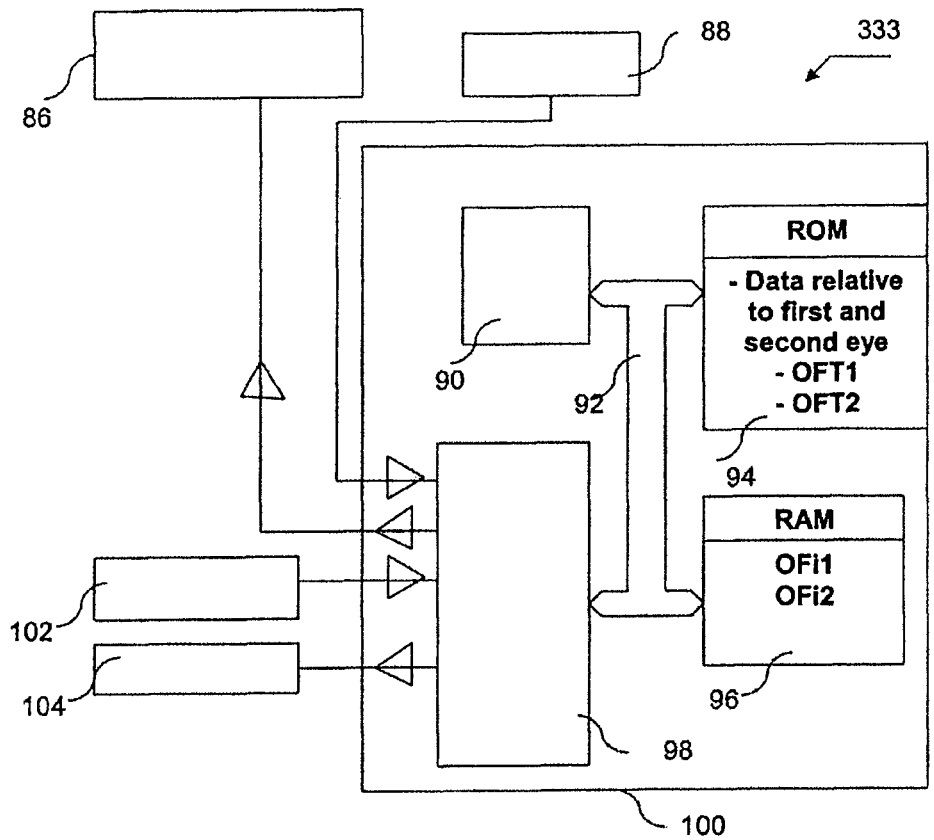
FIG. 17 is a diagram of a computer implementing the method for determining target optical function according to the invention.

Like in the method of FIG. 11, step 62 of FIG. 16 comprises the step 68 of defining two sets of optical criteria values. The first set is calculated thanks to data relative to the first eye. The optical criteria values are labeled as $\{V1(\alpha,\beta), \ldots, VN(\alpha,\beta)\}_{first\ eye}$. The second set is calculated thanks to data relative to the second eye. The optical criteria values are labeled as $\{V1(\alpha',\beta'), \ldots, VN(\alpha',\beta')\}_{second\ eye}$. For example, V1 is the criterion of optical power and V2 the criterion of astigmatism.

The step also comprises a step 70 of determining a weighting coefficient $\gamma i$ based on data of the two eyes between each couple of optical criterion value Vi of the first set of optical criteria $\{V1(\alpha,\beta), \ldots, VN(\alpha,\beta)\}_{first\ eye}$ and of the second set of optical criteria $\{V1(\alpha',\beta'), \ldots, VN(\alpha',\beta')\}_{second\ eye}$. The method according to FIG. 11 also includes calculating step 72.

In addition, in the method of FIG. 16, the step 66 of generating the second intermediate optical function OFi2 comprises a step 70 of determining a weighting coefficient $\gamma i_{second\ eye}=1-\gamma i_{first\ eye}$ and a calculating step 72. Similarly to what was written before, this can for instance be mathematically expressed as, for i from 1 to N:

$$Wi_{first\ eye}(\alpha,\beta) = O1$$
$$= \gamma i_{first\ eye} Vi_{first\ eye}(\alpha,\beta) +$$
$$(1-\gamma i_{first\ eye})Vi_{second\ eye}(\alpha',\beta')$$

and $$Wi_{second\ eye}(\alpha',\beta') = O2$$
$$= \gamma i_{second\ eye} Vi_{second\ eye}(\alpha',\beta') +$$
$$(1-\gamma i_{second\ eye})Vi_{first\ eye}(\alpha,\beta)$$
$$= (1-\gamma i_{first\ eye})Vi_{second\ eye}(\alpha',\beta') +$$
$$\gamma i_{first\ eye} Vi_{first\ eye}(\alpha,\beta)$$

wherein $(\alpha,\beta)$ et $(\alpha',\beta')$ are corresponding gaze directions (for example, the corresponding gaze direction may be a couple of gaze directions defined thanks to the following symmetry $\alpha'=\alpha$, $\beta'=-\beta$ defined above or for a couple of gaze directions allowing to see a given object). It can further be noticed that the operations O1 and O2 as defined are specific examples of "corresponding" application as defined before.

According to one example, steps 62 and 66 may comprise several intermediate steps. A first intermediate optical function considered for the first eye is the one suitable for the same mean power prescription of $S_{one\ eye}$ ($Vi_{first\ eye}(\alpha,\beta)$), and a first intermediate optical function considered for the second eye is the one suitable for the same mean power prescription of $S_{other\ eye}$ ($Vi_{second\ eye}(\alpha',\beta')$). $\gamma i$ is determined thanks to a measure of the dominance and $\gamma i_{first\ eye}=\frac{1}{4}$.

The final intermediate optical functions for the first and second eyes are calculated as follow:

$$Wi_{first\ eye}(\alpha,\beta)=\tfrac{1}{4}Vi_{first\ eye}(\alpha,\beta)+\tfrac{3}{4}Vi_{second\ eye}(\alpha',\beta')$$

$$Wi_{second\ eye}(\alpha',\beta')=\tfrac{3}{4}Vi_{second\ eye}(\alpha',\beta')+\tfrac{1}{4}Vi_{first\ eye}(\alpha,\beta)$$

O1 and O2 are corresponding operations since intermediate optical functions are created thanks to the common data $\gamma i$.

This allows to obtain the same optical performances between the two optical functions since $Wi_{first\ eye}(\alpha,\beta)=Wi_{second\ eye}(\alpha',\beta')$ takes into account a binocular behaviour.

However, it is possible to introduce a weighting coefficient $k_i$ between $Wi_{first\ eye}(\alpha,\beta)$ and $Wi_{second\ eye}(\alpha',\beta')$ such as $Wi_{first\ eye}(\alpha,\beta)=k_i Wi_{second\ eye}(a',\beta')$. This would allow taking into account some binocular data which would allow to favour one intermediate optical function of one eye over the other one.

Thus, the intermediate optical functions OFi1 and OFi2 takes into account parameters representative of the behavior of both eyes for specific criteria. For this reason, the intermediate optical functions OFi1 and OFi2 are better adapted to the wearer. This is in addition to the fact that, as for the other method of determining, the target optical functions have an improved symmetry. Thus, when using the target optical functions in an optical optimization method, lenses with improved binocular properties can be obtained. The comfort of the wearer of the pair of lenses is thus improved.

The method for determining the target optical functions of a pair of lenses can be implemented on a computer. In this context, unless specifically stated otherwise, it is appreciated that throughout this specification discussions utilizing terms such as "computing", "calculating" "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

A computer program product comprising one or more stored sequence of instruction that is accessible to a processor and which, when executed by the processor, causes the processor to carry out the steps of the method is also proposed.

Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus. A computer-readable medium carrying one or more sequences of instructions of the computer program product is thus proposed. This enables to the computer program to be easily carried out anywhere.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Many apparatuses or processes may be used to obtain the pair of lenses using the target optical functions according to the method previously described. The processes often imply an exchange of a set of data. For instance, this set of data may comprise only target optical functions determined according to the method. This set of data may preferably further comprise data relating to the eyes of the wearer such that with this set, the pair of lenses can be manufactured.

Figure 18:
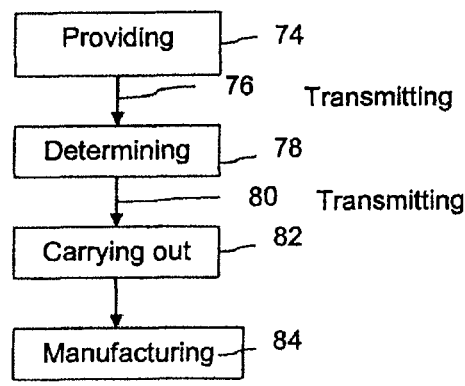
FIG. 18 is a flowchart of the steps of a method of manufacturing lenses according to the invention.

This exchange of data may be schematically understood by the apparatus of FIG. 18 which represents an apparatus 333 for receiving numerical data. It comprises a keyboard 88, a display 104, an external information center 86, a receiver of data 102, linked to an input/ouput device 98 of an apparatus for data processing 100 which is realized there as a logic unit.

The apparatus for data processing 100 comprises, linked between them by a data and address bus 92:
 a central processing unit 90;
 a RAM memory 96,
 a ROM memory 94, and
 said input/ouput device 98.

Said elements illustrated in FIG. 18 are well known for the person skilled in the art. Those elements are not described any further. However, it may be noticed that the ROM memory contains data relating to the eye and the target optical functions whereas the RAM memory contains intermediate optical functions. This facilitates the exchange of the set of data, which may happen when manufacturing a pair of lenses.

According to common practice, to obtain a pair of ophthalmic lenses corresponding to a wearer prescription, semi-finished ophthalmic lens blanks are provided by a lens manufacturer to the prescription labs. Generally, a semi-finished ophthalmic lens blank comprises a first surface corresponding to an optical reference surface, for example a progressive surface in the case of progressive addition lenses, and a second spherical surface. A standard semi-finished lens blank having suitable optical characteristics, is selected based on the wearer prescription. The back spherical surface is finally machined and polished by the prescription lab so as to obtain a sphero-torical surface complying with the prescription. An ophthalmic lens complying with the prescription is thus obtained.

However, when using the method for determining the target optical functions according to the invention, other method for manufacturing may be used. The method according to FIG. 18 is an example. The method for manufacturing comprises a step 74 of providing data relating to the eyes of the wearer at a first location. The data are transmitted from the first location to a second location at the step 76 of the method. The target optical functions are then determined at step 78 at the second location according to the method for determining previously described. The method for manufacturing may further comprise a step 80 of transmitting the target optical functions as it is the case in FIG. 18. The method also comprises a step 82 of carrying out an optical optimization based on the target optical functions, the target optical functions being transmitted or not. The method further encompasses a step of manufacturing 84 the pair of ophthalmic lenses according to the result of the optical optimization, at a second location. In an alternative embodiment, the manufacturing step 84 may be carried out in a third location. In this case, a further step of transmitting the data obtained by carrying out the step 82 from the second location to the third location is present.

Such method of manufacturing makes it possible to obtain a pair of lenses with good binocular properties even in the case of different prescriptions for the wearer's eyes.

The transmitting steps 76 and 80 can be achieved electronically. This enables to accelerate the method. The pair of lenses is manufactured more rapidly.

To improve this effect, the second location and the third location may just be two different systems, one devoted to calculation and the other to manufacturing, the two systems being situated in the same building. However, the two locations may also be two different companies, for instance one being a lens designer and the other one a laboratory.

For instance, the first location may be the lens ordering side, for example the eye care professional shop.

A set of apparatuses for manufacturing a pair of ophthalmic lenses, wherein the apparatuses are adapted to carry out the method for manufacturing is also disclosed.

The invention is further illustrated by the following examples.

GENERAL DESCRIPTION OF THE FIGURES OF THE EXAMPLES

Figure 19:
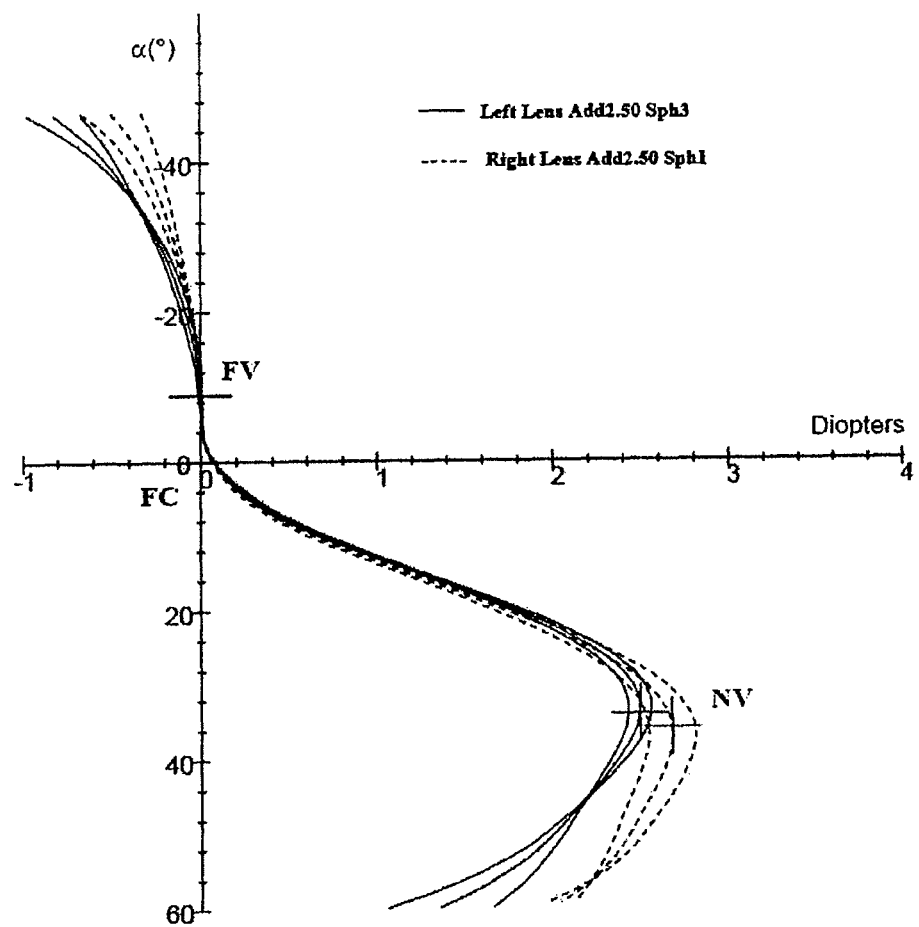
FIGS. 19 to 93 give optical analyses of the lenses considered.
Figure 93:
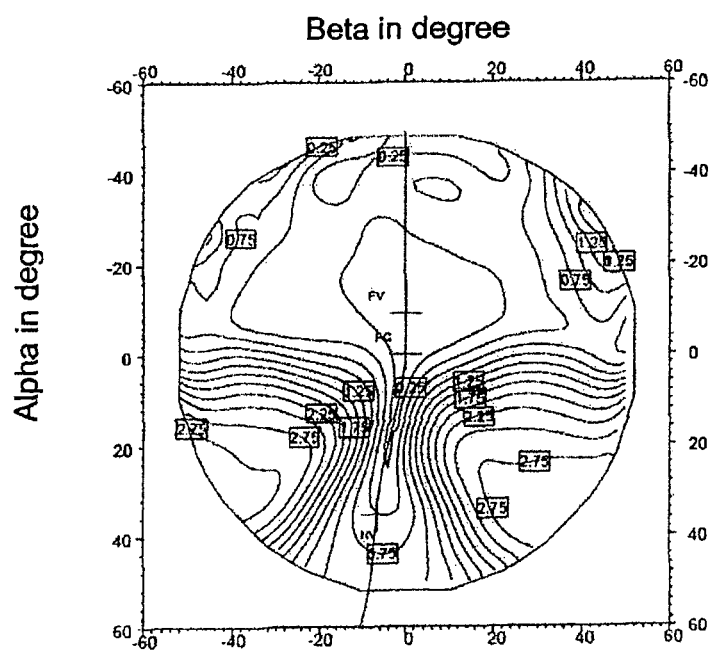

FIGS. 19 to 93 give optical analyses of the lenses considered.

The horizontal axis of FIGS. 19, 22, 25, 28, 31, 34, 37, 40, 43, 46, 49, 52, 55, 58, 61, 64, 67, 70, 73, 76 and 79 indicate the variations of the optical mean power along the meridian line with respect to the optical mean power value produced for the gaze direction corresponding to the far vision control point. The vertical axis indicates the values of the eye declination angle α, with positive values for eye directions oriented downwards. The reference eye direction is defined for the fitting cross. The continuous curve corresponds to mean optical power, which is calculated as an average value for planes containing the eye direction and rotated about this direction. The broken curves correspond to the maximum and the minimum optical power value produced in these planes.

FIGS. 23, 26, 32, 35, 38, 41, 50, 53, 56, 65, 68, 71, 74, 82, 84, 86, 88, 90 and 92 are optical mean power maps. FIGS. 20, 29, 44, 47, 59, 62, 77, and 80 are optical mean power defects maps. In these maps, the optical power defect is calculated for each gaze direction as follow: $Pd(\alpha,\beta)=P(\alpha,\beta)-S$ where $P(\alpha,\beta)$ is the optical mean power value of the lens for the gaze direction $(\alpha,\beta)$ and S is the optical power value for the gaze direction corresponding to the far vision $(\alpha\sim-8°,\beta\sim0°)$. These maps help to evaluate the difference between defects distribution over the two lenses. The vertical and horizontal coordinates of the maps are the values of the eye declination angle $\alpha$ and the eye azimuth angle $\beta$. The curves indicated in these maps connect eye directions which correspond to a same optical mean power value or optical mean power value defect. The respective optical mean power values or optical mean power values defects for the curves are incremented by 0.25 diopter between neighbouring curves, and are indicated on some of these curves.

FIGS. 21, 24, 27, 30, 33, 36, 39, 42, 45, 48, 51, 54, 57, 60, 63, 66, 69, 72, 75, 78, 81, 83, 85, 87, 89, 91 and 93 are residual astigmatism contour plots, with coordinates similar to those of the optical mean power maps. The curves indicated connect eye directions corresponding to a same astigmatism value.

When the figures are superimposed figures, the following convention is used: curve or surfaces relating to the right eye are represented in full line whereas curve or surfaces relating to the left eye are drawn in dot lines. Such superimposition is achieved by expressing the optical power profile with relative value and by representing the optical map in the same frame (the frame chosen is the frame suited for the right eye).

When relevant, some figures contain additional data relating to the specific values on particular points. More precisely, the value of mean sphere, the modulus of astigmatism and the axis of astigmatism are given for a reference point in the far vision zone (the point being labelled FV), a reference point in the near vision zone (the point being labelled NV) and for the fitting cross. These values are only given for one kind of figure when several kinds of figures are represented (profile and maps as explained earlier), but it should be understood that they are related to the optical function considered and thus also apply to the other kinds of figures.

Example 1

Prior Art

Example 1 corresponds to an example according to prior art. In this case, the power prescription in far vision is 1.0 δ for the right eye and 3.0δ for the left eye. Further, the addition prescribed is 2.75 δ for each eye. For this example 1, no astigmatism is prescribed for the wearer.

Figure 20:
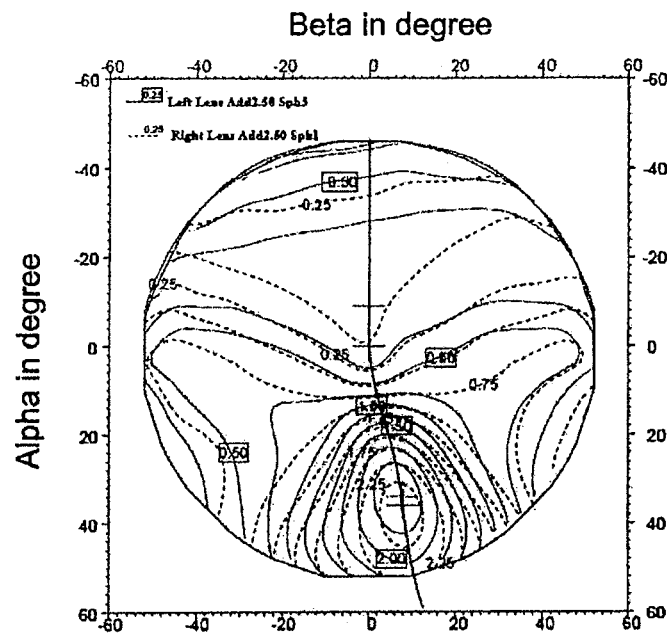
Figure 21:
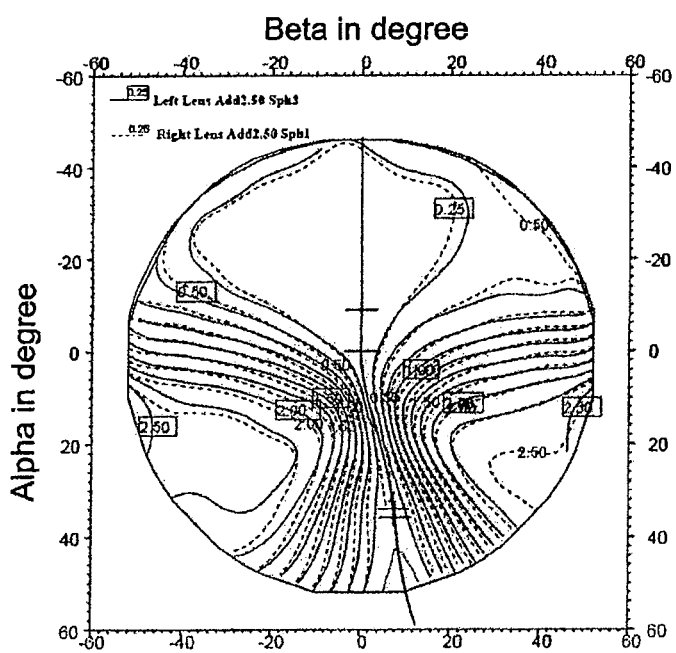
Figure 22:
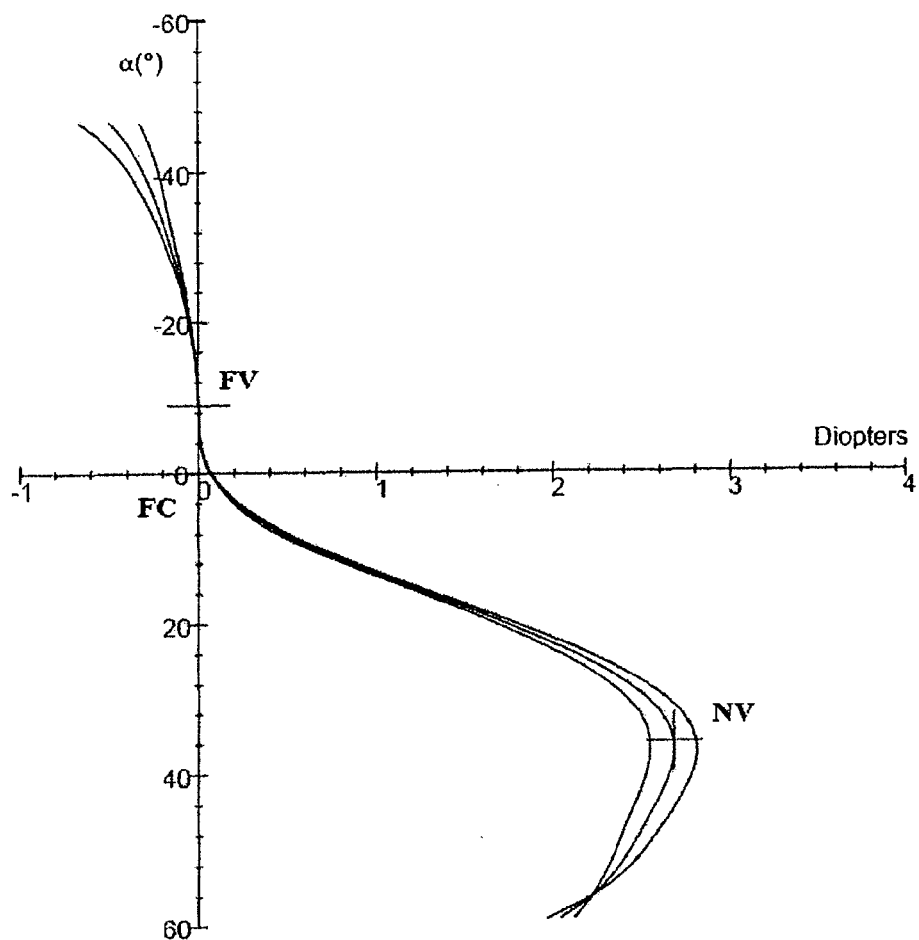
Figure 23:
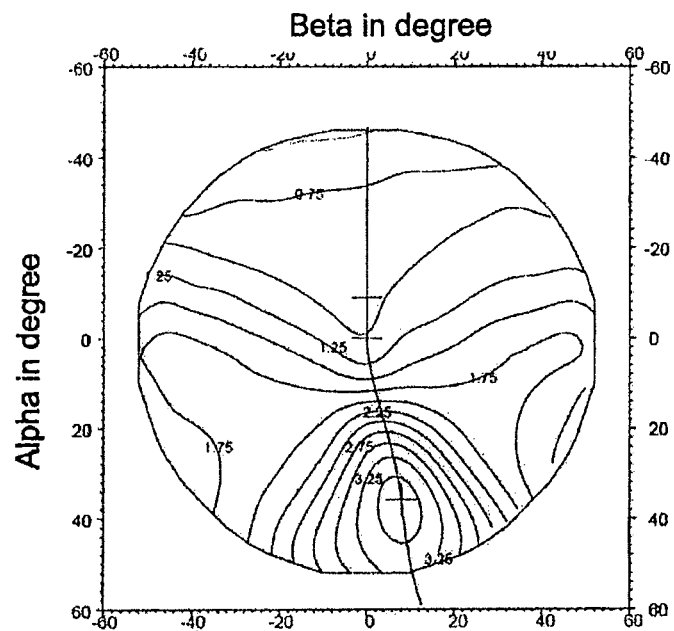
Figure 24:
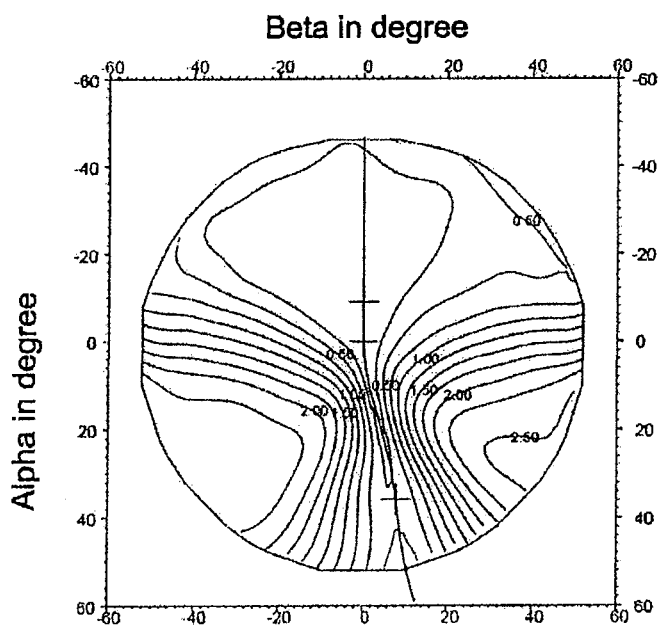
Figure 25:
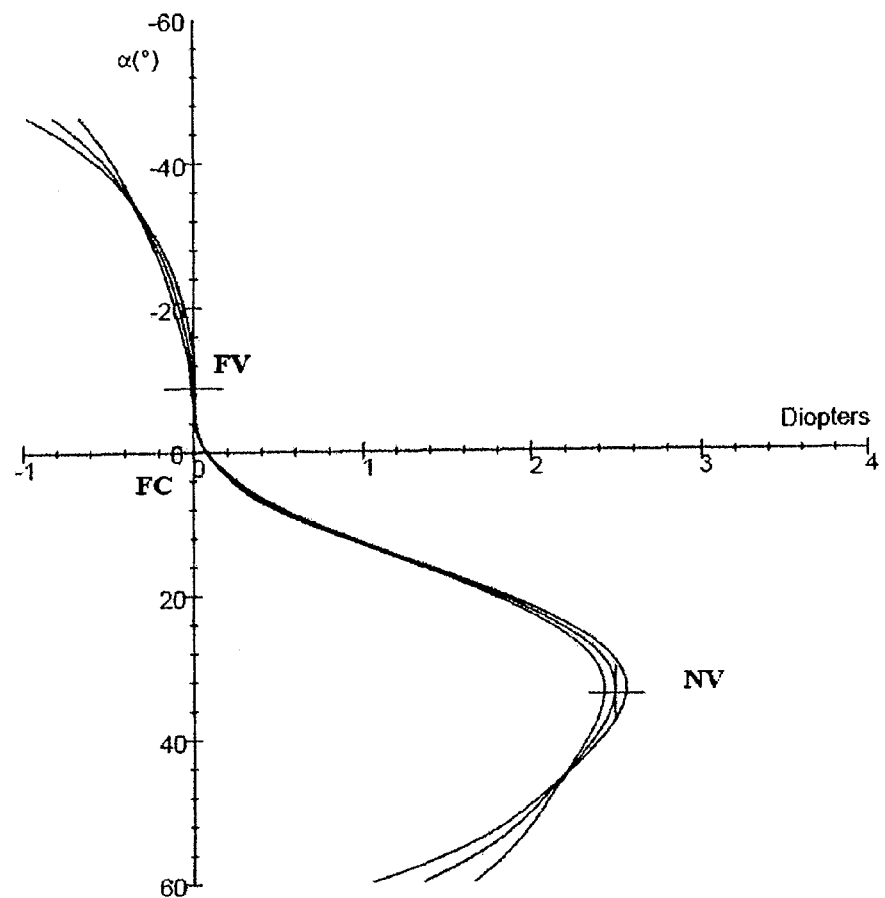
Figure 26:
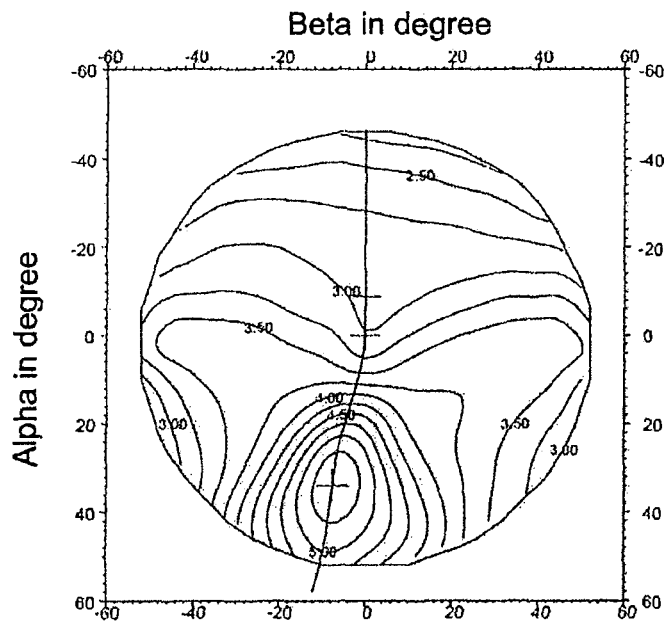
Figure 27:
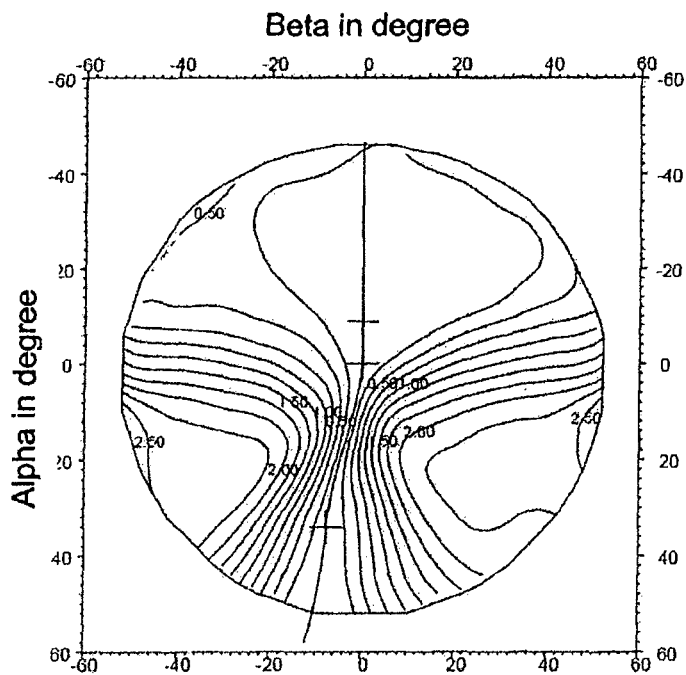
Figure 28:
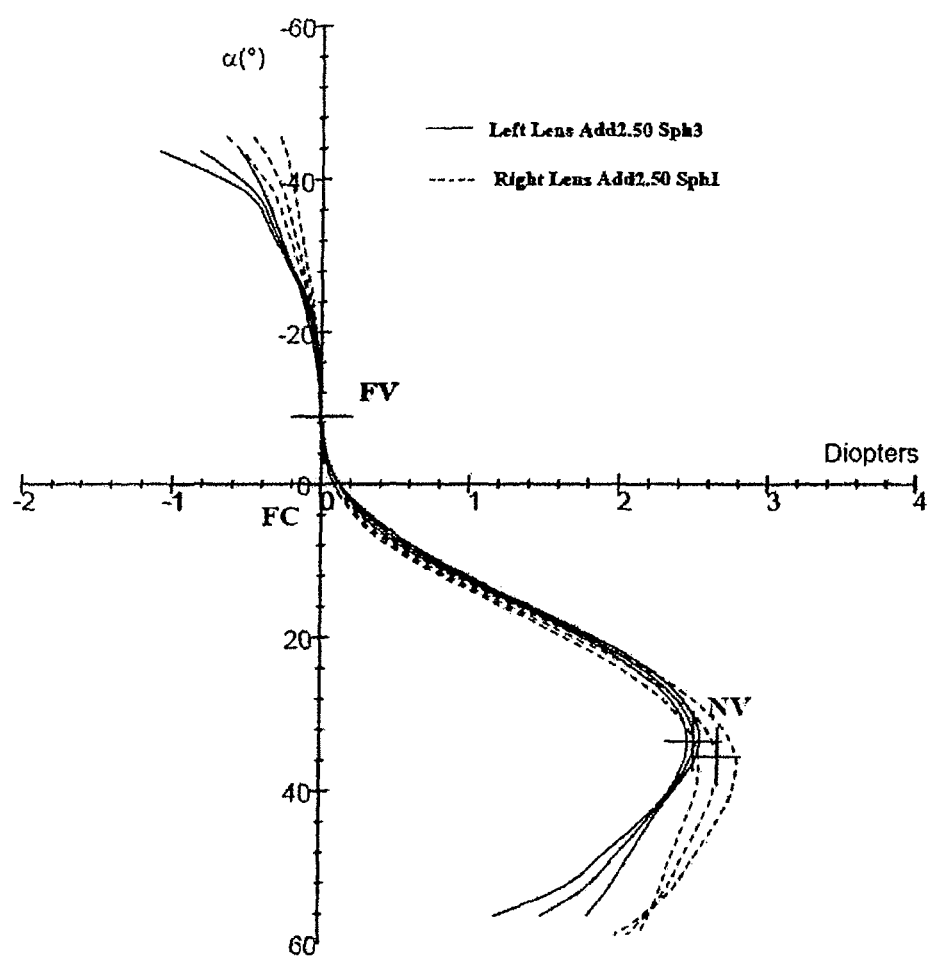
Figure 29:
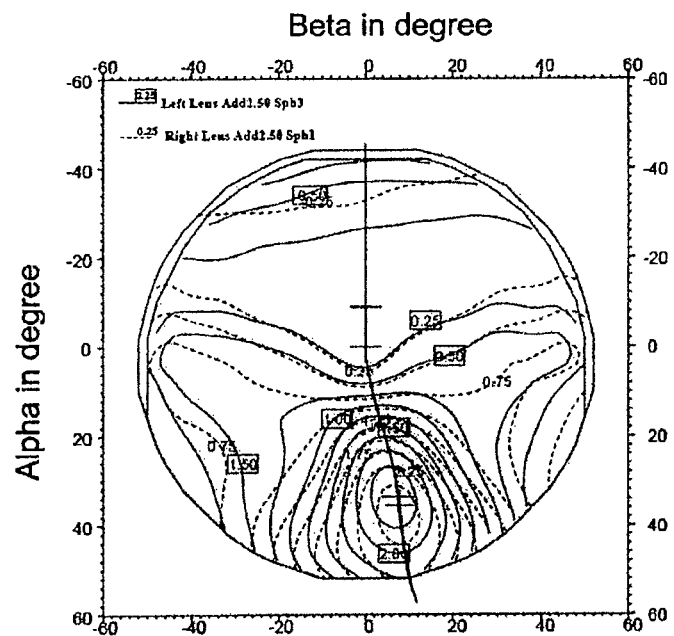
Figure 30:
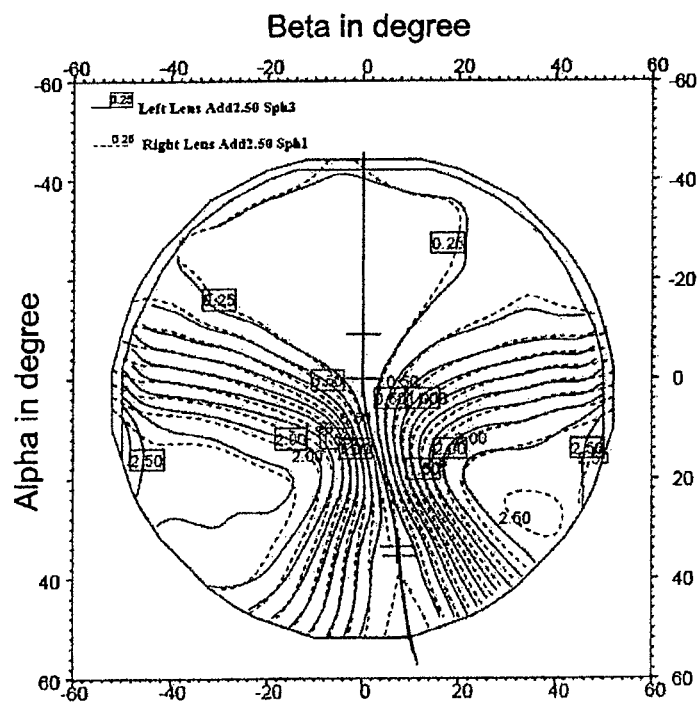
Figure 31:
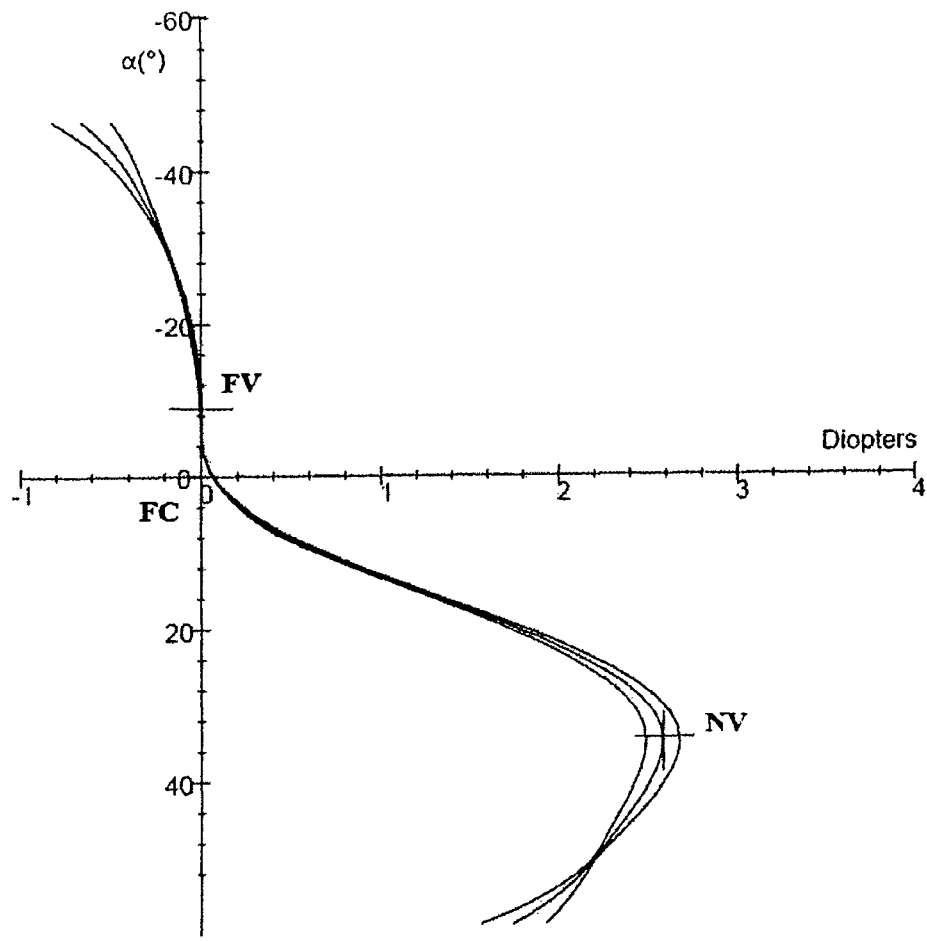
Figure 32:
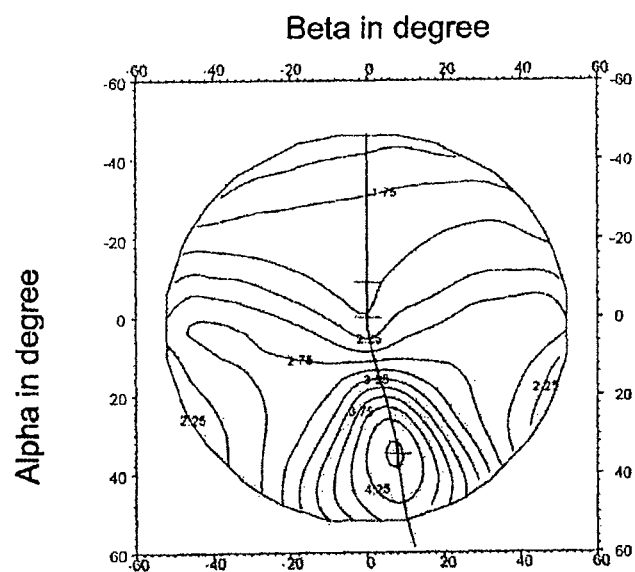
Figure 33:
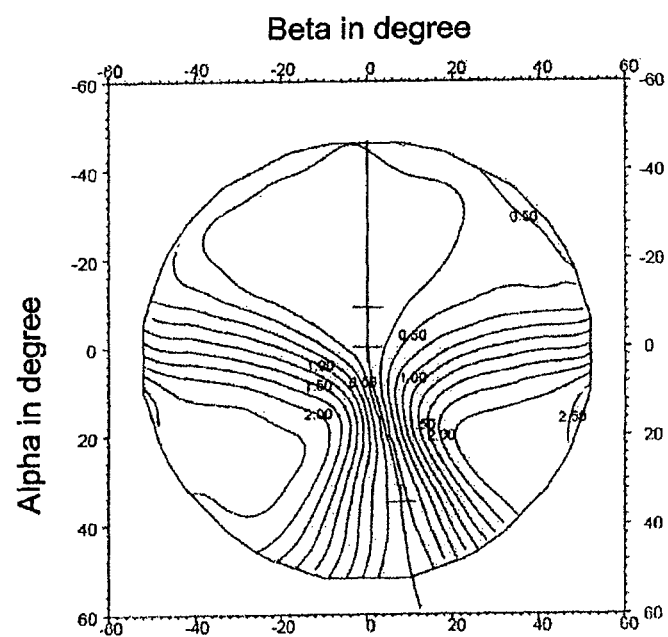
Figure 34:
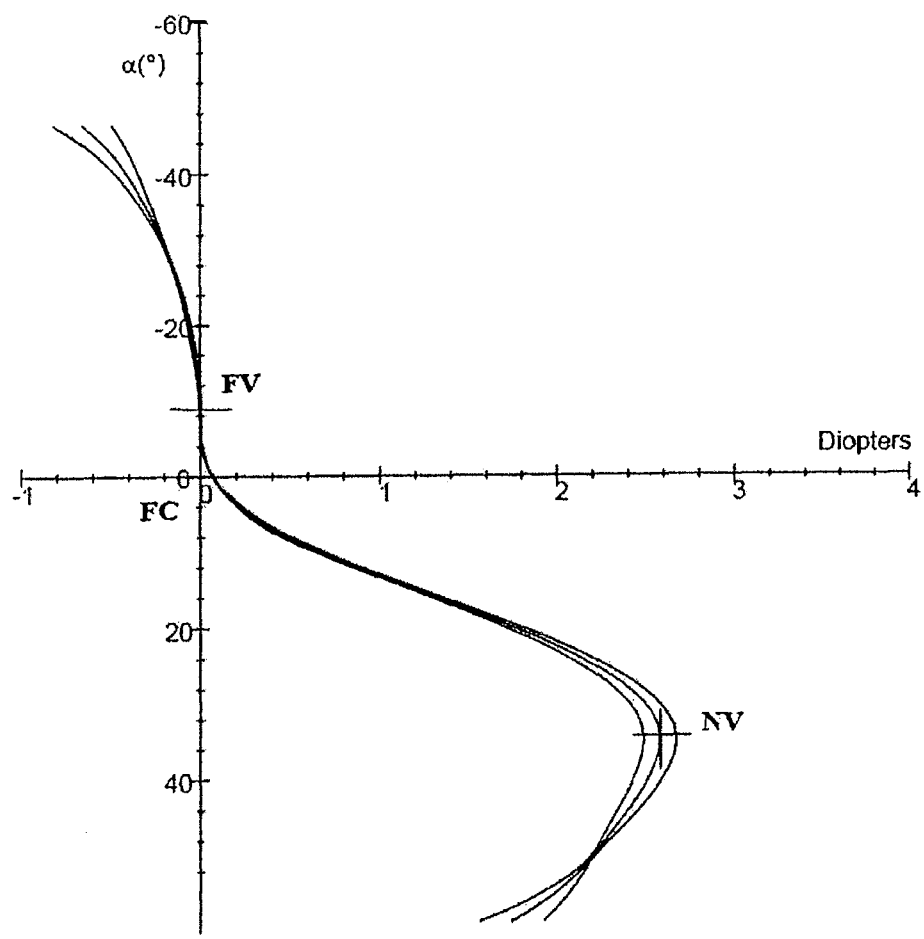
Figure 35:
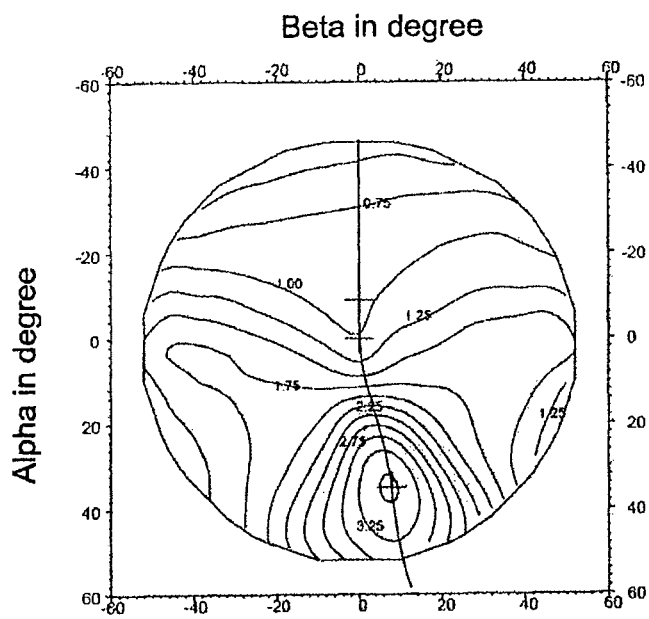
Figure 36:
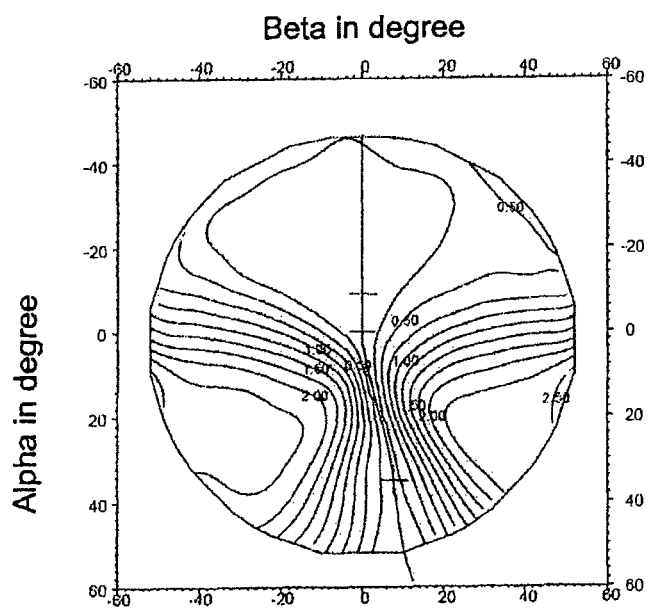
Figure 37:
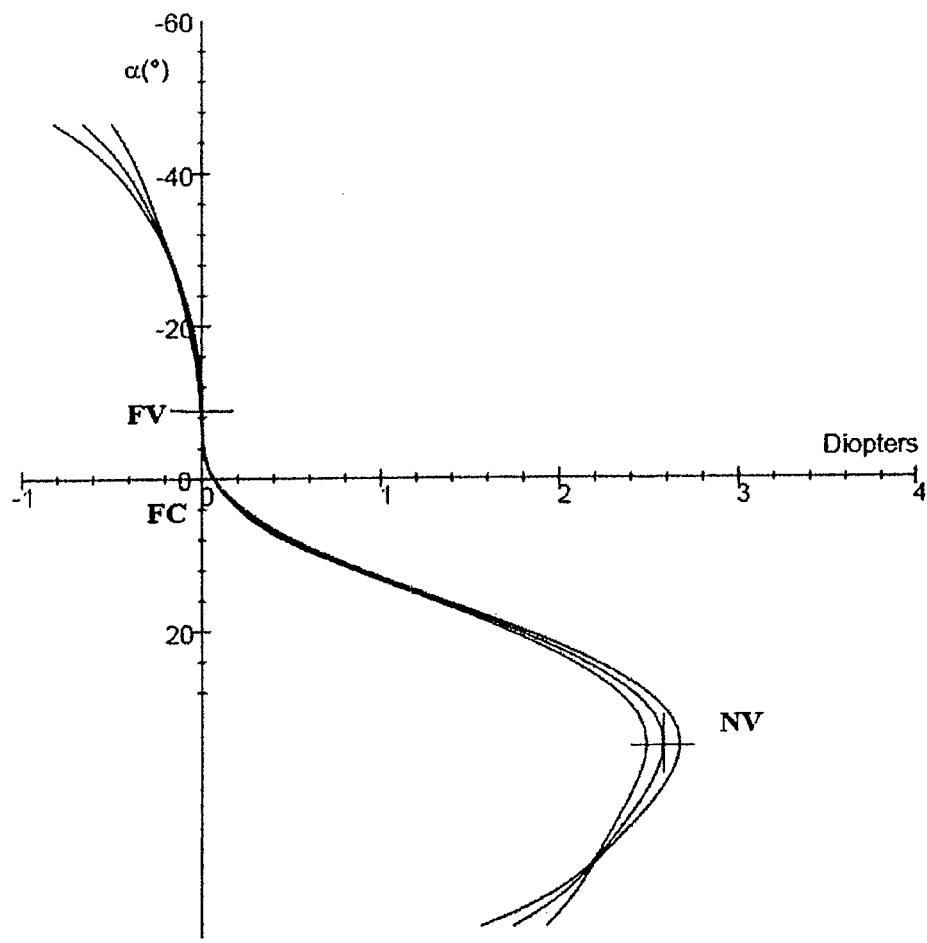
Figure 38:
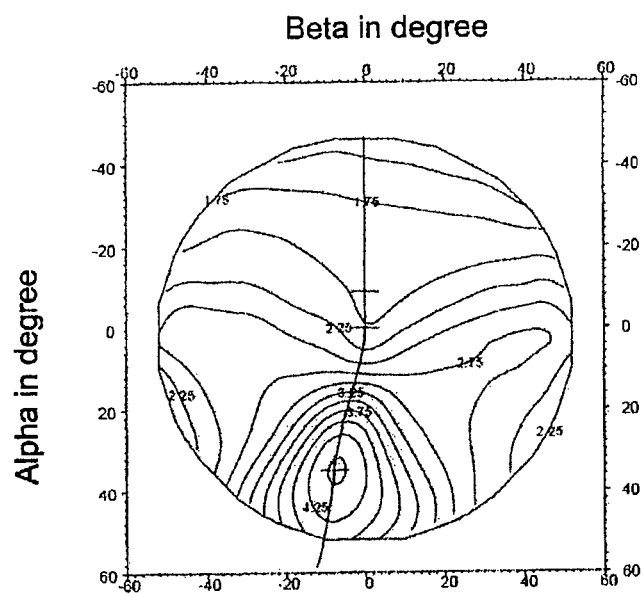
Figure 39:
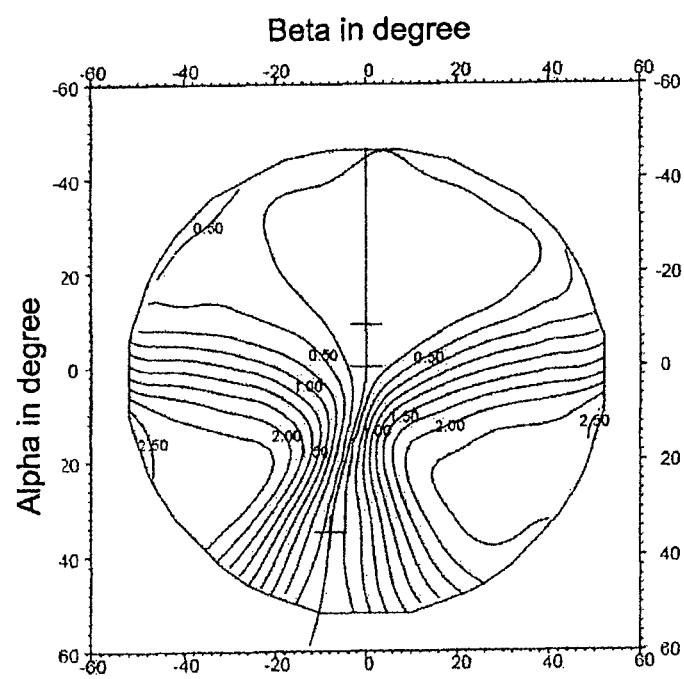
Figure 40:
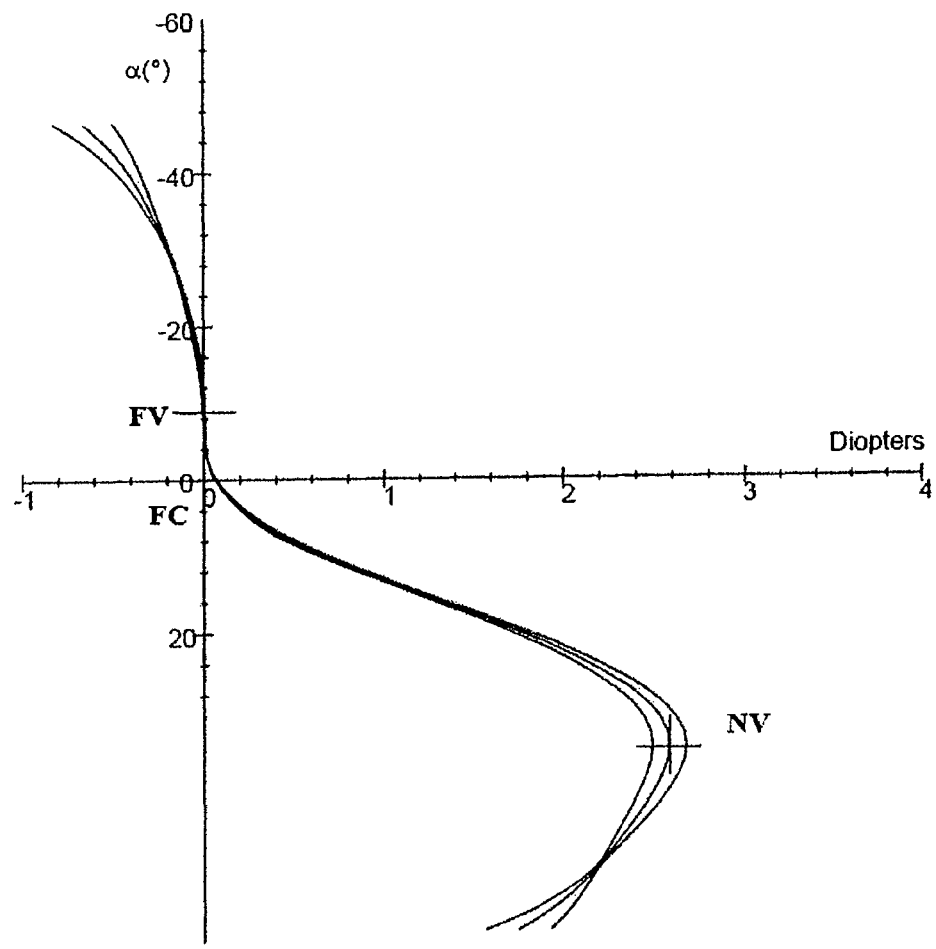
Figure 41:
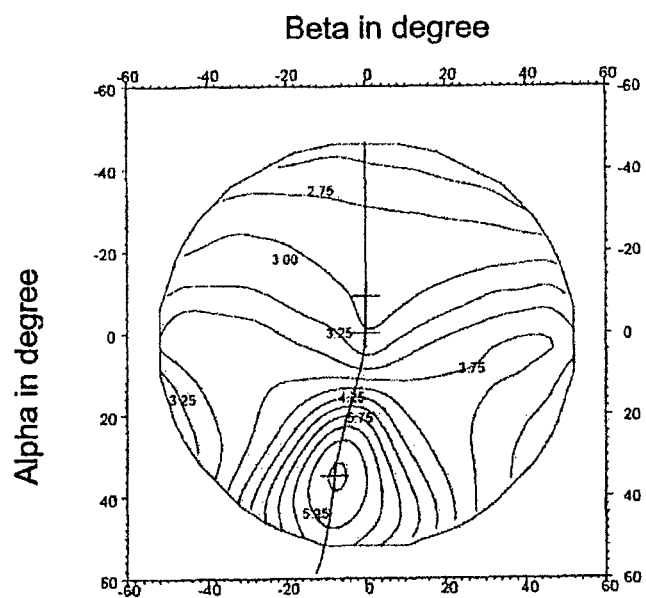
Figure 42:
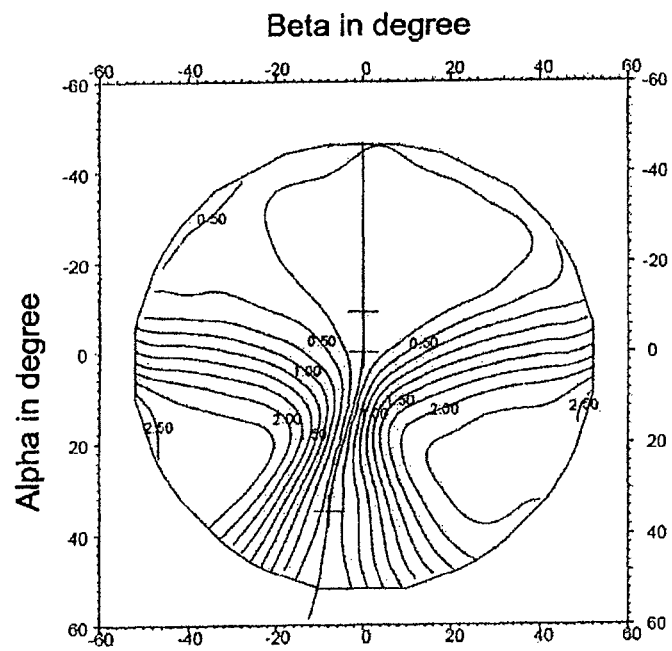

FIGS. 19, 20 and 21 are the superimposed figures obtained for the target optical functions obtained by a method according to the prior art. For clarity, the target optical function of the left eye is represented taking into account the symmetry between both eye relative to the line joining the two eye rotation centers of the wearer and passing, for instance, through the middle of the segment joining the two eye rotation centers. In the map which is represented:

$\alpha_{left\_map}=\alpha_{left}$ $\beta_{left\_map}=-\beta_{left}$ wherein $(\alpha_{left},\beta_{left})$ is the given gaze direction of the left eye and $(\alpha_{left\_map},\beta_{left\_map})$ is the corresponding gaze direction in the right eye frame For clarity, the corresponding figure for each target function (the one for the right eye and the left eye) are also represented on the FIGS. 22, 23 and 24 (right eye) and on FIGS. 25, 26 and 27 (left eye). As expected, when analyzing FIGS. 19, 20 and 21, since the power prescription is different between the left and the right eye, superimposition is not perfect, which means that the target optical functions are not symmetrical.

Using the target optical functions in an optical optimization method results in lenses with poorer binocular performance. This will be evident when contemplating FIGS. 28, 29 and 30. The figures are the superimposed figures obtained for the optical functions of the lenses obtained by such optical optimization method using the target optical functions according to the prior art. It can be noticed that the superimposition is not perfect. Accordingly, the binocular performance of the pair of lenses is not optimized.

Example 2

Example 2 corresponds to the same example of prescription considered for example 1. Thus, the power prescription in far vision is 1.0 δ for the right eye and 3.0 δ for the left eye; the addition prescribed is 2.75 δ for each eye and no astigmatism is prescribed to the wearer.

Example 2 corresponds to the results obtained when carrying out the method for determining target optical functions according to the flowchart of FIG. 10. In this case, the first eye is the right eye and the second eye is the left eye.

The data relating to the right eye which are considered at step 32 are the prescription for a power, an addition and for astigmatism. These data are used to generate a first intermediate target optical function for the right eye OFi1. This corresponds to the step 62 of the flowchart according to the method of FIG. 10. The characteristics of this target optical function are shown on FIGS. 31, 32 and 33.

Based on this optical function OFi1, it is possible to generate the target optical function for the right eye OFT1. The modifying step 64 is carried out by applying a function $f1_{modification}$ for each gaze direction. In the context of example 1, $f1_{mothfication}$ is a shift in power by the quantity $-1.0$ δ. The characteristics of this target optical function OFT1 are shown on FIGS. 34, 35 and 36.

Based on the optical function OFi1, it is also possible to generate the target optical function for the left eye OFT2. According to the method of FIG. 10, the generating step 36 comprises a creating step 66 and a modifying step 44. In the specific example 2, the transformation T2 applied is a symmetry with relation to the plane of the wearer which is perpendicular to the line joining the two optical rotation centers of the wearer and passing, for instance, through the middle of the segment joining the two eye rotation centers. This transformation T2 was notably described previously in reference to FIG. 8. The characteristics of this target optical function OFi2 are shown on FIGS. 37, 38 and 39.

The modifying step 44 is carried out by applying a function $f2_{modification}$ for each gaze direction. In the context of example 2, $f2_{modification}$ is a shift in power by the quantity $+1.0$ δ. The characteristics of this target optical function OFT2 are shown on FIGS. 40, 41 and 42.

Figure 43:
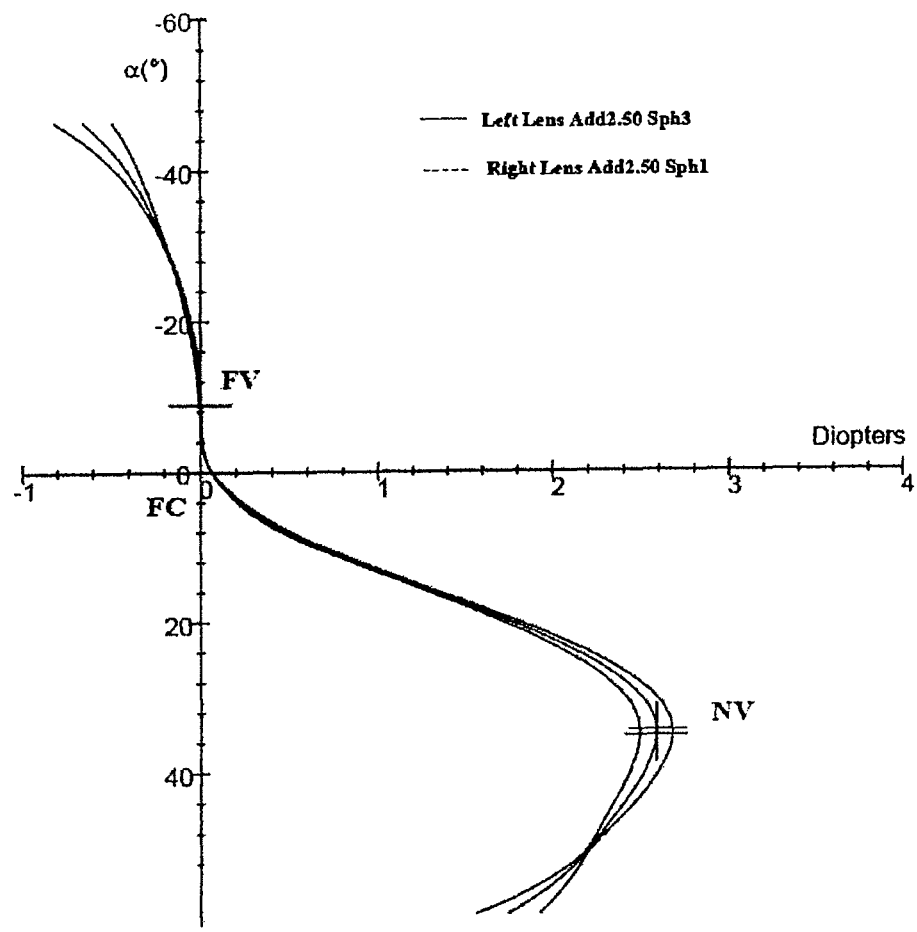
Figure 44:
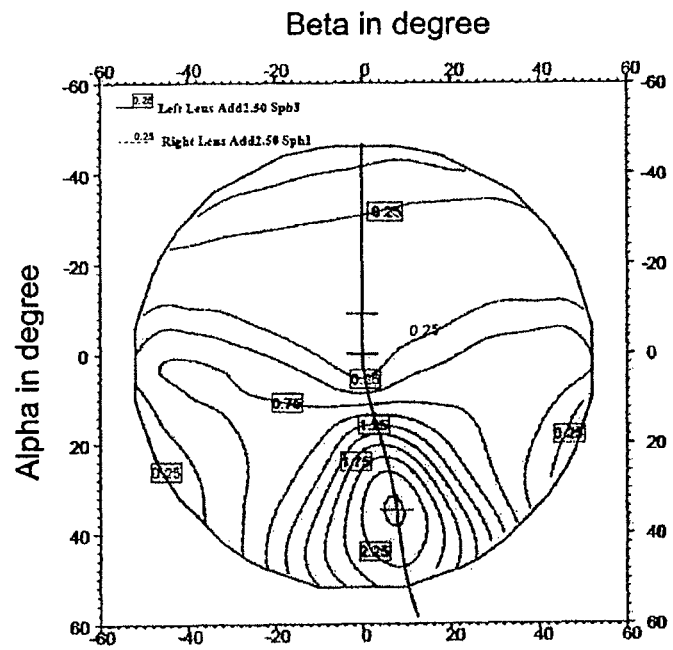
Figure 45:
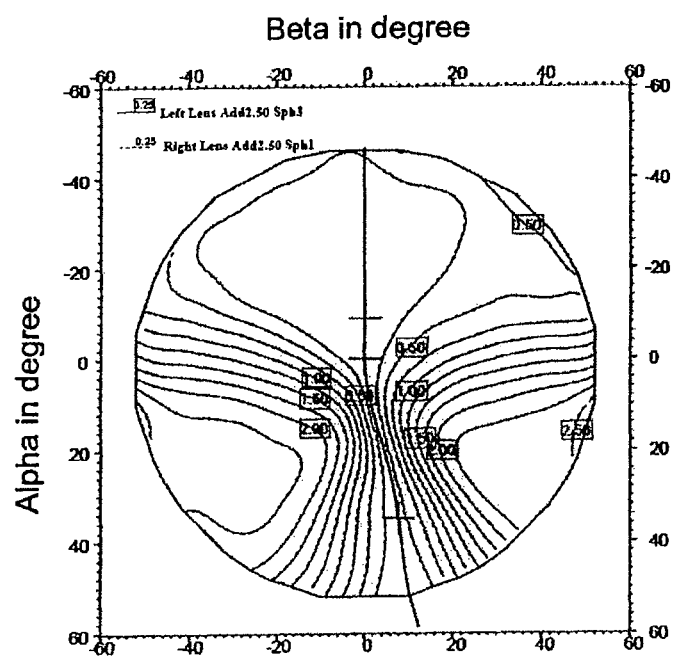

FIGS. 43, 44 and 45 are the superimposed figures obtained for the target optical functions OFT1 and OFT2 obtained by the method according to FIG. 10. In the case of example 4, the superimposition is nearly perfect. Compared to the case of example 1, the method of FIG. 10 used in example 2 thus enables target optical functions with improved symmetry to be obtained. This will result, as explained above, in better binocular performance, when using these target optical functions in an optical optimization method. This assertion is illustrated by FIGS. 46 to 48.

Figure 46:
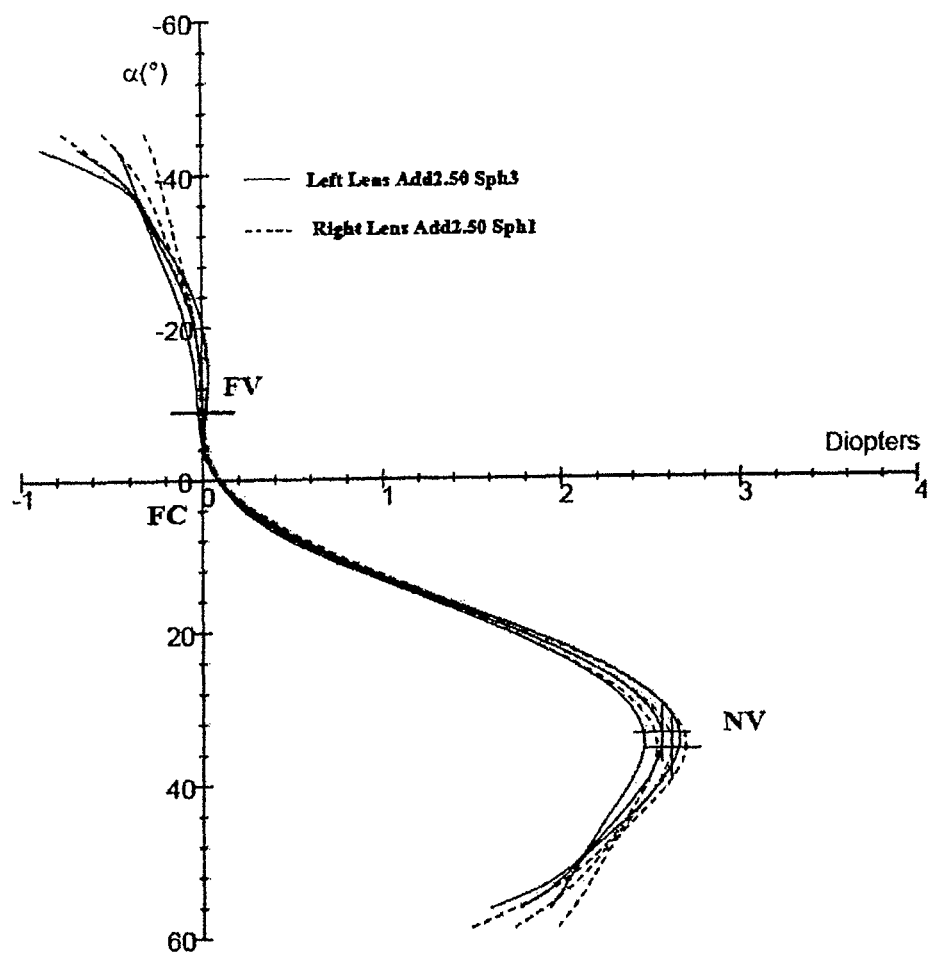
Figure 47:
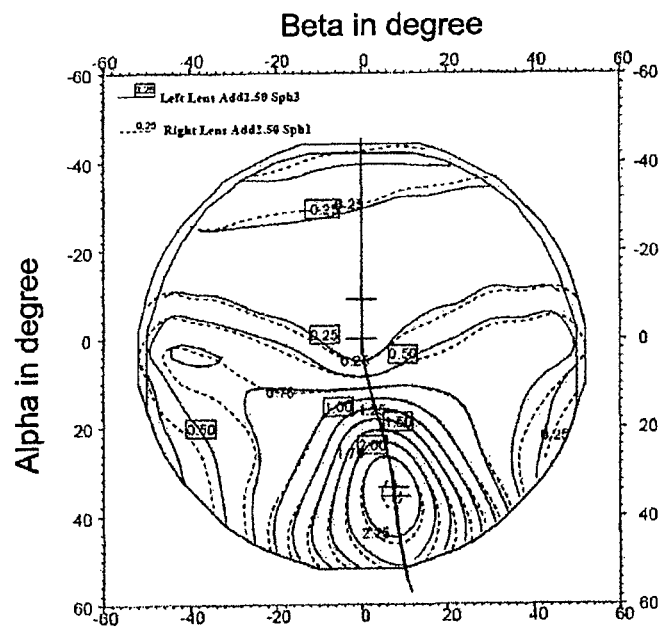
Figure 48:
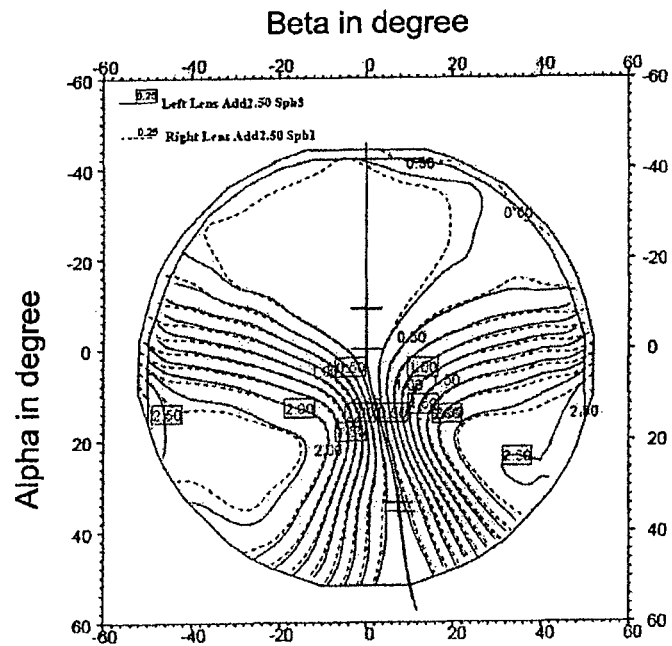
Figure 49:
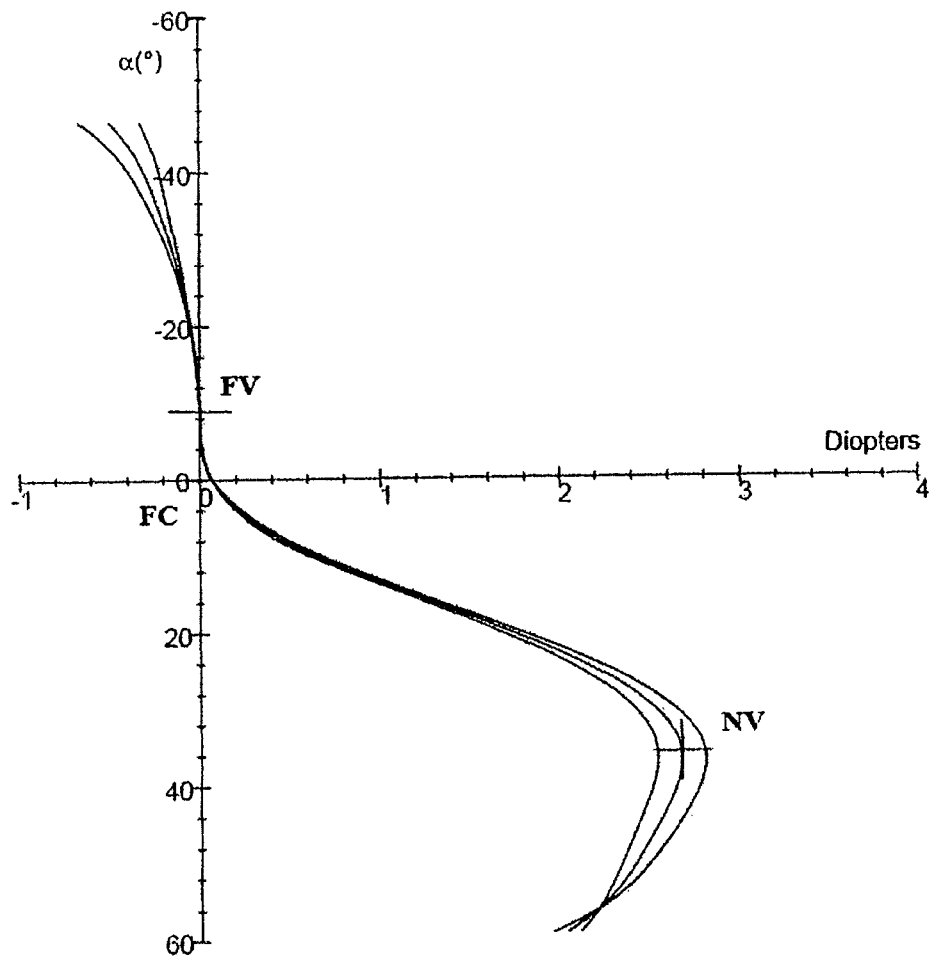
Figure 50:
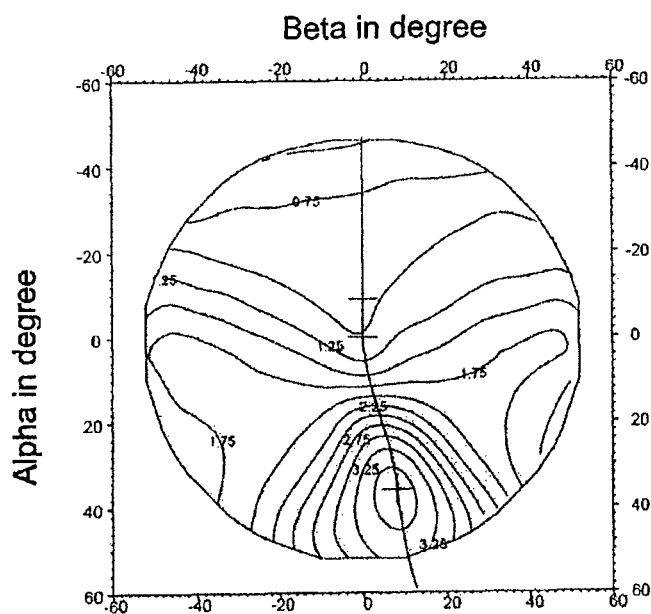
Figure 51:
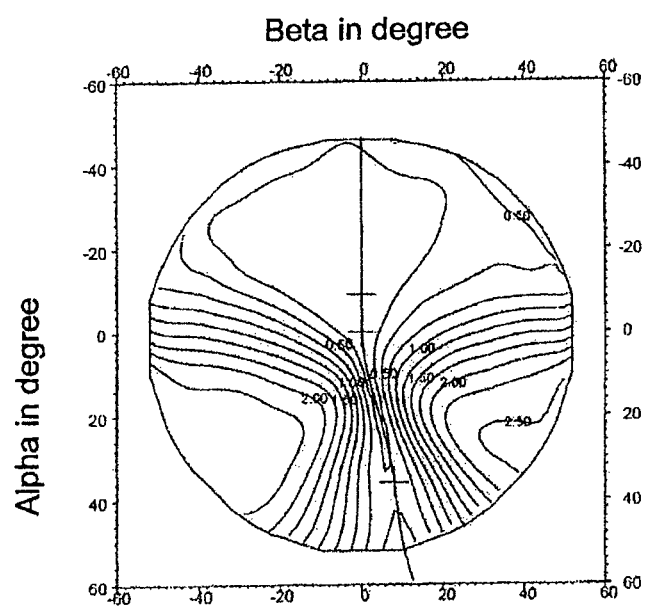
Figure 52:
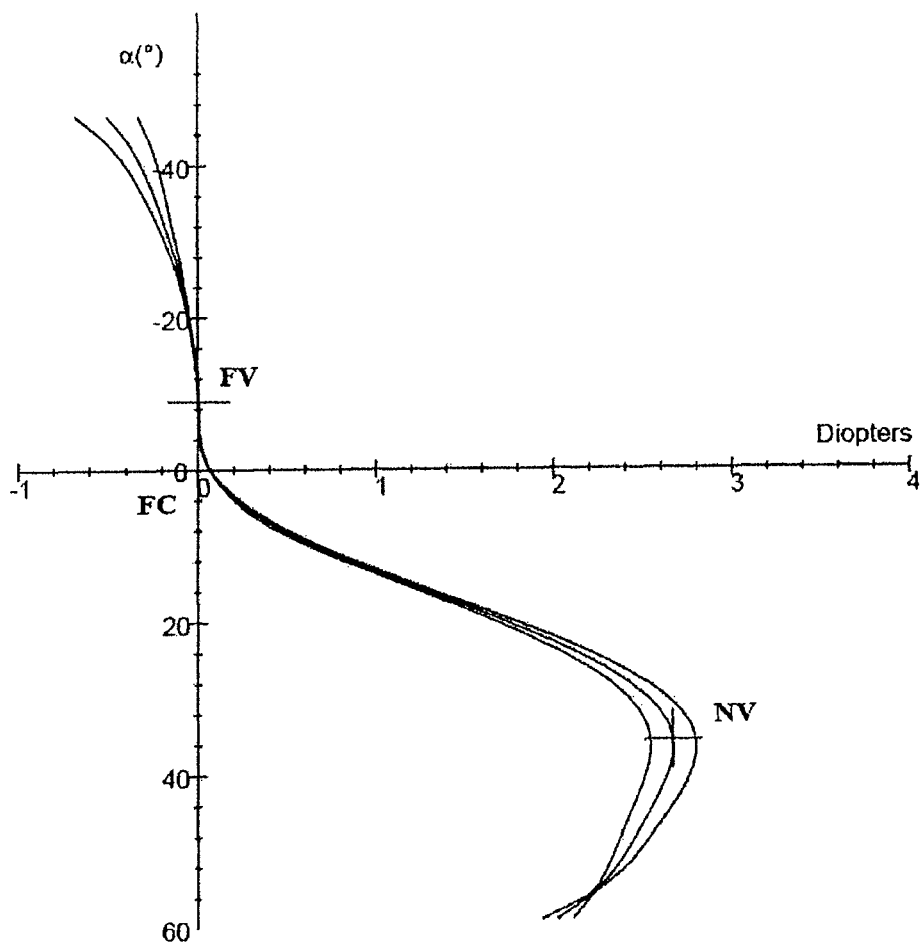
Figure 53:
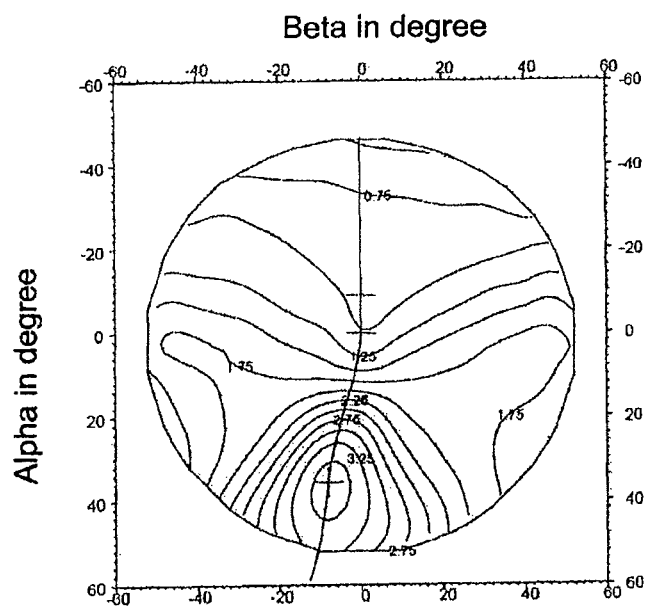
Figure 54:
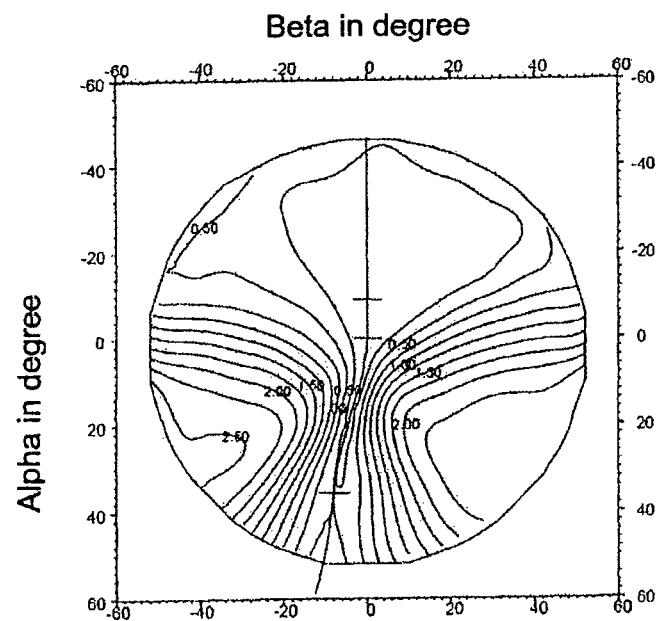
Figure 55:
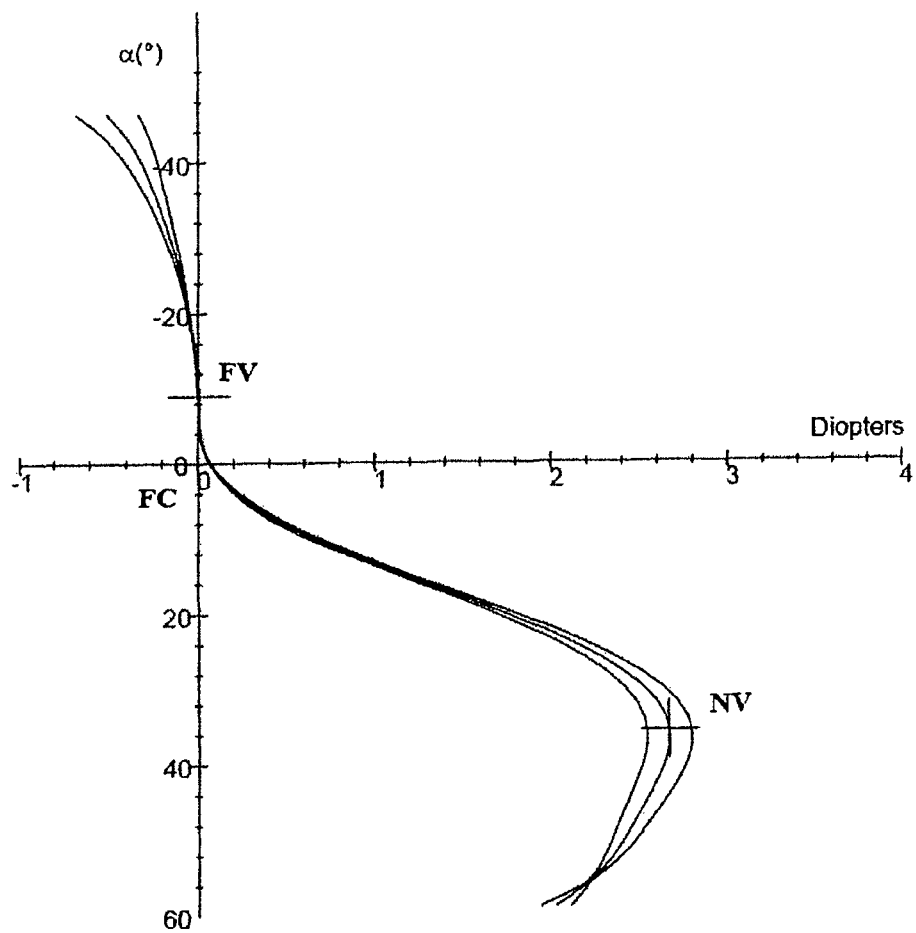
Figure 56:
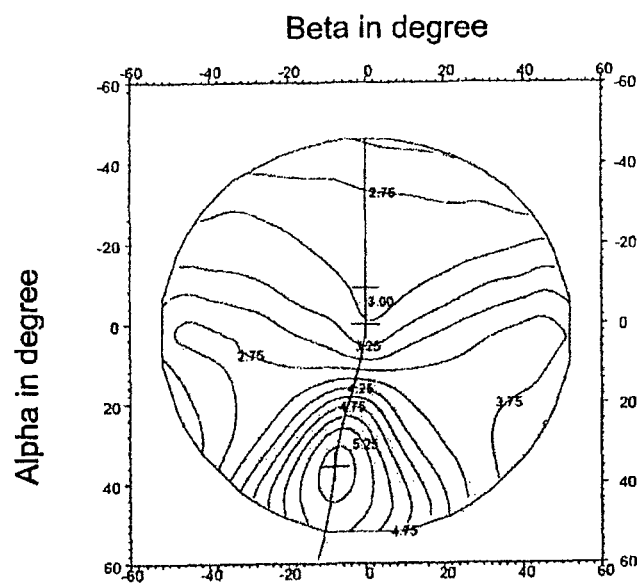
Figure 57:
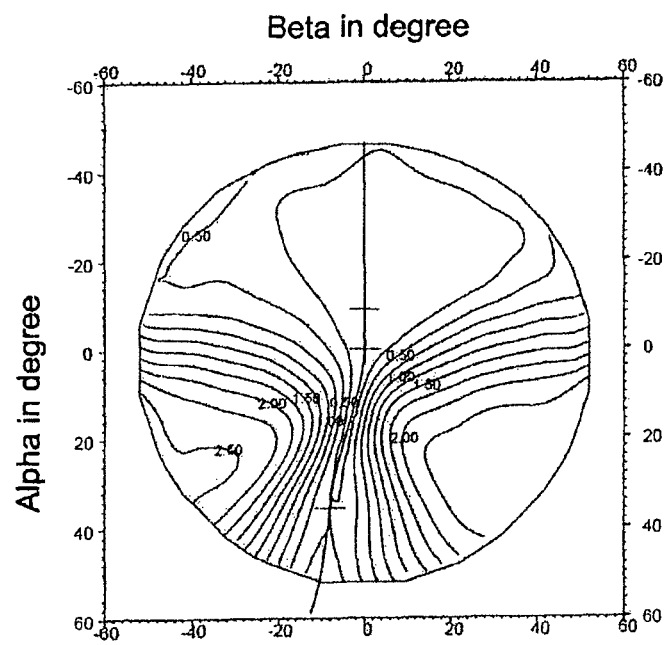

FIGS. 46, 47 and 48 are the superimposed figures obtained for the optical functions obtained for lenses obtained by such optical optimization method using the target optical functions according to the method of the flowchart of FIG. 10. Compared with example 1, the superimpositions are better, which proves that the lenses optimized are more symmetrical. This is the sign of improved binocular performance, and this, despite the fact that the prescribed powers are different for each eye.

Example 3

Example 3 corresponds to the same example of prescription considered for examples 1 or 2. Thus, the power prescription is 1.0 δ for the right eye and 3.0 δ for the left eye; the addition prescribed is 2.75 δ for each eye and no astigmatism is prescribed to the wearer. Furthermore, the right eye is considered as the main eye. To improve the performance of the pair of lenses, the data relative to the main eye will be have more importance in the definition of the two target optical functions.

Accordingly, example 3 corresponds to the results obtained when carrying out the method for determining target optical functions according to the flowchart of FIG. 12. In this case, the first eye is the right eye and the second eye is the left eye.

The data relating to the right eye which are considered at step 32 are the prescription for a power, an addition and for astigmatism. These data are used to generate a target optical function for the right eye OFT1. This corresponds to the step 34 of the flowchart according to the method of FIG. 12. The characteristics of this target optical function are shown on FIGS. 49, 50 and 51.

Based on this optical function OFT1, it is possible to generate the target optical function for the left eye OFT2. According to the method of FIG. 12, the generating step 36 comprises a creating step 66 and a modifying step 44. In the specific example 3, the transformation T2 applied is a symmetry with relation to the plane of the wearer which is perpendicular to the line joining the two optical rotation centers of the wearer and passing, for instance, through the middle of the segment joining the two eye rotation centers. This transformation T2 has been notably described previously in reference to FIG. 8. The characteristics of this target optical function OFi2 are shown on FIGS. 52, 53 and 54.

The modifying step 44 is carried out by applying a function $f2_{modification}$ for each gaze direction. In the context of example 3, $f2_{modification}$ is a shift in power by the quantity 2.0 δ. The characteristics of this target optical function OFT2 are shown on FIGS. 55, 56 and 57.

Figure 58:
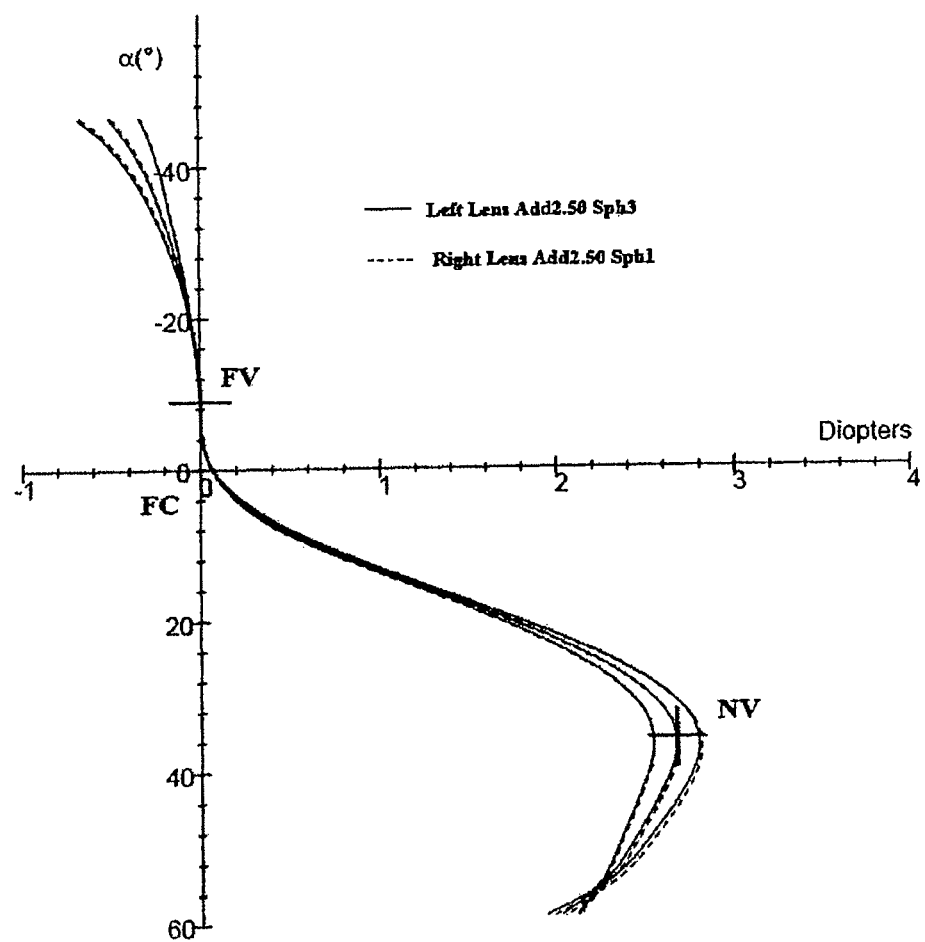
Figure 59:
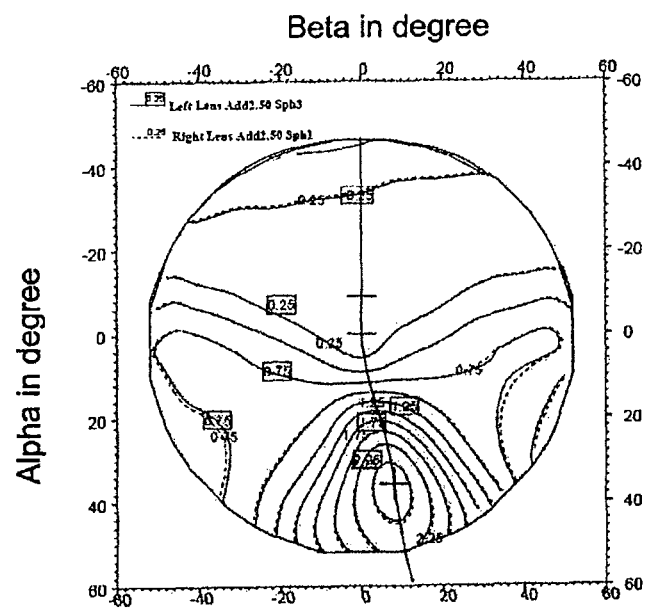
Figure 60:
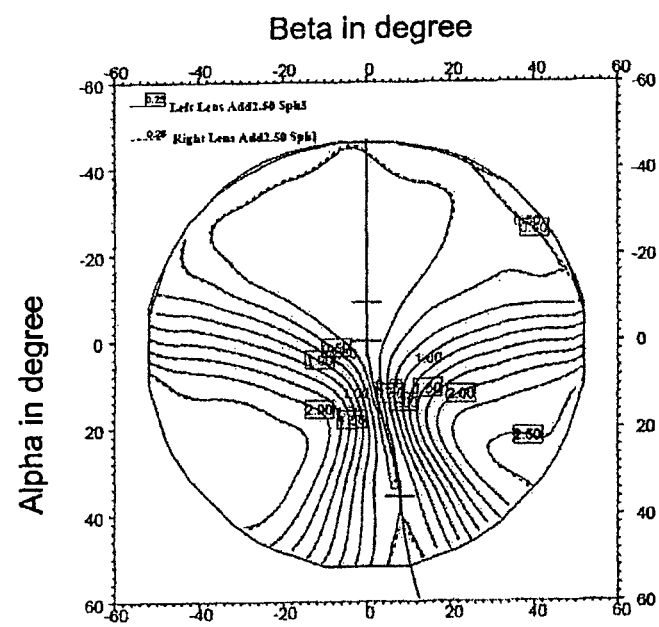

FIGS. 58, 59 and 60 are the superimposed figures obtained for the target optical functions OFT1 and OFT2 obtained by the method according to FIG. 12. In the case of the example 3, the superimposition is nearly perfect, the difference between both target optical function only being perceptible in the peripherical zone of vision (see FIG. 61). Compared to the case of example 1, the method of FIG. 12 used in example 3 thus enables to obtain target optical functions with improved symmetry. Compared to the case of example 2, the example 3 also enables to privilege the main eye in the definition of the two target optical functions. This will result, as explained previously, in better binocular performance, when using these target optical functions in an optical optimization method. This assertion is illustrated by FIGS. 61, 62 and 63.

Figure 61:
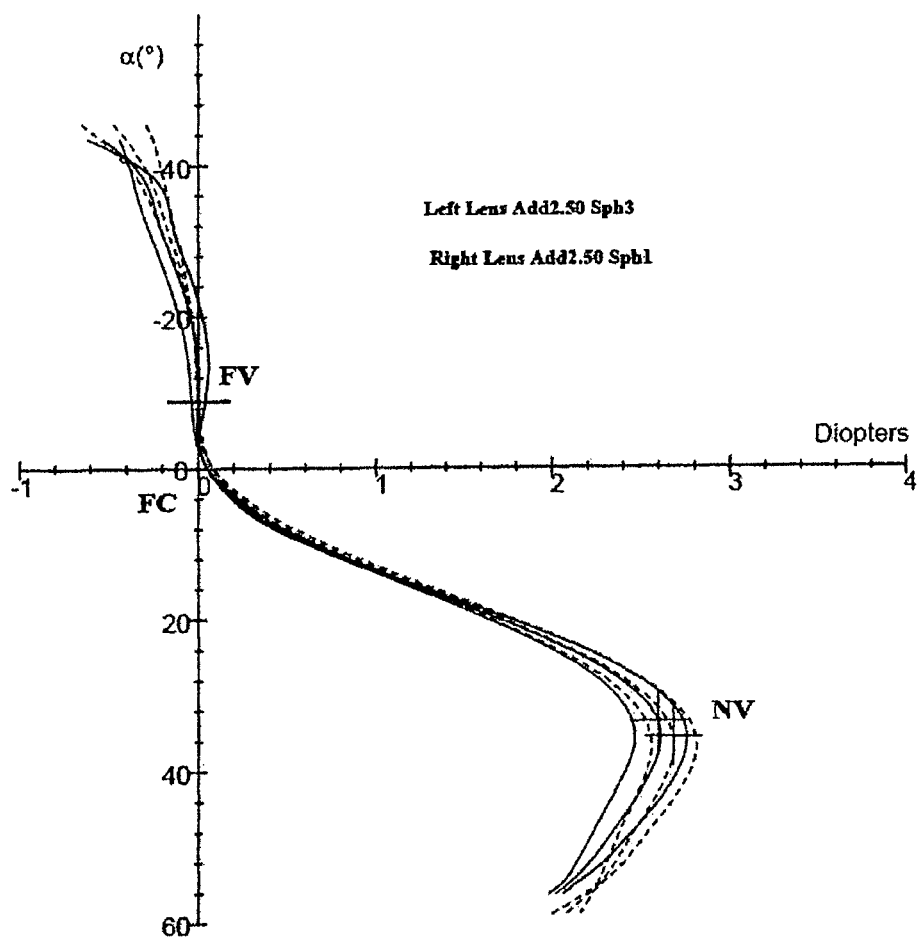
Figure 62:
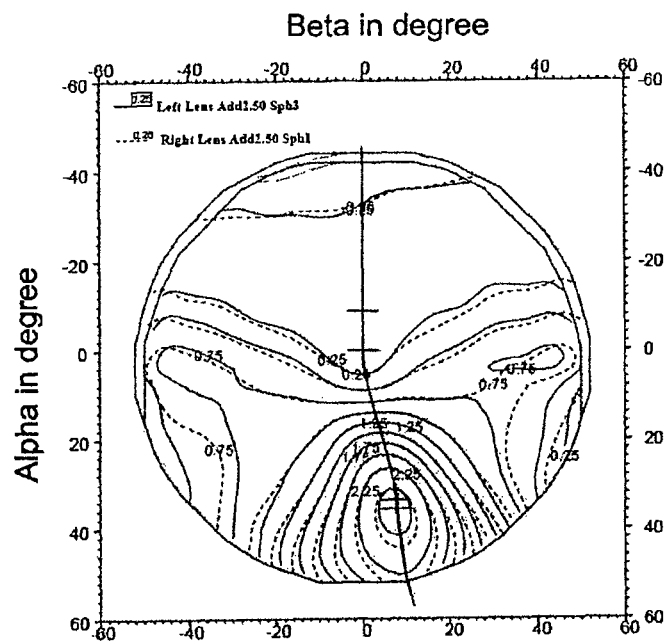
Figure 63:
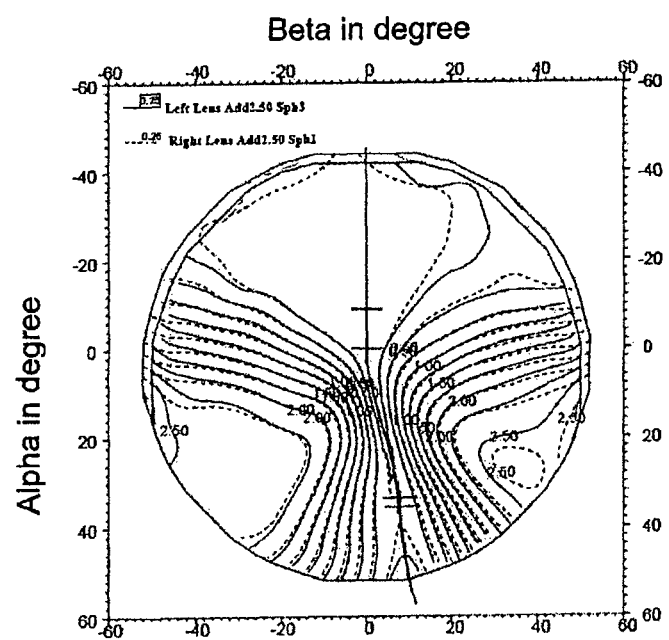
Figure 64:
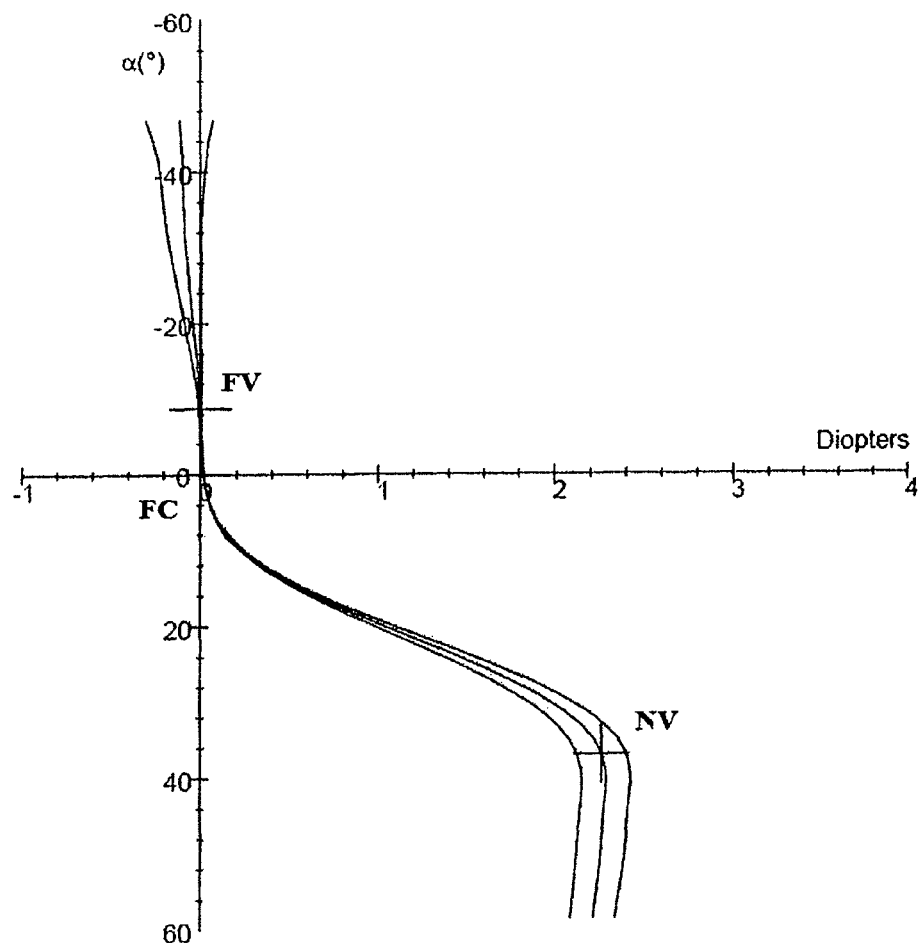
Figure 65:
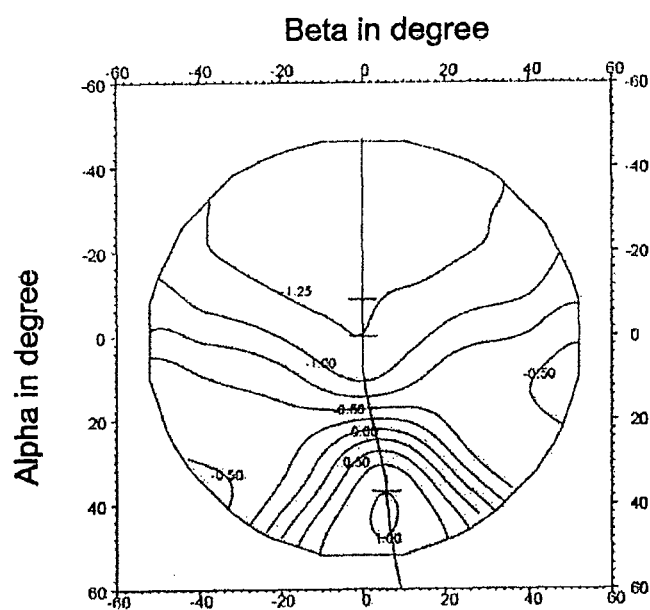
Figure 66:
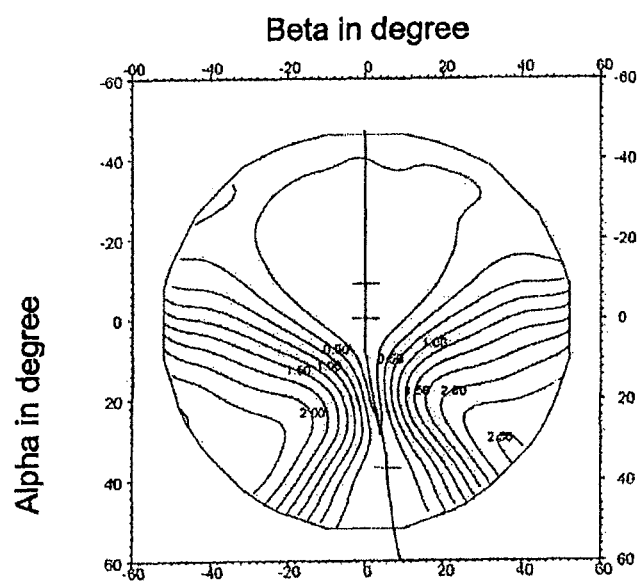
Figure 67:
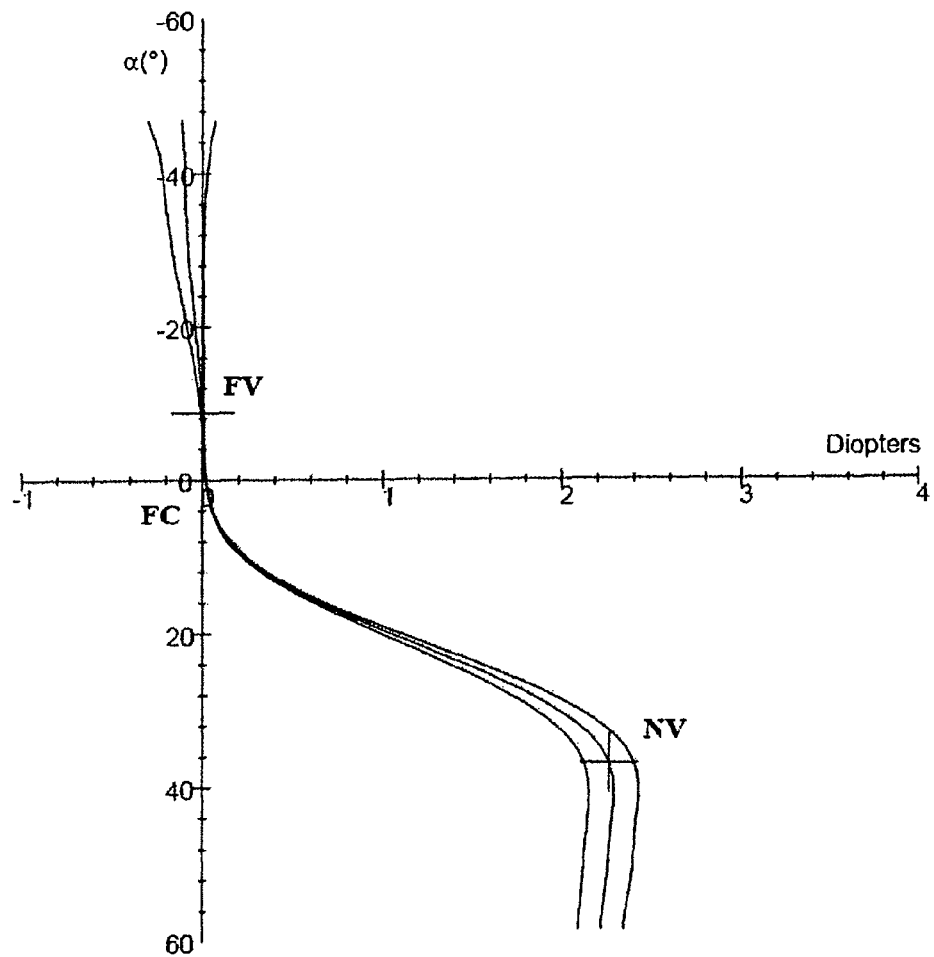
Figure 68:
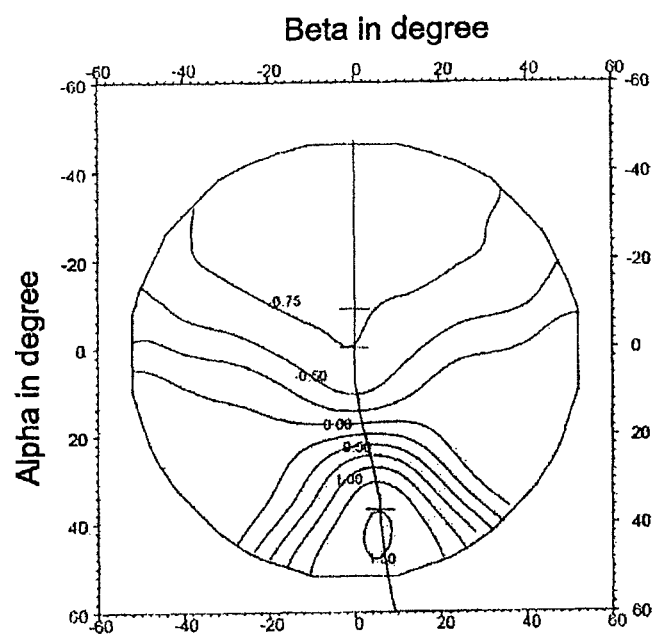
Figure 69:
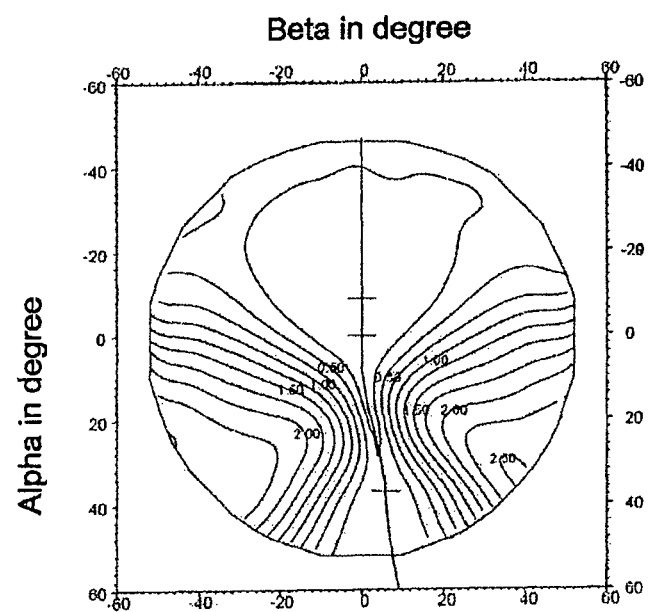
Figure 70:
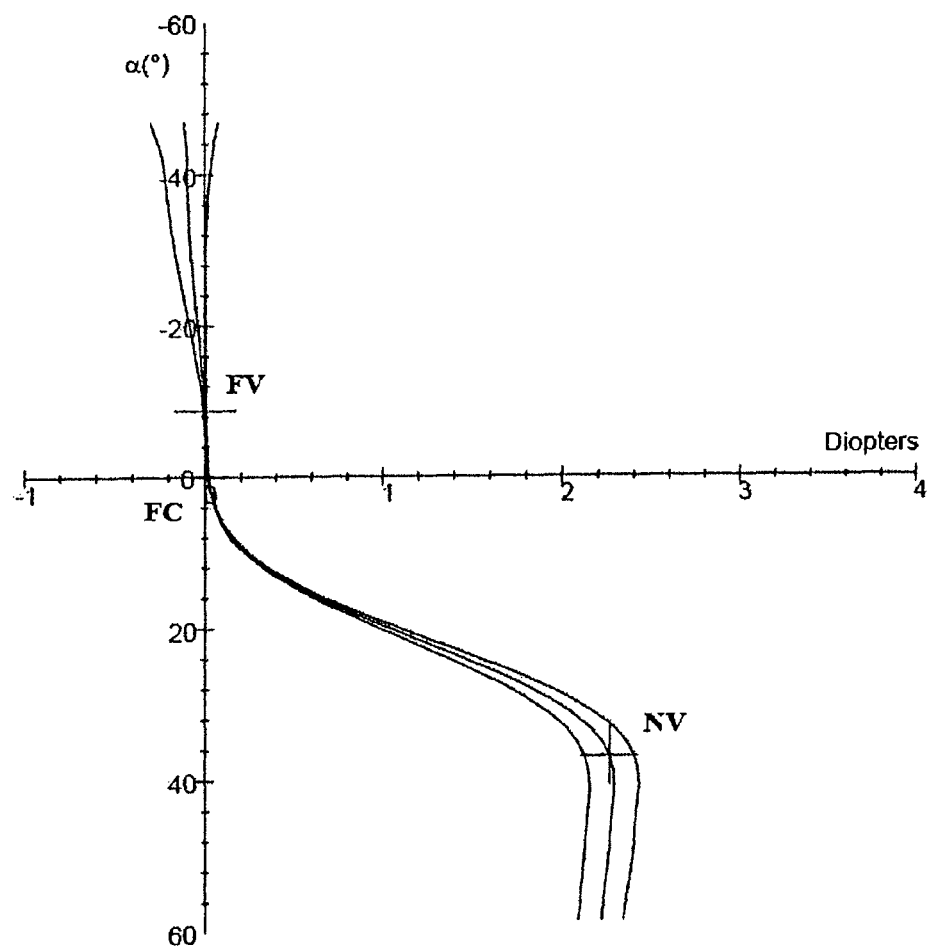
Figure 71:
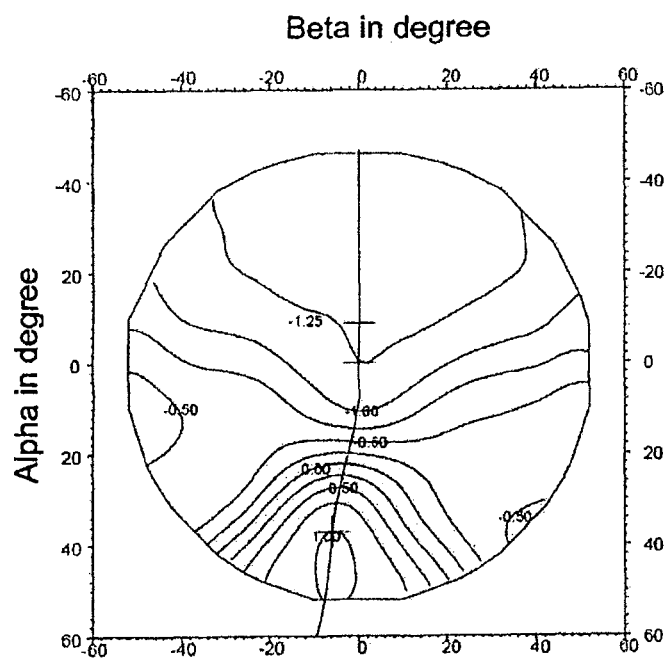
Figure 72:
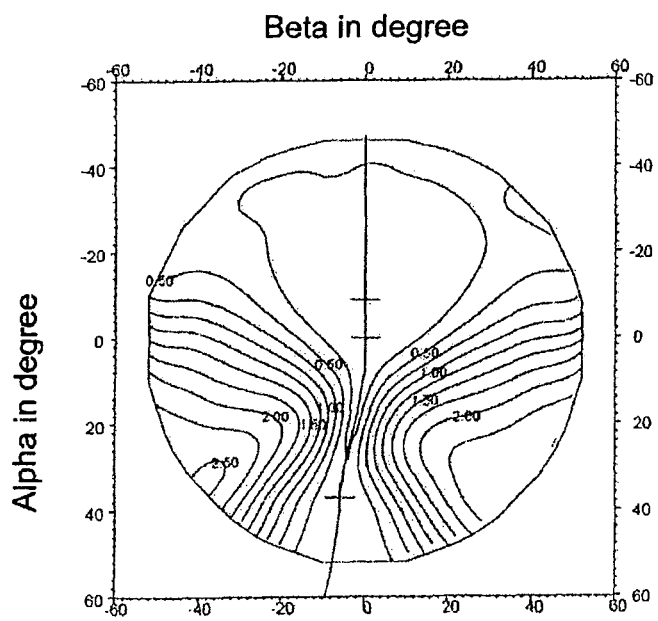
Figure 73:
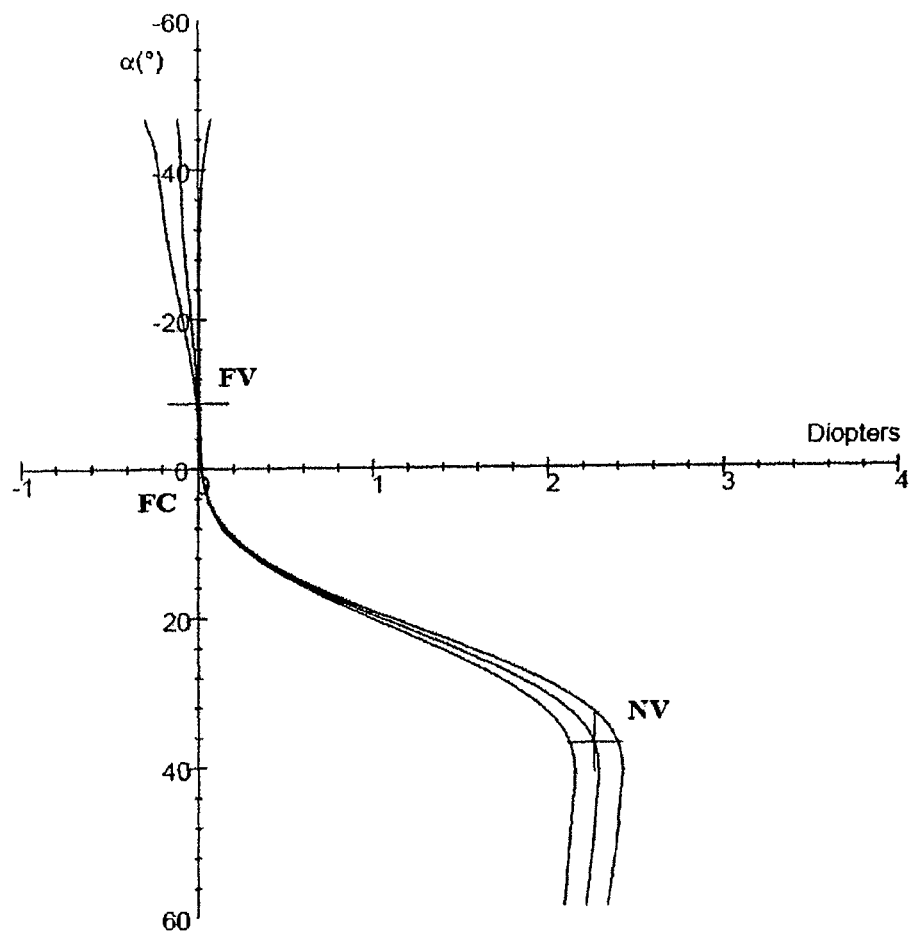
Figure 74:
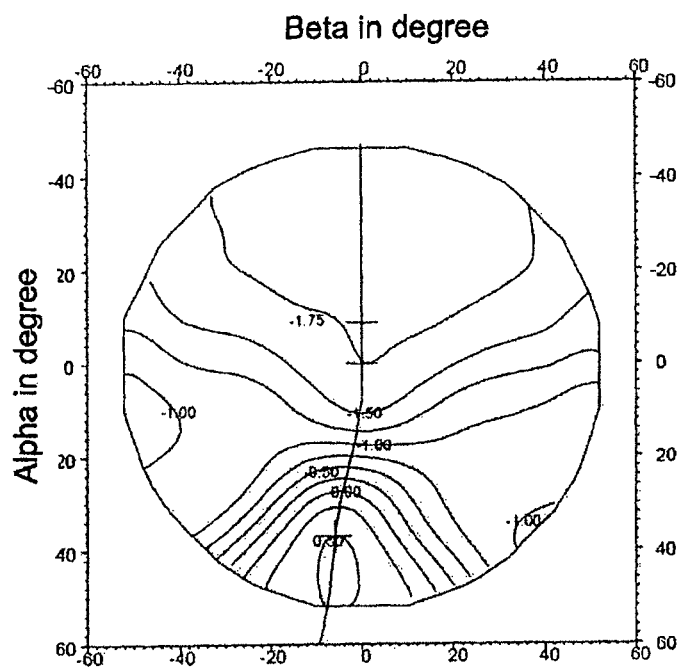
Figure 75:
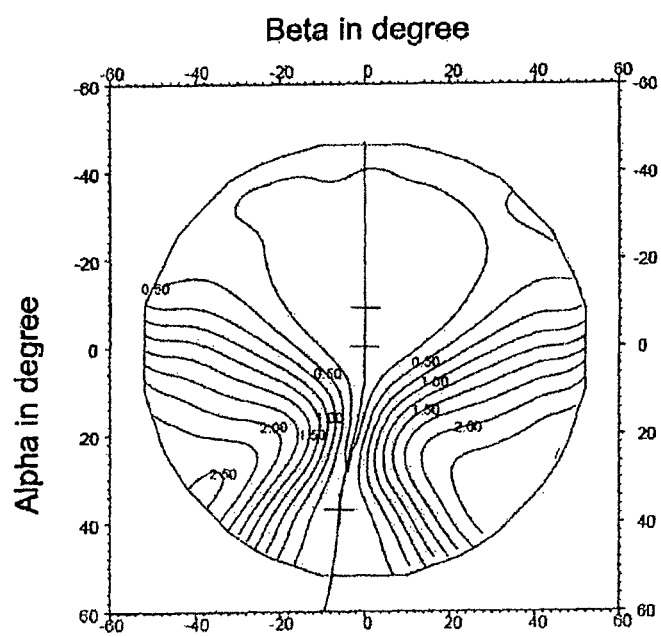

FIGS. 61, 62 and 63 are the superimposed figures obtained for the optical functions obtained for the lenses obtained by such optical optimization method using the target optical functions according to the method of the flowchart of FIG. 12. Compared with example 1, the superimpositions are better, which demonstrates that the lenses optimized are more symmetrical. This is the sign of improved binocular performance, and this, despite the fact that the prescribed powers are different for each eye.

Example 4

Example 4 corresponds to a power prescription of −0.75 δ for the right eye and −1.75 δ for the left eye; the addition prescribed is 2.00 δ for each eye and no astigmatism is prescribed to the wearer.

Example 4 corresponds to the results obtained when carrying out the method for determining target optical functions according to the flowchart of FIG. 14. In this case, the first eye is the right eye and the second eye is the left eye.

The data relating to the right and the left eyes which are considered at step 62 are the prescription for a power, an addition and for astigmatism. These data are used to generate a first intermediate target optical function for the right eye OFi1. This corresponds to the step 62 of the flowchart according to the method of FIG. 15. The characteristics of this target optical function are shown on FIGS. 64, 65 and 66.

Based on this optical function OFi1, it is possible to generate the target optical function for the right eye OFT1. The modifying step 64 is carried out by applying a function $f1_{modification}$ for each gaze direction. In the context of example 1, $f1_{modification}$ is a shift in power by the quantity +0.5 δ. The characteristics of this target optical function OFT1 are shown on FIGS. 67, 68 and 69.

In parallel, first intermediate target optical function for the right eye OFi1. This corresponds to the step 66 of the flowchart according to the method of FIG. 15. The characteristics of this target optical function OFi2 are shown on FIGS. 70, 71 and 72.

The modifying step 44 is carried out by applying a function $f2_{modification}$ for each gaze direction. In the context of example 4, $f2_{modification}$ is a shift in power by the quantity −0.5 δ. The characteristics of this target optical function OFT2 are shown on FIGS. 73, 74 and 75.

Figure 76:
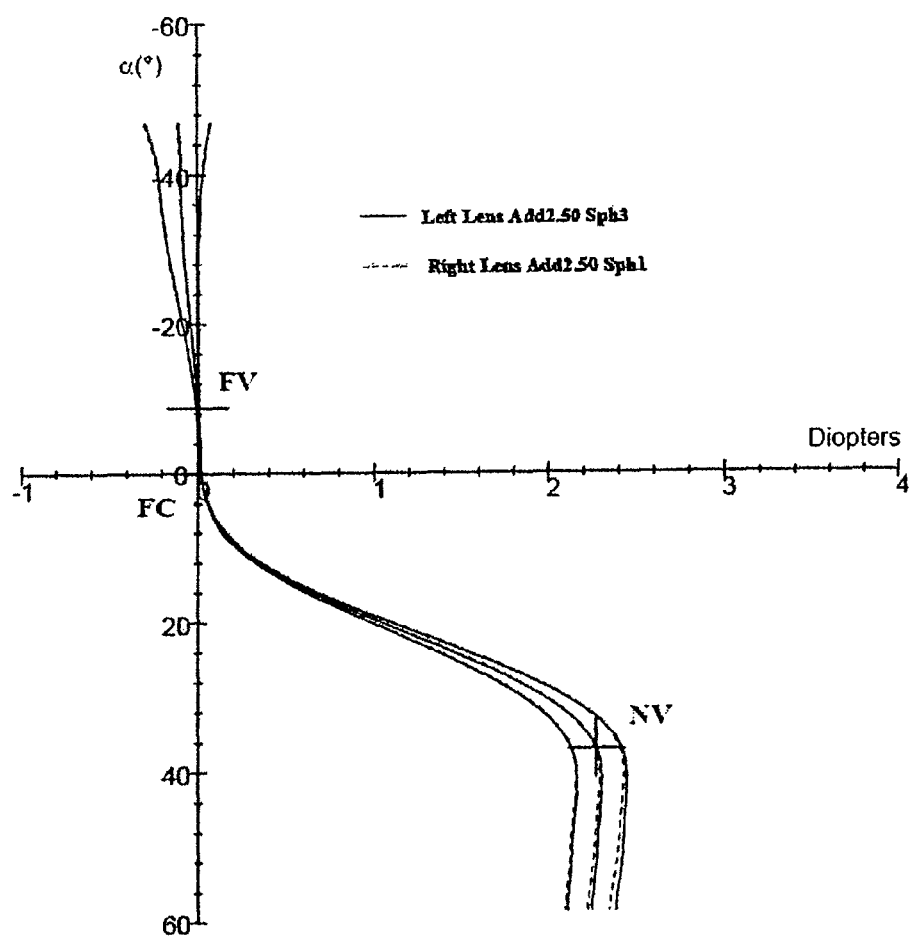
Figure 77:
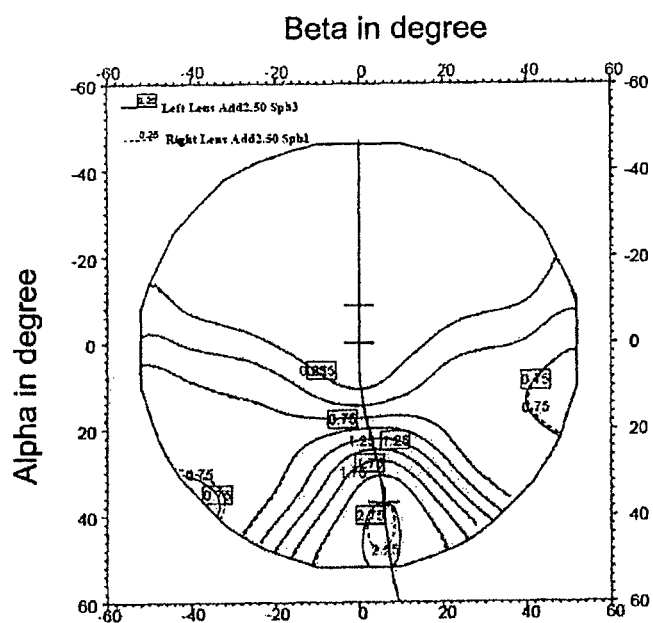
Figure 78:
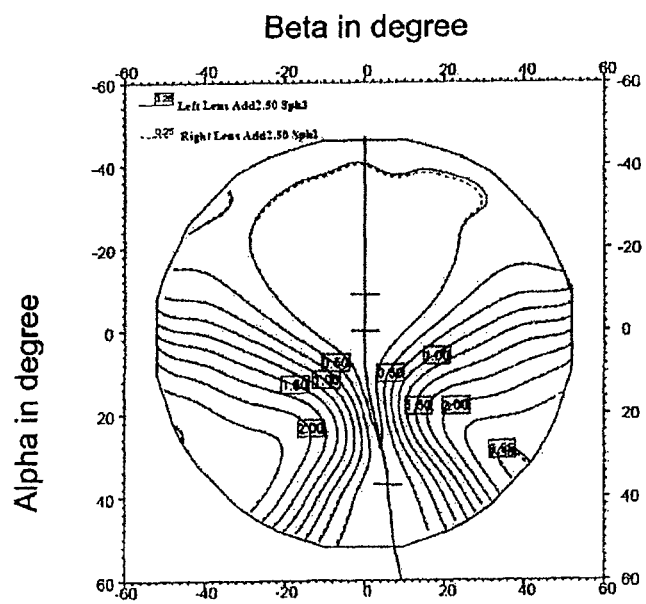

FIGS. 76, 77 and 78 are the superimposed figures obtained for the target optical functions OFT1 and OFT2 obtained by the method according to FIG. 15. In the case of example 4, the superimposition is nearly perfect. Compared to the case of example 1, the method of FIG. 15 used in example 4 thus enables target optical functions with improved symmetry to be obtained. This will result, as explained above, in better binocular performance, when using these target optical functions in an optical optimization method. This assertion is illustrated by FIGS. 79 to 81.

Figure 79:
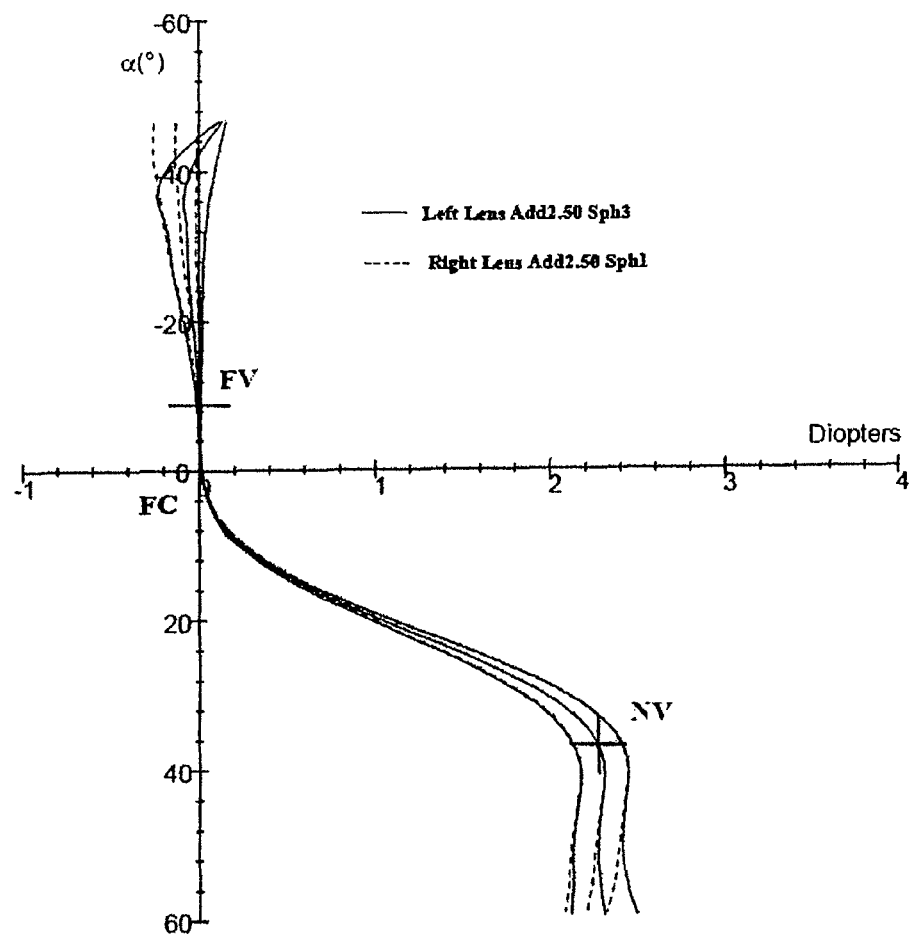
Figure 80:
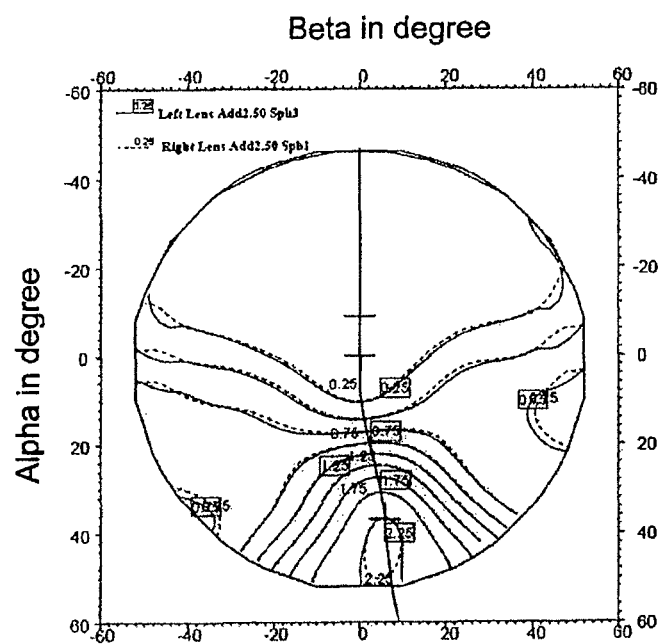
Figure 81:
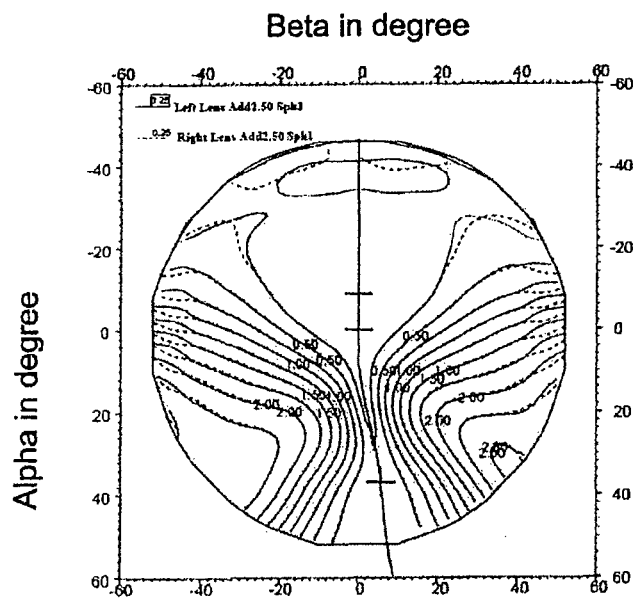
Figure 82:
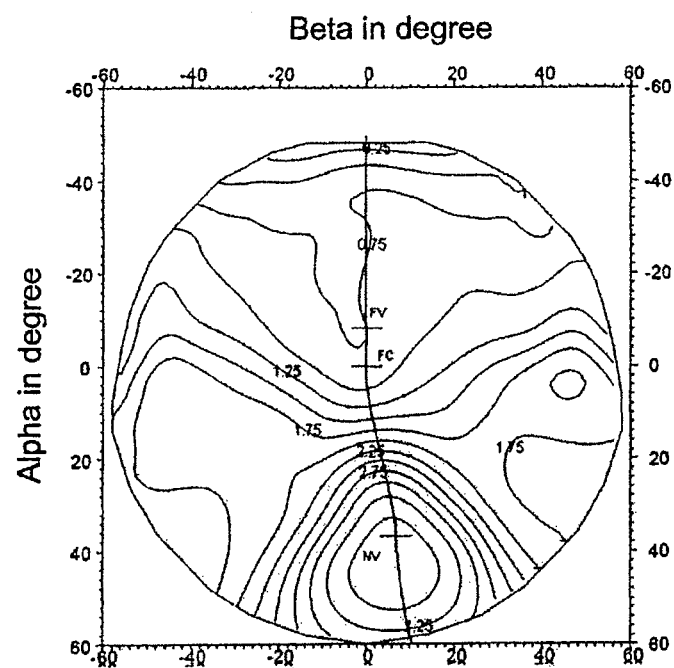
Figure 83:
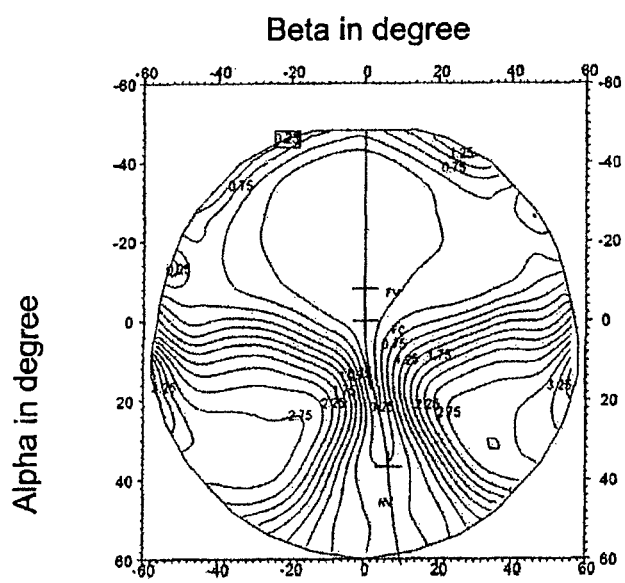
Figure 84:
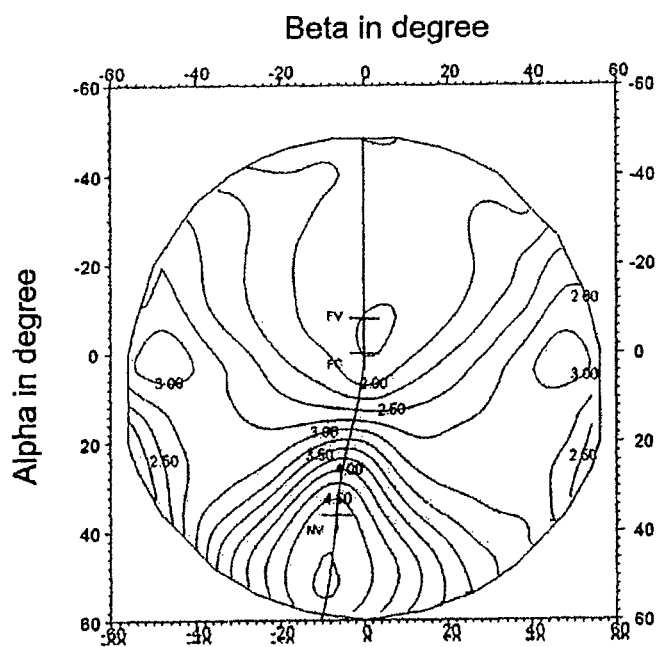
Figure 85:
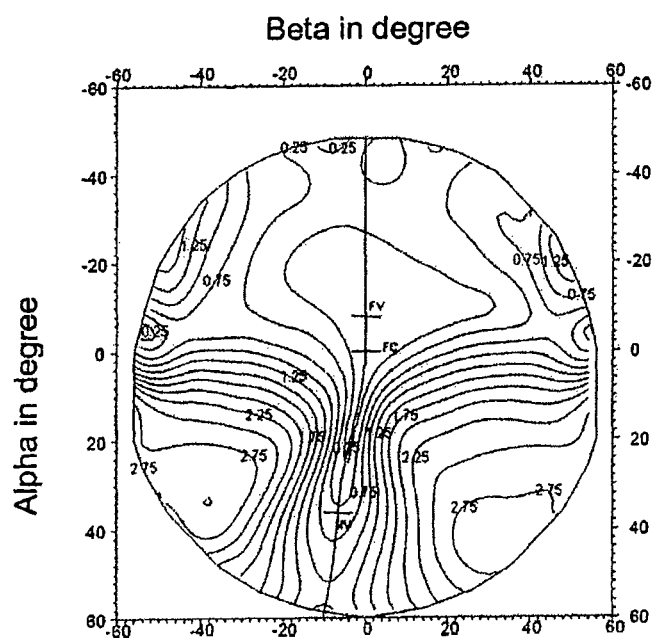

FIGS. 79, 80 and 81 are the superimposed figures of the optical functions of lenses obtained by such optical optimization method using the target optical functions according to the method of the flowchart of FIG. 10. A good superimposition can be observed, which should result in good binocular properties as explained earlier.

Example 5

Prior Art

Example 5 corresponds to an example according to prior art. In this case, the power prescription is 0.75 δ for the right eye and 1.75 δ for the left eye. Further, the addition prescribed is 2.50 δ for each eye. For this example 4, no astigmatism is prescribed for the wearer.

Using the target optical functions according to the prior art in an optical optimization method results in lenses with poorer binocular performance. This appears when contemplating FIGS. 84 and 85 by comparison with FIGS. 82 and 83. In this respect, it can be noticed that the superimposition is not perfect. Accordingly, the binocular performance of the pair of lenses is not optimized.

Example 6

Example 6 corresponds to the same example of prescription considered for example 5. Thus, the power prescription is 0.75 δ for the right eye and 1.75 δ for the left eye; the addition prescribed is 2.50 δ for each eye and no astigmatism is prescribed for the wearer.

Example 6 corresponds to the results obtained when carrying out the method for determining target optical functions that will be briefly described in the following. In this case, the first eye is the right eye and the second eye is the left eye.

Figure 86:
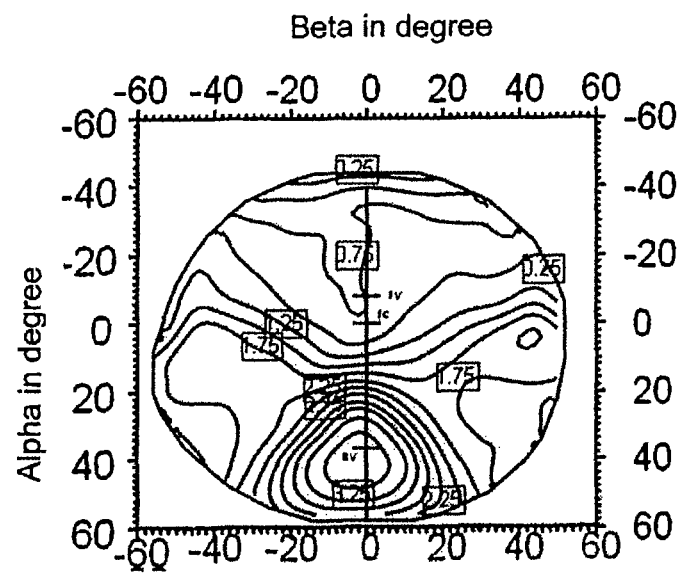
Figure 87:
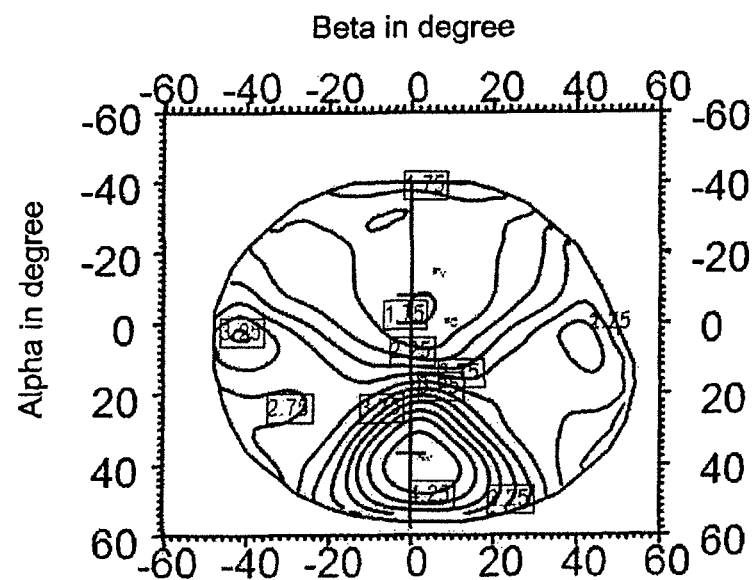
Figure 88:
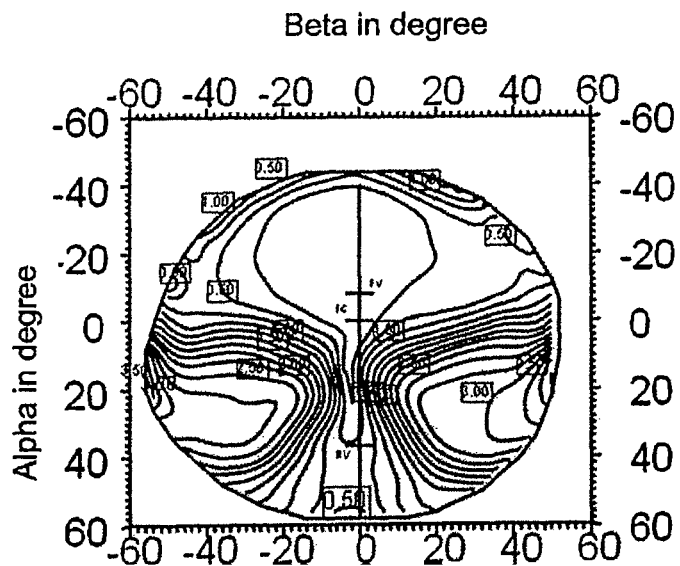
Figure 89:
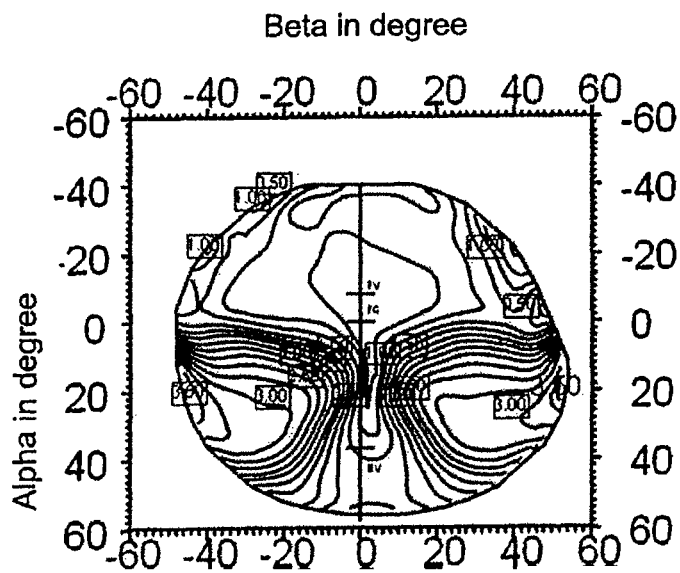
Figure 90:
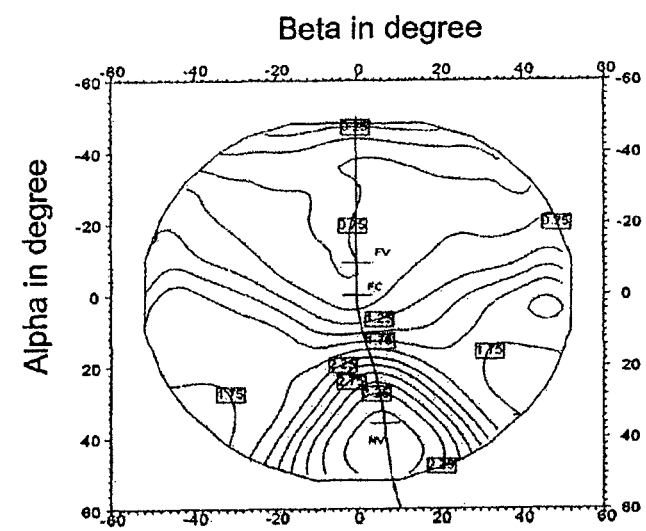
Figure 91:
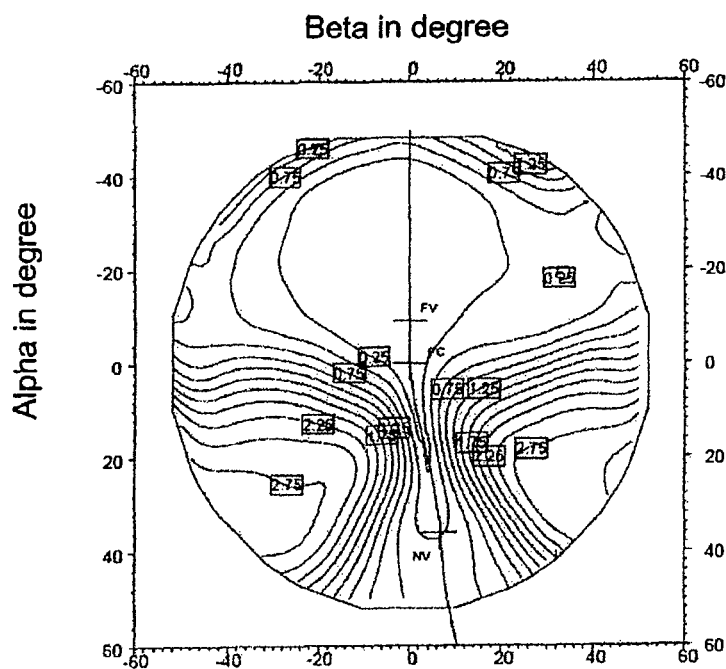
Figure 92:
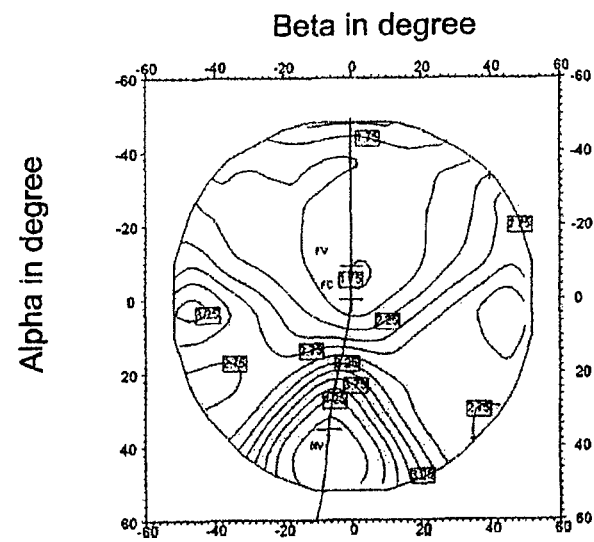

A target function is created for an optical power corresponding to the prescribed power for the right eye in the binocular frame. The target optical function is expressed in binocular coordinates in FIGS. 86, 87, 88 and 89. FIGS. 86 and 88 concern the right eye whereas FIGS. 87 and 89 concern the left eye.

In the binocular coordinates, a binocular gaze direction is defined by two angles measured with regard to a direct orthonormal basis centered on the point OC defined by reference to FIG. 7. The visual environment is sampled based on the binocular gaze direction. For each binocular gaze direction, a corresponding object point P of the visual environment is determined. For each eye, the optical criteria are evaluated.

When expressing these target optical function in the respective monocular frame, the FIGS. 90 to 93 are obtained. The FIGS. 90 and 91 exhibit the properties of the target optical function for the right eye whereas the FIGS. 92 and 93 exhibiting the properties of the target optical function for the right eye. As each method for determining target optical functions previously described, the superimposition of FIGS. 90 and 92 on the one hand and of FIGS. 91 and 93 on the other hand is better than in the prior art. This will result in improved binocular properties.

The invention has been described with reference to preferred embodiments. However, many variations are possible within the scope of the invention. In particular, the ophthalmic lenses may be of all kind, such as single vision (spherical, torical), bi-focal, progressive, aspherical lenses (etc).

The invention claimed is:

1. A non-transistory computer-implemented method for determining target optical functions for a pair of ophthalmic lenses comprising a first lens for a first eye and a second lens for a second eye of a wearer of the pair of the ophthalmic lenses, wherein a target optical function is a set of optical criteria values defined for given gaze directions, representing the performance to be reached, the method comprising steps of:
   generating a first target optical function for the first lens of the pair of the ophthalmic lenses based at least on data relating to the first eye, wherein said data relating to the first eye are selected from monocular data linked to prescription data for the first eye or a combination of prescription data, data linked to the first eye's biometry and binocular data;
   creating an intermediate optical function for the second lens of the pair of the ophthalmic lenses based on a transformation of the first target optical function,
   wherein said transformation applies to the values of one optical criterion of the first target optical function, and wherein said transformation is selected from linear transformations such as
   shifts, including power shifts, and
   homotheties; and
   generating a second target optical function for the second lens of the pair of the ophthalmic lenses by modifying the intermediate optical function based on the prescription data of the second eye.

2. The method according to claim 1, wherein said transformation is a shift.

3. The method according to claim 1, wherein the generating step of the first target optical function comprises steps of:
   creating an intermediate optical function for the first lens of the pair of the ophthalmic lenses based at least on data relating to the first eye; and
   determining the first target optical function by modifying the intermediate optical function for the first lens of the pair of the ophthalmic lenses based on the prescription data for the first eye,
   wherein the intermediate optical function for the second lens of the pair of the ophthalmic lenses is based on a transformation of the intermediate optical function of the first target optical function.

4. The method according to claim 3, wherein two gaze directions are associated, one gaze direction relative to the first eye and the other one relative to the second eye are associated to see a given object, and wherein, the intermediate function for the first lens of the pair of the ophthalmic lenses and the intermediate function for the second lens of the pair of the ophthalmic lenses have optical criteria values, the transformation being such that the intermediate optical function optical for the second lens of the pair of ophthalmic lenses has the same optical criteria value of the intermediate optical function for the first lens of the pair of the ophthalmic lenses for each associated gaze direction.

5. The method according to claim 1, wherein the generating step of the first target optical function is also based on data relating to the second eye.

6. The method according to claim 3, wherein the step of creating an intermediate optical function for the first lens of the pair of the ophthalmic lenses comprises:
   defining two sets of optical criteria values ($V1_{first\ eye}$, ... $VN_{first\ eye}$, $V1_{second\ eye}$, $VN_{second\ eye}$), calculated for given gaze directions (($\alpha,\beta$) and ($\alpha',\beta'$)), one set ($V1_{first\ eye}$, ... $VN_{first\ eye}$) being defined with data relative to the first eye and one set ($V1_{second\ eye}$, ... $VN_{second\ eye}$) being defined with data relative to the second eye;
   determining weighting coefficients ($\gamma i_{second\ eye}$ and $\gamma i_{second\ eye}$) between both eyes for each optical criteria values of the sets of optical criteria based on data relating to both eyes;
   calculating a set of optical criteria ($Wi_{first\ eye}$) constituting the intermediate optical function for the first lens of the pair of the ophthalmic lenses by applying an operation to the optical criteria values of the two sets of optical criteria ($V1_{first\ eye}$, ... $VN_{first\ eye}$, $V1_{second\ eye}$, ... $VN_{second\ eye}$);
   wherein the operation is the product of the weighting coefficient by optical criteria for the first eye added to the product of the difference of 1 and the weighting coefficient by the optical criteria for the second eye:

$$Wi_{first\ eye}(\alpha,\beta) = \gamma i_{first\ eye} Vi_{first\ eye}(\alpha,\beta) + (1 - \gamma i_{first\ eye}) Vi_{second\ eye}(\alpha',\beta').$$

7. The method according to claim 6, wherein the weighting coefficients are determined based on monocular data deriving from the prescription for both eyes, or on binocular data.

8. A method of optical optimization of a pair of ophthalmic lenses comprising the steps of:
choosing an initial pair of ophthalmic lenses;
determining target optical functions according to the method of claim 1;
defining a current pair of ophthalmic lenses, optical functions being associated to each ophthalmic lens of the pair of current ophthalmic lenses, the current pair of ophthalmic lenses being initially defined as the initial pair of ophthalmic lenses; and
carrying out an optical optimization for minimizing the difference between the current optical functions and the target optical functions with a cost function.

9. A method for manufacturing a pair of ophthalmic lenses, comprising the steps of:
providing data relating to the eyes of the wearer,
determining target optical functions according to the method of claim 1,
carrying out an optical optimization based on the target optical functions so as to obtain a pair of optimized ophthalmic lenses; and
manufacturing at least one ophthalmic lens of the pair of ophthalmic lenses according to the result of the optical optimization.

10. A set of apparatuses for manufacturing a pair of ophthalmic lenses, wherein the apparatuses are adapted to carry out the method according to claim 9.

11. A non-transistory set of data comprising:
data relating to the eyes of the wearer; and
target optical functions determined according to the method of claim 1.

12. A non-transistory computer program product comprising one or more stored sequence of instructions that is accessible to a processor and which, when executed by the processor, causes the processor to carry out the steps of the method according to claim 1.

13. A non-transistory computer readable medium carrying out one or more sequences of instructions of the computer program product of claim 12.

14. An optimized lens obtained by carrying out an optical optimization based on the target optical functions determined by the method according to claim 1.

15. An optimized pair of ophthalmic lenses obtained by carrying out an optical optimization based on the target optical functions determined by the method according to claim 1.

16. The method according to claim 1, wherein said transformation is a power shift.

* * * * *